(12) United States Patent
Roper, Jr. et al.

(10) Patent No.: US 12,488,155 B2
(45) Date of Patent: Dec. 2, 2025

(54) ARTIFICIAL INTELLIGENCE (AI) ASSISTED DIGITAL DOCUMENTATION FOR DIGITAL ENGINEERING

(71) Applicant: Istari Digital, Inc., Charleston, SC (US)

(72) Inventors: William Roper, Jr., Charleston, SC (US); Christopher Lee Benson, Arlington, VA (US); Sriram Krishnan, Cambridge, MA (US); Peter Galvin, Watertown, MA (US); Pranav Sumanth Doijode, Rijswijk (NL); Bayan Abedal-Muttaleb Afif Hashem, Amman (JO)

(73) Assignee: Istari Digital, Inc, Charleston, SC (US)

( * ) Notice: Subject to any disclaimer, the term of this patent is extended or adjusted under 35 U.S.C. 154(b) by 0 days.

(21) Appl. No.: 19/197,754

(22) Filed: May 2, 2025

(65) Prior Publication Data
US 2025/0278526 A1 Sep. 4, 2025

Related U.S. Application Data

(63) Continuation of application No. PCT/US2024/014030, filed on Feb. 1, 2024.
(Continued)

(51) Int. Cl.
*G06F 30/10* (2020.01)
*G06F 111/20* (2020.01)

(52) U.S. Cl.
CPC .......... *G06F 30/10* (2020.01); *G06F 2111/20* (2020.01)

(58) Field of Classification Search
CPC .............. G06F 30/10; G06F 2111/20
See application file for complete search history.

(56) References Cited

U.S. PATENT DOCUMENTS 6,341,291 B1 * 1/2002 Bentley ............... G06F 16/21
707/999.203
10,366,099 B1 * 7/2019 Sowa ............... G06F 16/27
(Continued)

OTHER PUBLICATIONS

Chul Kim, Byung, Duhwan Mun, and Soonhung Han. "Web service with parallel processing capabilities for the retrieval of CAD assembly data." Concurrent Engineering 19.1 (2011): 5-18. (Year: 2011).*
(Continued)

*Primary Examiner* — David A Hopkins
(74) *Attorney, Agent, or Firm* — American Patent Agency PC; Daniar Hussain; Stephen M. Hou

(57) ABSTRACT

A digital documentation system for preparation of engineering documents utilizing one or more artificial intelligence (AI) algorithms is provided. The system includes a user interface for selecting and populating templates with data, and one or more AI algorithms for creating and recommending templates, and preparing documents based on the recommended templates. The system uses natural language processing and semantic analysis algorithms to understand the content of the templates, documents, and associated engineering data, and to generate and recommend relevant templates to the user based on user prompts. The system also uses machine learning and predictive modeling and decision-tree algorithms to assist with the preparation of documents, by generating suggestions for data fields and values based on the user's previous inputs and the overall context of the document and available engineering data, including model data and metadata from digital models accessed in a zero-trust framework.

20 Claims, 31 Drawing Sheets

Related U.S. Application Data

(60) Provisional application No. 63/516,624, filed on Jul. 31, 2023, provisional application No. 63/511,583, filed on Jun. 30, 2023, provisional application No. 63/451,577, filed on Mar. 11, 2023, provisional application No. 63/442,659, filed on Feb. 1, 2023.

(56) References Cited

U.S. PATENT DOCUMENTS

| | | | |
|---|---|---|---|
| 12,333,228 B1* | 6/2025 | Roper, Jr. | G06F 8/36 |
| 2006/0041840 A1* | 2/2006 | Blair | G06Q 40/00 715/234 |
| 2014/0214758 A1 | 7/2014 | Tripathi et al. | |
| 2016/0098494 A1* | 4/2016 | Webster | G06F 30/00 703/1 |
| 2018/0018634 A1 | 1/2018 | Satagopan et al. | |
| 2021/0312311 A1 | 10/2021 | Bowden, Jr. et al. | |
| 2021/0397171 A1* | 12/2021 | Sayyarrodsari | G05B 19/41885 |
| 2025/0165226 A1* | 5/2025 | Roper, Jr. | G06N 3/105 |

OTHER PUBLICATIONS

Clark, Jillian E., et al. "Digital Rights Management for Technical Data Packages." (2022). Accessed electronically via the United States Defense Technical Information Center (DTIC). (Year: 2022).*

Dou, Wanfeng, Xiaodong Song, and Tao Peng. "Transformation of operation commands among CAD systems in synchronized collaborative design." The 2010 14th International Conference on Computer Supported Cooperative Work in Design. IEEE, 2010 ( Year: 2010).*

Dou, Wanfeng, Xiaodong Song, and Xiaoyong Zhang. "Design and Implementation of Synchronized Collaborative System upon Heterogeneous CAD Systems." Journal of Algorithms & Computational Technology 5.3 (2011): 451-473 (Year: 2011).*

Fang, Cuihao, et al. "Multi-level access control for collaborative CAD." Proceedings of the Ninth International Conference on Computer Supported Cooperative Work in Design, 2005.. vol. 1. IEEE, 2005. Abstract and § 3. (Year: 2005).*

Jeon, Sang Min, et al. "Automatic CAD model retrieval based on design documents using semantic processing and rule processing. " Computers in Industry 77 (2016): 29-47 (Year: 2016).*

John Yannakopoulos, "HTTP/1.0 Methods", 2003, DePaul University; URL: condor(dot)depaul(dot)edu/dmumaugh/readings/handouts/SE435/HTTP/node12 (Year: 2003).*

Kao, Yung-Chou, and Grier CI Lin. "Development of a collaborative CAD/CAM system." Robotics and Computer-Integrated Manufacturing 14.1 (1998): 55-68. (Year: 1998).*

Kim, Byung Chul, Duhwan Mun, and Soonhung Han. "Retrieval of CAD model data based on Web Services for collaborative product development in a distributed environment." The International Journal of Advanced Manufacturing Technology 50.9 (2010): 1085-1099 (Year: 2010).*

Kim, Byungchul, and Soonhung Han. "Integration of history-based parametric translators using the automation APIs." International Journal of Product Lifecycle Management 2.1 (2007): 18-29. (Year: 2007).*

Kim, Taeseong, et al. "Multi-level modeling and access control for data sharing in collaborative design." Advanced Engineering Informatics 20.1 (2006): 47-57. (Year: 2006).*

Schucher, Nathan. On the Compute and Parameter Efficient Fine-Tuning of Large Language Models. McGill University (Canada), 2022 (Year: 2022).*

Shen, Lianguan, et al. "Collaborative 3D Cad system for multiple user design." The 2010 14th International Conference on Computer Supported Cooperative Work in Design. IEEE, 2010. Abstract and §§ I-III (Year: 2010).*

Wu et al., "Automation API Supports Revit Cloud Model", Oct. 2022, Blog Posting from AUTODESK, URL: aps(dot)autodesk(dot)com/blog/design-automation-api-supports-revit-cloud-model (Year: 2022).*

Benyo, T. "Project Integration Architecture (PIA) and Computational Analysis Programming Interface (CAPRI) for accessing geometry data from CAD files." 40th AIAA Aerospace Sciences Meeting & Exhibit. 2002. (Year: 2002).*

International Search Report and Written Opinion of PCT Application No. PCT/US2024/014030, mailed on May 21, 2024.

International Preliminary Report on Patentaibility of PCT Application No. PCT/US2024/014030, mailed on Feb. 25, 2025.

Li et al., "Real-Time Collaborative Design With Heterogeneous CAD Systems Based on Neutral Modeling Commands", Journal of Computing and Information Science in Engineering, vol. 7, Issue 2, Jun. 1, 2007, pp. 113-125.

* cited by examiner 3130  3120  3104  3122  3102  3112  3106  3124  3110

🔒 defenseairplaneistari.app/iivedocs/alsf8j99 e.airplane.istari.app|orvilie.wright@airplane.com|9.34.80.152|istari-version-1.0.1.2|99d7ab    LEVEL 1 istari                    🔍 Search for your model...                               Orville
                                                                                    Airplane Inc.

◁ All Files › 📄 Airworthiness_Plan_110-1.1.docx  Level 1 ⋮  🔒 Private  Aug 7, 2023, 9:45AM       Access   Export ⌄

≡ Outline  ⛓ Thread                    Airworthiness Plan for Unmanned           All Comments (0)   as .PDF
                                            Aerial Vehicle                                          as .HTML
> [H1] Airworthiness Plan for Un...  [L1]                                                               </> as code (.ipynb)
∨ [H2] 1. Introduction              [L1] ○   1. Introduction
   📄 File [Level 1]                          This airworthiness plan outlines the necessary            No comments yet
      Heading_1_Introduction.xml              steps and criteria to ensure the unmanned aerial          ( 💬 New Comment )
   ↩ Derived from [Level 1]                   vehicle (UAV) meets all safety and operational
      Airworthiness_Plan_110-1.1.d...         standards. It serves as a comprehensive guide for
   ☁ Domain [Level 1]                         design, testing, operation, and maintenance of the
      defense.airplane.istari.app             UAV, focusing on commercial surveillance
   🕐 Last Update                             applications. The plan adheres to the Federal
      Jan 28, 2024, 9:45 AM                   Aviation Administration (FAA) regulations for UAVs,
           ( Update )                         ensuring compliance with national airspace
                                              requirements.
> [T] This airworthiness plan ou... [L1]
> [H2] 2. UAV Description           [L1]      2. UAV Description
> [T] The UAV is designed as ...    [L1]      ┌─────────────────────────────────────────────┐
> [H2] 3. Design and Constructio..  [L1]      │ The UAV is designed as a quadcopter, featuring a │
> [T] The UAV employs carbon ..     [L1]      │ lightweight composite frame, four electric motors, │
> 🖼 UAV_FlightEnvelope.jpg         [L1]      │ and a lithium-polymer battery pack, optimized for │
> [H2] 4. Performance and Flight .. [L1]      │ stability and energy efficiency. Key components  │
> [T] Performance benchmarks ..     [L1]      │ include a GPS navigation system, real-time       │
> [H2] 5. Maintenance and Inspec.   [L1]      │ communication link, onboard camera, and an      │
> [T] A preventive maintenance..    [L1]      │ autopilot system with collision avoidance. It boasts │
                                              │ a maximum range of 10 km, a cruising altitude of │
         ( Update All )                       │ 400 feet, a top speed of 50 km/h, and a payload │
                                              │ capacity of 2 kg.                                │
                                              └─────────────────────────────────────────────┘

3. Design and Construction Standards
                                              The UAV employs carbon fiber and aircraft-grade
                                              aluminum for strength and weight efficiency,
                                              complying with aerospace standards. The design
                                              has been rigorously tested for resilience under
                                              various stress conditions. Critical systems like
                                              navigation and communication feature redundancy
                                              to ensure safety in case of single point failures.

4. Performance and Flight Characteristics
                                              Performance benchmarks set include a maximum
                                              endurance of 2 hours, a service ceiling of 1200 feet,
                                              and the ability to operate in light rain and wind.
                                              The UAV has undergone extensive flight testing in
                                              controlled environments and stress tests under
                                              adverse conditions. It demonstrates stable flight
                                              characteristics in various modes, including hover,
                                              cruise, and agile maneuvers.

3132        3140                FIG. 31                  3150

ARTIFICIAL INTELLIGENCE (AI) ASSISTED DIGITAL DOCUMENTATION FOR DIGITAL ENGINEERING

REFERENCE TO RELATED APPLICATIONS

If an Application Data Sheet ("ADS") or PCT Request Form ("Request") has been filed on the filing date of this application, it is incorporated by reference herein. Any applications claimed on the ADS or Request for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

Furthermore, this application is related to the U.S. patent applications listed below, which are incorporated by reference in their entireties herein, as if fully set forth herein:

U.S. provisional patent application No. 63/442,659, filed on Feb. 1, 2023, entitled "AI-Assisted Digital Documentation for Digital Engineering with Supporting Systems and Methods," describes AI-assistance tools for digital engineering (DE), including modeling and simulation applications, and the certification of digitally engineered products.

U.S. provisional patent application No. 63/451,545, filed on Mar. 10, 2023, entitled "Digital Threads in Digital Engineering Systems, and Supporting AI-Assisted Digital Thread Generation," describes model splicer and digital threading technology.

U.S. provisional patent application No. 63/451,577, filed on Mar. 11, 2023, entitled "Model Splicer and Microservice Architecture for Digital Engineering," describes model splicer technology.

U.S. provisional patent application No. 63/462,988, filed on Apr. 29, 2023, also entitled "Model Splicer and Microservice Architecture for Digital Engineering," describes model splicer technology.

U.S. provisional patent application No. 63/511,583, filed on Jun. 30, 2023, entitled "AI-Assisted Model Splicer Generation for Digital Engineering," describes model splicer technology with AI-assistance.

U.S. provisional patent application No. 63/516,624, filed on Jul. 31, 2023, entitled "Document and Model Splicing for Digital Engineering," describes document splicer technology.

U.S. provisional patent application No. 63/520,643, filed on Aug. 20, 2023, entitled "Artificial Intelligence (AI)-Assisted Automation of Testing in a Software Environment," describes software testing with AI-assistance.

U.S. provisional patent application No. 63/590,420, filed on Oct. 14, 2023, entitled "Commenting and Collaboration Capability within Digital Engineering Platform," describes collaborative capabilities.

U.S. provisional patent application No. 63/586,384, filed on Sep. 28, 2023, entitled "Artificial Intelligence (AI)-Assisted Streamlined Model Splice Generation, Unit Testing, and Documentation," describes streamlined model splicing, testing and documentation with AI-assistance.

U.S. provisional patent application No. 63/470,870, filed on Jun. 3, 2023, entitled "Digital Twin and Physical Twin Management with Integrated External Feedback within a Digital Engineering Platform," describes digital and physical twin management and the integration of external feedback within a DE platform.

U.S. provisional patent application No. 63/515,071, filed on Jul. 21, 2023, entitled "Generative Artificial Intelligence (AI) for Digital Engineering," describes an AI-enabled digital engineering task fulfillment process within a DE software platform.

U.S. provisional patent application No. 63/517,136, filed on Aug. 2, 2023, entitled "Machine Learning Engine for Workflow Enhancement in Digital Engineering," describes a machine learning engine for model splicing and DE script generation.

U.S. provisional patent application No. 63/516,891, filed on Aug. 1, 2023, entitled "Multimodal User Interfaces for Digital Engineering," describes multimodal user interfaces for DE systems.

U.S. provisional patent application No. 63/580,384, filed on Sep. 3, 2023, entitled "Multimodal Digital Engineering Document Interfaces for Certification and Security Reviews," describes multimodal user interfaces for certification and security reviews.

U.S. provisional patent application No. 63/613,556, filed on Dec. 21, 2023, entitled "Alternative Tool Selection and Optimization in an Integrated Digital Engineering Platform," describes tool selection and optimization.

U.S. provisional patent application No. 63/584,165, filed on Sep. 20, 2023, entitled "Methods and Systems for Improving Workflows in Digital Engineering," describes workflow optimization in a DE platform.

U.S. provisional patent application No. 63/590,456, filed on Oct. 15, 2023, entitled "Data Sovereignty Assurance for Artificial Intelligence (AI) Models," relates to data sovereignty assurance during AI model training and evaluation.

U.S. provisional patent application No. 63/606,030, filed on Dec. 4, 2023, also entitled "Data Sovereignty Assurance for Artificial Intelligence (AI) Models," further details data sovereignty assurances during AI model training and evaluation.

U.S. provisional patent application No. 63/419,051, filed on Oct. 25, 2022, entitled "Interconnected Digital Engineering and Certification Ecosystem."

U.S. non-provisional patent application Ser. No. 17/973,142 filed on Oct. 25, 2022, entitled "Interconnected Digital Engineering and Certification Ecosystem."

U.S. non-provisional patent application Ser. No. 18/383,635, filed on Oct. 25, 2023, entitled "Interconnected Digital Engineering and Certification Ecosystem."

U.S. provisional patent application No. 63/489,401, filed on Mar. 9, 2023, entitled "Security Architecture for Interconnected Digital Engineering and Certification Ecosystem."

NOTICE OF COPYRIGHTS AND TRADEDRESS

A portion of the disclosure of this patent document contains material which is subject to copyright protection. This patent document may show and/or describe matter which is or may become tradedress of the owner. The copyright and tradedress owner has no objection to the facsimile reproduction by anyone of the patent disclosure as it appears in the U.S. Patent and Trademark Office files or records, but otherwise reserves all copyright and tradedress rights whatsoever.

ISTARI DIGITAL is a trademark name carrying embodiments of the present invention, and hence, the aforementioned trademark name may be interchangeably used in the specification and drawings to refer to the products/process offered by embodiments of the present invention. The terms ISTARI and ISTARI DIGITAL may be used in this specification to describe the present invention, as well as the company providing said invention.

FIELD OF THE INVENTION

This disclosure relates to tools for digital engineering, including modeling and simulation applications, and the certification of digitally engineered products. Specifically, this disclosure relates to methods and systems for managing the documentation process within such ecosystems.

BACKGROUND OF THE INVENTION

The statements in the background of the invention are provided to assist with understanding the invention and its applications and uses, and may not constitute prior art.

Digital engineering tools, including modeling and simulation tools that accurately virtualize physical systems or processes for real-world decisions, enable iterative and effective development of components and/or systems. Certification of these components and/or systems, such as through the MIL-HDBK-516C Airworthiness Certification Criteria, may be complex and require thorough documentation throughout the various process steps and approval stages. Furthermore, certification still requires information and tests that largely occur in the physical world using physical manifestations of digitally engineered components and/or systems (sometimes referred to generally herein as "products"). Additionally, physical tests that have been completed for another effort or by another third-party stakeholder (e.g., supplier of a component) are often repeated because the third-party stakeholder may not be willing to share the full data from prior tests. This results in redundant physical tests that add cost and delays to development and certification efforts. Thorough documentation is essential for ensuring the accuracy and reliability of validation and certification processes and is required to receive certification for aircraft to be legally operated. However, much of this documentation cycle for large projects (e.g., aircraft certification) is currently paper-based and often written, collated, and reviewed manually (e.g., by a human), leading to inefficiency, wasted time and effort, and potential risks such as document revisions, data duplication, and poor project controls. Furthermore, physical documents have higher archiving costs. This is particularly the case when they must be archived securely. Finally, manual documentation processes are often error-prone, and difficult to track and manage.

By streamlining these processes, a digital system can greatly improve the efficiency and accuracy of the certification process (or other target outcomes), while also reducing the risks associated with manual documentation.

It is against this background that the present invention was developed.

BRIEF SUMMARY OF THE INVENTION

This summary of the invention provides a broad overview of the invention, its application, and uses, and is not intended to limit the scope of the present invention, which will be apparent from the detailed description when read in conjunction with the drawings.

Several enhancements may be made to current manual documentation workflows in digital engineering. One enhancement is the application of artificial intelligence (AI) and machine learning (ML) to offer recommendations for relevant documentation. AI and ML may also be used to assist with customizing documents, e.g., preparing documents that are filled for specific purposes. This boosts efficiency and repeatability of the process. Another enhancement is the use of zero-trust access control to system data, including highly confidential model data, used to populate the documents. Organizations with sensitive engineering data are reluctant to use a documentation system that could expose their models and proprietary data to security risks. The methodology described herein accomplishes the goal of seamless digital documentation processes for all stakeholders, while minimizing potential security risks to the sensitive underlying data.

A digital documentation management methodology and system linked to a digital engineering and certification ecosystem offers specific benefits. These benefits include increased productivity, enhanced risk management through document controls, and improved methods for managing the scale and breadth of documentation. Another benefit is that documents can be made more accurate and more internally consistent because the documents use the same source of truth. Finally, the ecosystem allows engineers to do what engineers do best, namely, design systems, by significantly reducing the amount of time spent on writing long reports. Such a system may encompass a wide range of functionality to meet a variety of certification (or other documentation) purposes across industries, and the AI-assisted functionality may promote document reuse and increased productivity.

In some embodiments, the methods and systems described herein enable the creation and maintenance of so-called live digital engineering (DE) documents. As discussed below, live DE documents are configured, through a digital thread, to be perpetually updated to reflect the most current changes within a DE workflow or a given digital twin configuration. In particular, an authoritative live DE document is configured to reflect the latest authoritative configuration. The "printing" of a live DE document corresponds to the generation of a static time-stamped version of a live DE document. Therefore, "printing" of a live DE document may be viewed as equivalent to "instantiation" for a digital twin (see FIG. 1).

Live DE documents may also be known as magic documents, as changes implemented within a digital twin configuration (e.g., through a modification of a DE model file) may appear automatically within the relevant data fields and sections of the live DE document without significant time delay. Similarly, authoritative live DE documents may also be known as authoritative magic documents as they perpetually reflect the authoritative source of truth, as discussed in more detail below.

Accordingly, various methods, processes, systems, and non-transitory storage medium storing program code for executing processes for generating DE document files in a digital documentation system, are provided. In various embodiments, the digital documentation system retrieves recommended templates; receives a user selection of a template; retrieves model data (optionally via a model splice), system data, and/or metadata to populate into the template; and generates a document from the selected template using the retrieved data. The digital documentation system may itself be integrated into an Integrated Digital Engineering Platform (IDEP).

According to a first aspect or in one embodiment, a non-transitory physical storage medium storing program code is provided. The program code is executable by a hardware processor. The hardware processor when executing the program code causes the hardware processor to execute a computer-implemented process for generating a digital engineering (DE) document file. The program code comprises code that may retrieve one or more DE document templates from a DE document template library. The template library may comprise DE document templates for one or more phases of a DE product life cycle, where the DE document templates comprise DE data fields. The program code may comprise code to receive a user input from a user. The program code may comprise code to determine a selected DE document template from the one or more DE document templates based on the user input. The program code may comprise code to retrieve a model data from a model splice via a common, externally-accessible Application Programming Interface (API). The model data may be retrieved based on the selected DE document template. The model splice may be generated from a DE model file of a DE model type. The model splice may provide access to selective model data within the DE model file without exposing an entirety of the DE model file. The model splice may provide access control to the model data based on access permissions of the user. The model splice may provide the DE model with the common, externally-accessible API. The program code may comprise code to execute a generator engine to generate the DE document file from the selected DE document template, utilizing the model data from the DE model file retrieved via the model splice.

In one embodiment, the non-transitory physical storage medium further comprises program code to generate the model splice for the DE model file. The program code to generate the model splice may comprise program code to receive the DE model file of the DE model type in a source file format. The program code to generate the model splice may comprise code to extract data from the DE model file into one or more model data files associated with the DE model type. The program code to generate the model splice may comprise code to generate one or more API function scripts for the common, externally-accessible API, based on the user input, to be applied to the one or more model data files. The program code to generate the model splice may comprise code to generate the model splice from the one or more model data files and the one or more API function scripts, based on the user input. The retrieval of the model data may comprise invocation of at least one API function script of the model splice. Utilizing the model data may comprise populating the selected DE document template with the model data.

In one embodiment, the model splice provides access control. Accordingly, in one embodiment, the one or more model data files are stored within a customer-controlled storage bucket with a zero-trust access control.

In one embodiment, the model splice enables interoperability of model types and/or tools. Accordingly, in one embodiment, the DE model file is a first DE model file, and the first DE model file is accessible through the common, externally-accessible API along with a second DE model file of a second DE model type that is not already interoperable with the first DE model file of the DE model type.

In one embodiment, the model splice enables orchestration scripts. Accordingly, in one embodiment, the retrieval of the retrieved model data is performed via an orchestration script using the common, externally-accessible API.

In one embodiment, automatic updates from model data changes to documentation files enable live or magic documents. Accordingly, in one embodiment, the non-transitory physical storage medium further comprises program code to receive one or more modifications to the model data related to the DE document file from the DE model file via the model splice. The non-transitory physical storage medium may further comprise program code to update one or more portions of the DE document file based on the one or more modifications to the model data.

In one embodiment, dynamic updates may enable the live or magic documents. Accordingly, in one embodiment, the DE document file may be part of an interconnected digital engineering platform (an IDEP), and the generator engine may have access to the model data via the model splice and the one or more DE document templates to generate and/or update the DE document file. The non-transitory physical storage medium may further comprise program code to dynamically update the DE document file using at least one software-defined digital thread in the IDEP with program code to receive user interactions dynamically from the user. Responsive to the user interacting with the IDEP and performing a first modification to the model data in the DE model and/or a second modification to a parameter setting in the IDEP, said first modification and/or the second modification may be propagated through the at least one software-defined digital thread to an associated DE documentation comprising the DE document file. The program code may further comprise program code to execute the generator engine to generate and/or update the DE document file (and the associated DE documentation, for example in the form of sentences, paragraphs, and whole documents).

In one embodiment, the digital documentation system enables "printing" a digital twin. The digital documentation system may enable "digital twin" documentation of a physical product or process. Accordingly, in one embodiment, the DE document file is a live DE document file associated with a digital twin configuration of a physical twin. The non-transitory physical storage medium may further comprise program code to receive a predetermined timestamp. The non-transitory physical storage medium may further comprise program code to generate a printed DE document file corresponding to a static, time-stamped version of the DE document file at the predetermined timestamp.

In one embodiment, the digital documentation system enables "printing" an updated digital twin. Accordingly, in one embodiment, the non-transitory physical storage medium further comprises program code to detect a first modification of the DE model file or a second modification of a software-defined digital thread associated with the DE model file. The non-transitory physical storage medium may further comprise program code to update one or more data fields of the DE document file based on the first modification or the second modification responsive to the first modification or the second modification. The non-transitory physical storage medium may further comprise program code to generate an updated printed DE document file with the one or more data fields based on the DE document file.

In one embodiment, the digital documentation system receives user approval or feedback on the digital documentation. Accordingly, in one embodiment, the non-transitory physical storage medium further comprises program code to receive a second user input related to an approval and/or feedback data on the DE document file during the one or more phases of the DE product lifecycle, where the approval and/or feedback data may comprise data related to an approval decision from a second user.

In one embodiment, the digital documentation system includes a document update engine (or the generator engine acts as the document update engine) to update the DE document file based on user feedback. Accordingly, in one embodiment, the non-transitory physical storage medium further comprises program code to receive user feedback data on the DE document file. The user feedback data may comprise data related to user feedback on the DE document file. The non-transitory physical storage medium may further comprise program code to update the DE document file to generate an updated DE document file, utilizing the generator engine or the document update engine, based on the user feedback data.

In one embodiment, the document update engine and/or the generator engine are trained and/or fine-tuned based on user feedback. Accordingly, in one embodiment, the non-transitory physical storage medium further comprises program code to train and/or fine-tune the generator engine on the user feedback data and the updated DE document file. In some embodiments, the generator engine acts as the document update engine.

In one embodiment, a recommender engine recommends one or more templates to the user for selection. Accordingly, in one embodiment, the non-transitory physical storage medium further comprises program code to execute a recommender engine to recommend one or more recommended DE document templates from the one or more DE document templates, where the one or more recommended DE document templates may comprise template data and/or metadata that match the user input within a predetermined confidence level. The selected DE document template may be selected from the one or more recommended DE document templates based on the user input.

In one embodiment, the recommender engine comprises natural language processing and semantic analysis algorithms to understand content of the one or more DE document templates. The recommender engine may recommend and/or generate the one or more recommended DE document templates to the user based on the user input.

In one embodiment, the recommender engine comprises a recommender machine learning (ML) model. In one embodiment, the recommender ML model comprises program code to recommend and/or generate the one or more recommended DE document templates to the user based on the user input.

In one embodiment, the recommender engine comprises a recommender ML model that is trained on user profile data and template metadata. The recommender ML model may recommend the one or more recommended DE document templates from the one or more DE document templates based on the training.

In one embodiment, the recommender engine may comprise a clustering ML algorithm to cluster similar templates. The recommender engine may execute a classifier ML algorithm based on user profile metadata and the user input.

In one embodiment, the recommender engine may comprise a content-filtering and collaborative-filtering-based ML algorithm to recommend the one or more recommended DE document templates.

In one embodiment, the recommender engine may comprise a Markov Chain Monte Carlo (MCMC) model. The MCMC model may select subsets of DE document templates based on a probability of acceptance for documentation requirements. In one embodiment, the recommender engine comprises a Hidden Markov model (HMM).

In one embodiment, the recommender engine may comprise a Large Language Model (LLM) model. The LLM may be fine-tuned with an ontology of documentation requirements, and the LLM may recommend the one or more recommended DE document templates based on the user input.

In some embodiments, the recommender engine is trained and/or fine-tuned based on user template selections. Accordingly, in one embodiment, the non-transitory physical storage medium further comprises program code to generate training data comprising the one or more recommended DE document templates from the recommender engine and the selected DE document template from the user. The non-transitory physical storage medium may further comprise program code to train and/or fine-tune the recommender engine on the training data to improve future DE document templates recommended by the recommender engine.

In one embodiment, the generator engine comprises predictive modeling and decision-tree algorithms to generate the DE document file. The generator engine may generate the DE document file by generating suggestions for data fields and values based on the user input and an overall context of the DE document file.

In one embodiment, the generator engine comprises a generator machine learning (ML) model to generate the DE document file. The generator engine may generate the DE document file by generating suggestions for data fields and values based on the first user input and an overall context of the DE document file.

In one embodiment, the generator engine comprises a generator machine learning (ML) model.

In one embodiment, the generator engine comprises a generative-AI-based model, for example, a Large Language Model (LLM) model.

In one embodiment, the generator engine comprises an LLM fine-tuned on an ontology of documentation requirements. The generator engine may generate and/or update the DE document file based on the user input. The generator engine may use model data, or other system data or metadata, to generate and/or update data fields in the DE document file.

In one embodiment, the generator engine comprises a LLM fine-tuned using IDEP system metadata for model splice creation, where the model splice links machine-readable system data into human-readable documentation.

In one embodiment, the generator engine comprises a non-generative-AI-based model.

In one embodiment, the generator engine comprises a rule-based algorithm. The rule-based algorithm may use a domain-specific language (DSL) that updates the DE document file using examples of prior, related documents.

In some embodiments, the generator engine is trained and/or fine-tuned based on metrics from user feedback data. Accordingly, in one embodiment, the non-transitory physical storage medium further comprises program code to receive user feedback data related to the DE document file generated by the generator engine from the user. The non-transitory physical storage medium may further comprise program code to generate feedback metrics related to a quality of the DE document file generated by the generator engine. The non-transitory physical storage medium may further comprise program code to train and/or fine-tune the generator engine utilizing the feedback metrics to improve future DE document files generated by the generator engine.

In some embodiments, the generator engine may be trained and/or fine-tuned based on document edits from the user. Accordingly, in one embodiment, the non-transitory physical storage medium further comprises program code to generate training data comprising a plurality of DE document files from the generator engine and document edits made to the plurality of DE document files by the user; and train and/or fine-tune the generator engine on the training data.

In a second aspect or in another embodiment, a digital documentation system for generating a digital engineering (DE) document file is provided. The digital documentation system comprises at least one hardware processor, and at least one non-transitory physical storage medium storing program code. The program code is executable by the at least one hardware processor. The at least one hardware processor when executing the program code causes the at least one hardware processor to execute a computer-implemented process for generating the digital engineering (DE) document file. The program code may comprise code to retrieve one or more DE document templates from a DE document template library comprising DE document templates for one or more phases of a DE product lifecycle, where the DE document templates comprise DE data fields. The program code may comprise code to receive a user input from a user. The program code may comprise code to determine a selected DE document template from the one or more DE document templates based on the user input. The program code may comprise code to retrieve model data from a model splice via a common, externally-accessible Application Programming Interface (API). The model data may be retrieved based on the selected DE document template. The model splice may be generated from a DE model file of a DE model type. The model splice may provide access to selective model data within the DE model file without exposing an entirety of the DE model file. The model splice may provide access control to the model data based on an access permission of the user. The model splice may provide the DE model with the common, externally-accessible API. The program code may comprise code to execute a generator engine to generate the DE document file from the selected DE document template, utilizing the model data from the DE model file retrieved via the model splice.

Embodiments as set out for the first aspect apply equally to the second aspect.

In a third aspect or in yet another embodiment, a computer-implemented method for generating a digital engineering (DE) document file is provided. The method comprises retrieving one or more DE document templates from a DE document template library comprising DE document templates for one or more phases of a DE product life cycle, where the DE document templates comprise DE data fields. The method may comprise receiving a user input from a user. The method may further comprise determining a selected DE document template from the one or more DE document templates based on the user input. The method may further comprise retrieving a model data from a model splice via a common, externally-accessible Application Programming Interface (API). The model data may be retrieved based on the selected DE document template. The model splice may be generated from a DE model file of a DE model type. The model splice may provide access to selective model data within the DE model file without exposing an entirety of the DE model file. The model splice may provide access control to the model data based on an access permission of the user. The model splice may provide the DE model file with the common, externally-accessible API. The method may further comprise executing a generator engine to generate the DE document file from the selected DE document template, utilizing the model data from the DE model file retrieved via the model splice.

Embodiments as set out for the first aspect apply equally to the third aspect.

In various aspects and embodiments, a computer program product is disclosed. The computer program may be used for the generation of document files in a digital documentation system, and may include a computer-readable storage medium having program instructions, or program code, embodied therewith, the program instructions executable by a processor to cause the processor to perform the steps described herein.

In various aspects and embodiments, a system is described, including a memory that stores computer-executable components, and a hardware processor, operably coupled to the memory, and that executes the computer-executable components stored in the memory, where the computer-executable components may include components communicatively coupled with the processor that execute the steps described herein.

In another aspect or embodiment of the present invention, a non-transitory, computer-readable storage medium storing executable instructions is provided, which when executed by a processor, causes the processor to perform a process for the generation of document files in a digital documentation system, the instructions causing the processor to perform the steps described herein.

In another aspect or embodiment of the present invention, a system for digital documentation using a computing device is provided, the system comprising a user device having a processor, a display, a first memory; a server comprising a second memory and a data repository; a communications link between said user device and said server; and a plurality of computer codes embodied on said first and second memory of said user device and said server, said plurality of computer codes which when executed causes said server and said user device to execute a process comprising the steps described herein.

In yet another aspect or embodiment of the present invention, a computerized server is provided, comprising at least one processor, memory, and a plurality of computer codes embodied on said memory, said plurality of computer codes which when executed causes said processor to execute a process comprising the steps described herein. Other aspects and embodiments of the present invention include the methods, processes, and algorithms comprising the steps described herein, and also include the processes and modes of operation of the systems and servers described herein.

Features which are described in the context of separate aspects and/or embodiments of the invention may be used together and/or be interchangeable wherever possible. Similarly, where features are, for brevity, described in the context of a single embodiment, those features may also be provided separately or in any suitable sub-combination. Features described in connection with the non-transitory physical storage medium may have corresponding features definable and/or combinable with respect to a digital documentation system and/or method and/or system, or vice versa, and these embodiments are specifically envisaged.

Yet other aspects and embodiments of the present invention will become apparent from the detailed description of the invention when read in conjunction with the attached drawings.

BRIEF DESCRIPTION OF THE DRAWINGS

The accompanying drawings, which are incorporated in and constitute part of this specification, illustrate embodiments of the invention and together with the description, serve to explain the principles of the disclosed embodiments. For clarity, simplicity, and flexibility, not all elements, components, or specifications are defined in all drawings. Not all drawings corresponding to specific steps or embodiments of the present invention are drawn to scale.

Emphasis is instead placed on illustration of the nature, function, and product of the manufacturing method and devices described herein.

Figure 1:
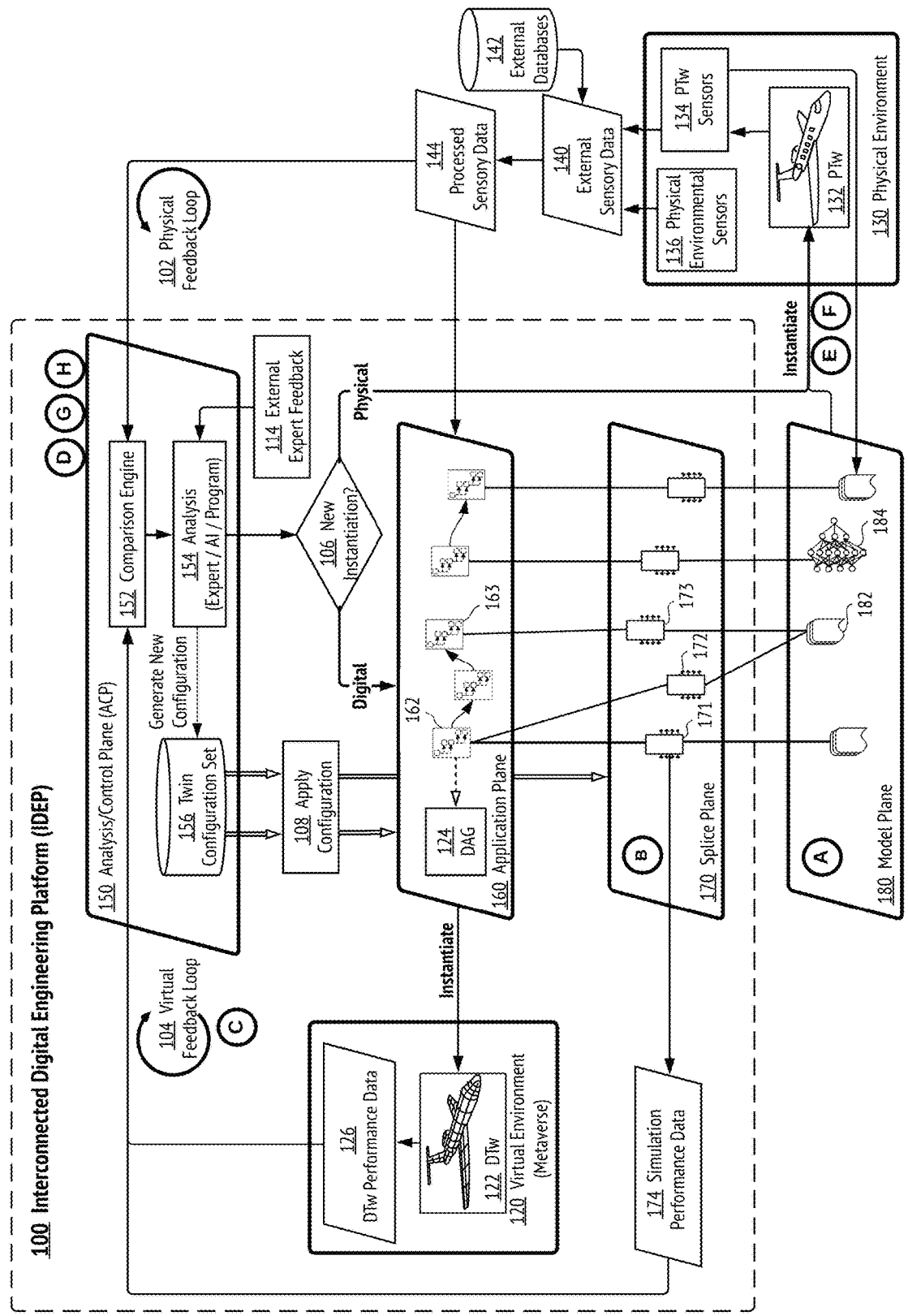

Embodiments of the present invention described herein are exemplary, and not restrictive. Embodiments will now be described, by way of examples, with reference to the accompanying drawings, in which:

FIG. 1 shows an exemplary interconnected digital engineering (IDEP) platform architecture, in accordance with some embodiments of the present invention.

Figure 2:
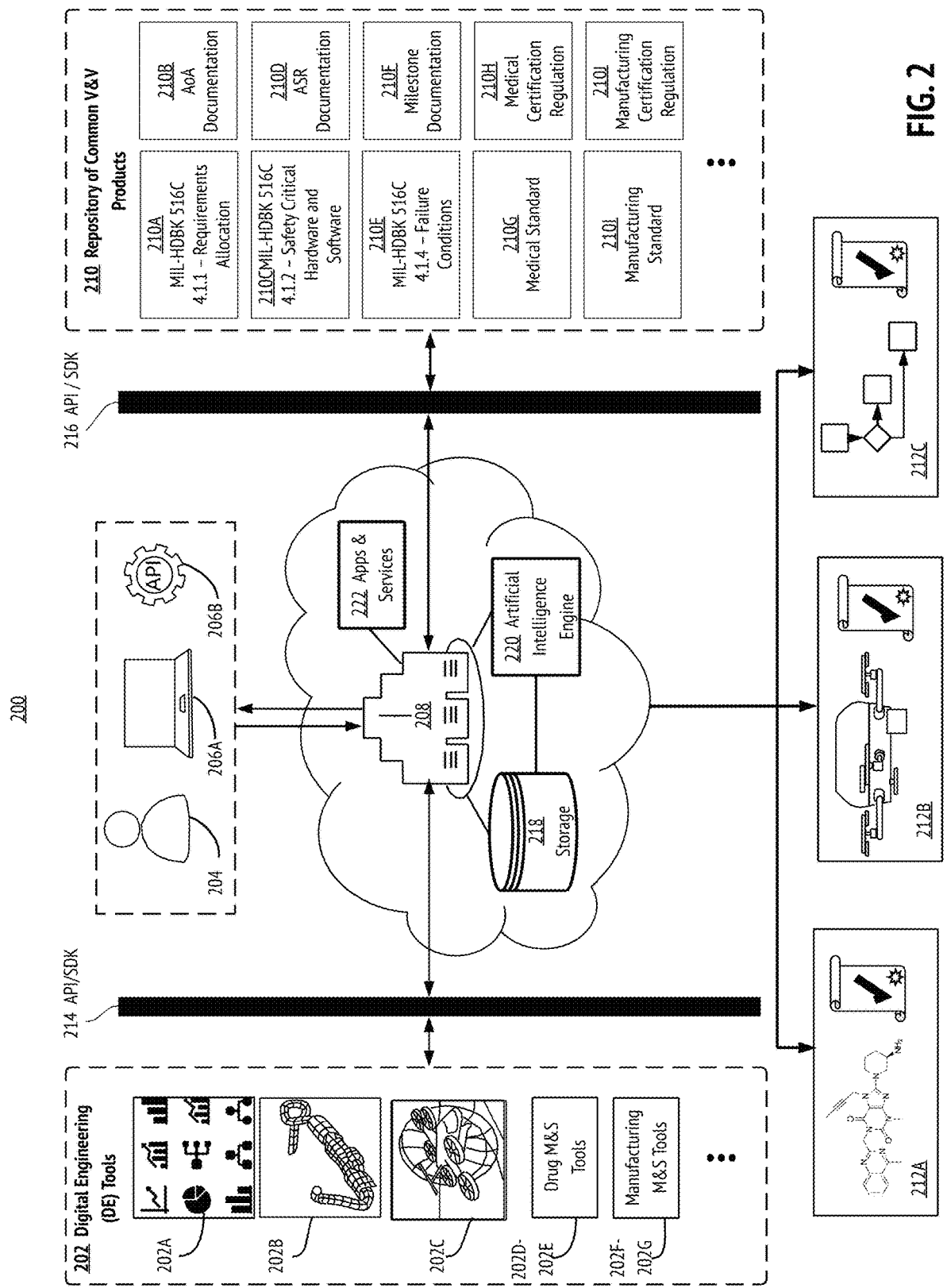

FIG. 2 shows an exemplary implementation of the IDEP as an interconnected digital engineering (DE) and certification ecosystem, and exemplary digitally certified products, in accordance with some embodiments of the present invention.

Figure 3:
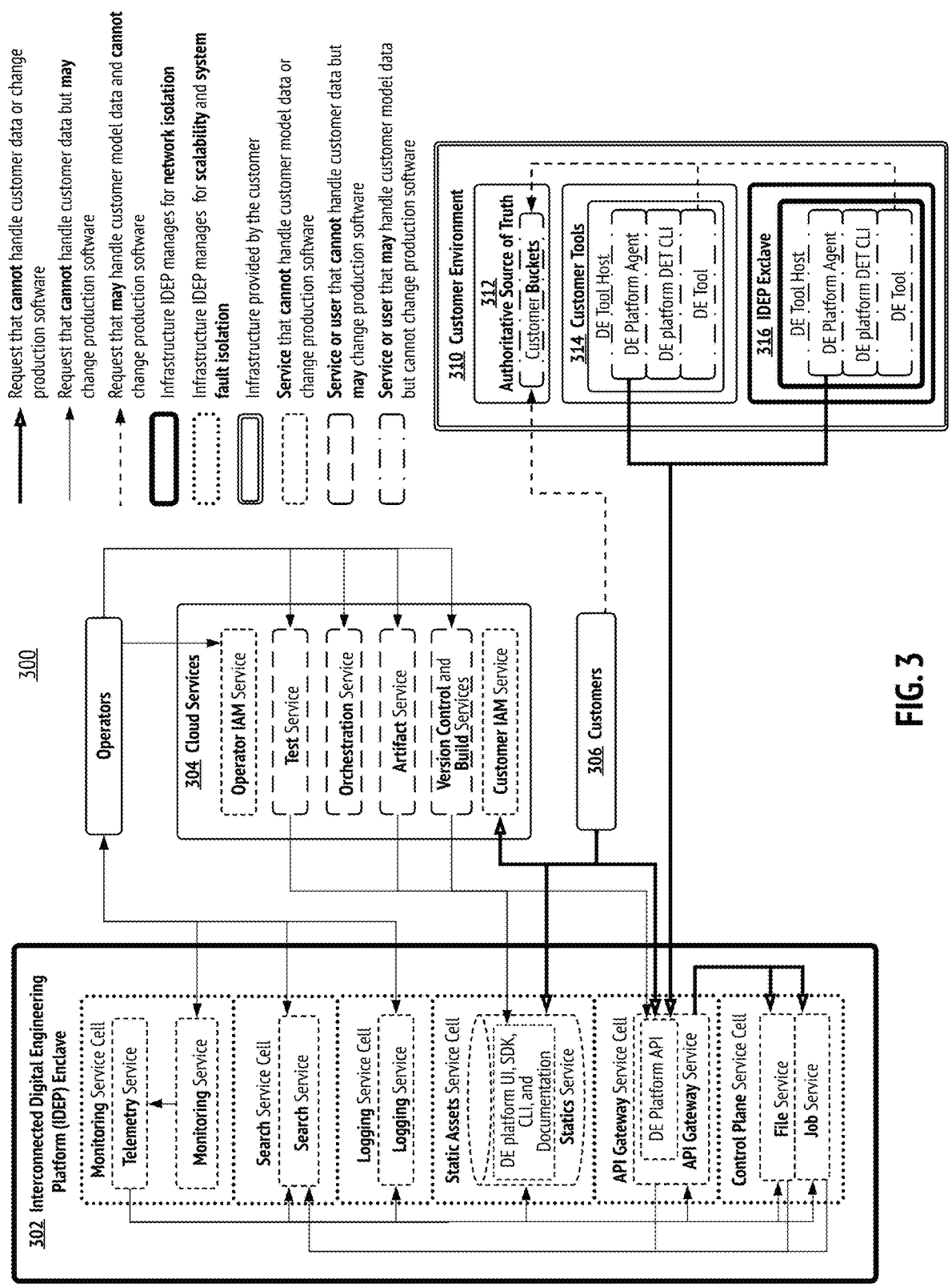

FIG. 3 shows another exemplary implementation of the IDEP illustrating its offered services and features, in accordance with some embodiments of the present invention.

Figure 4:
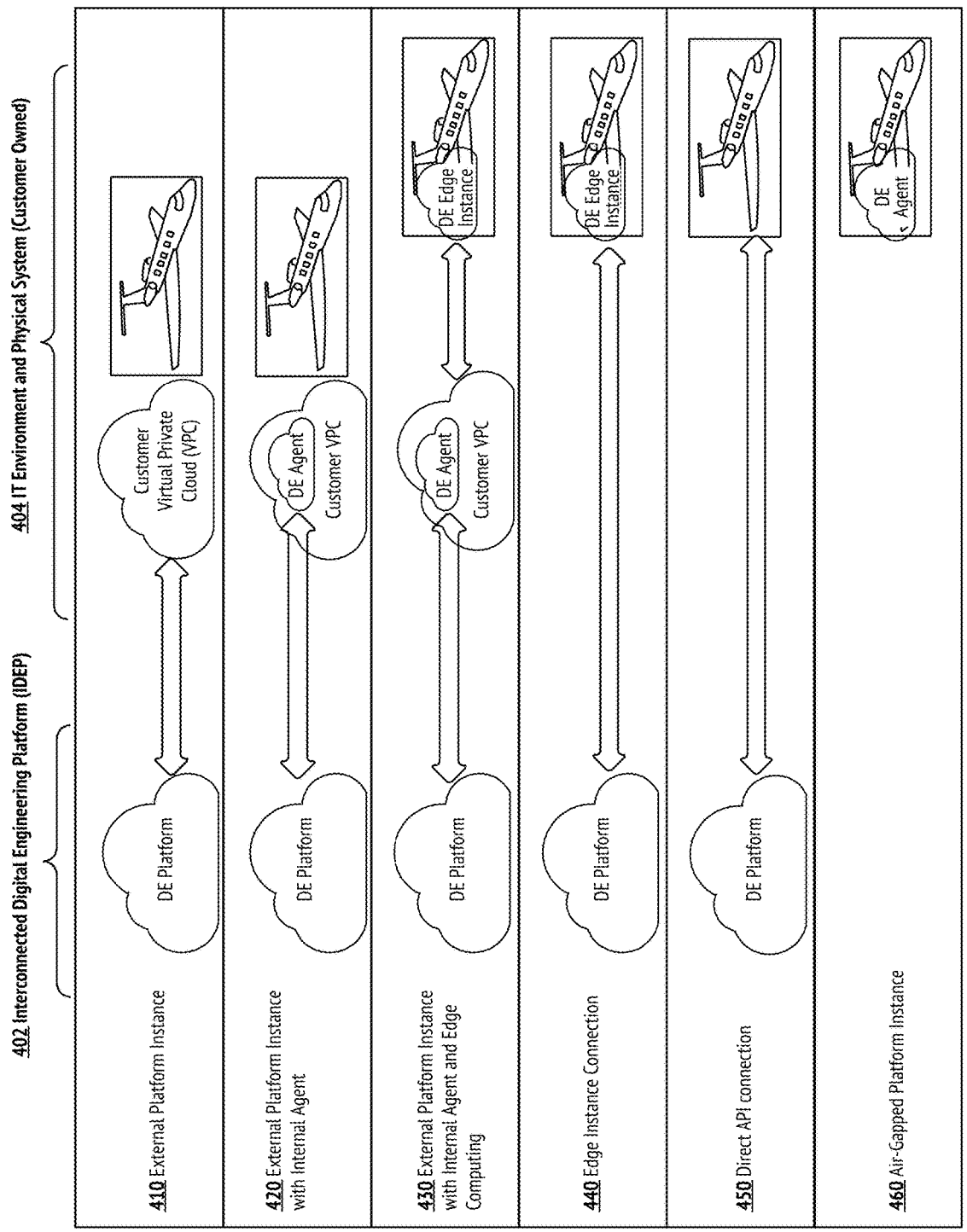

FIG. 4 shows potential scenarios for instantiating an IDEP in connection to a customer's physical system and IT environment, in accordance with some embodiments of the present invention.

Figure 5:
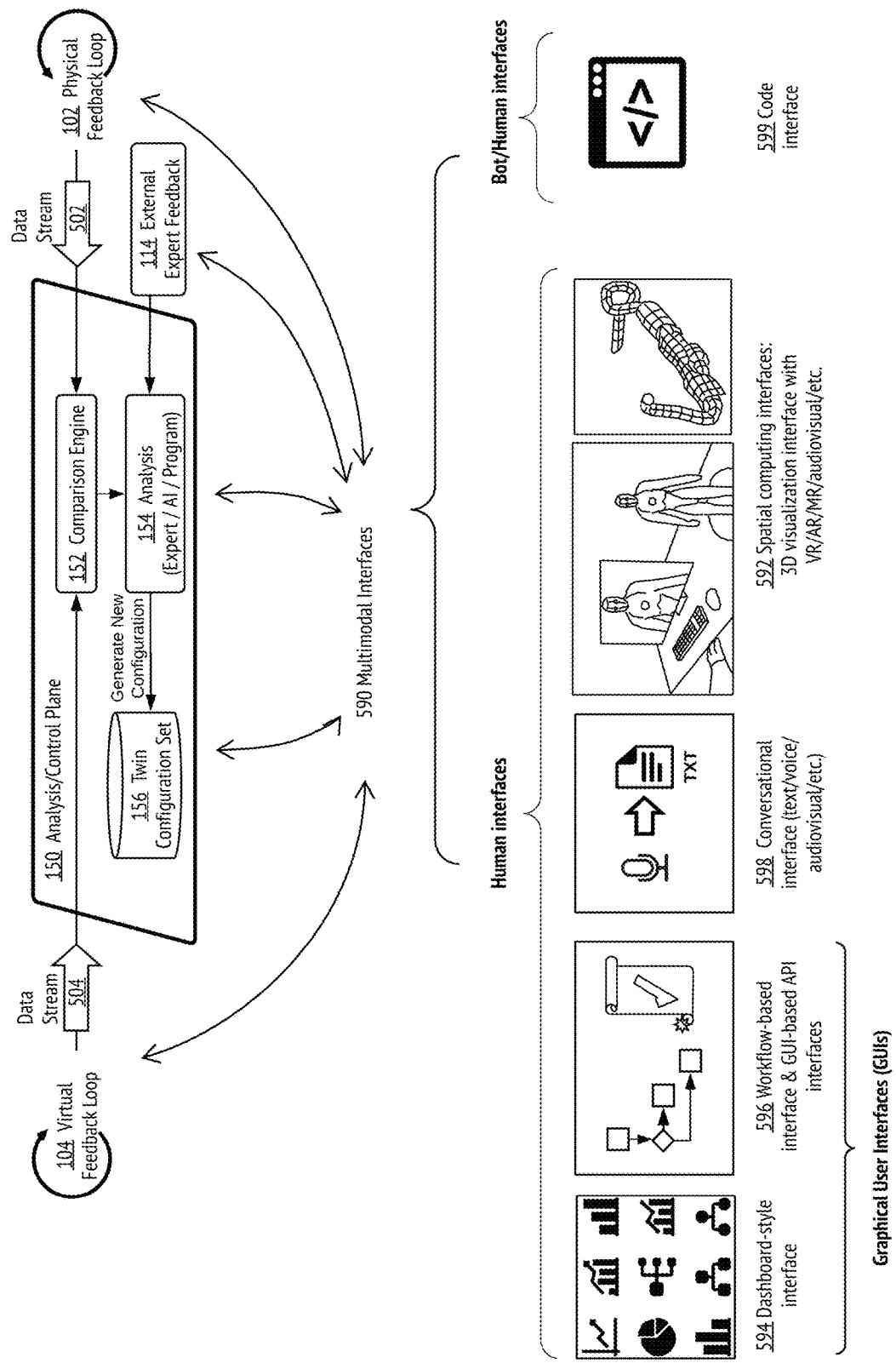

FIG. 5 shows exemplary multimodal interface designs for integration of feedback in am IDEP, in accordance with some embodiments of the present invention.

Figure 6:
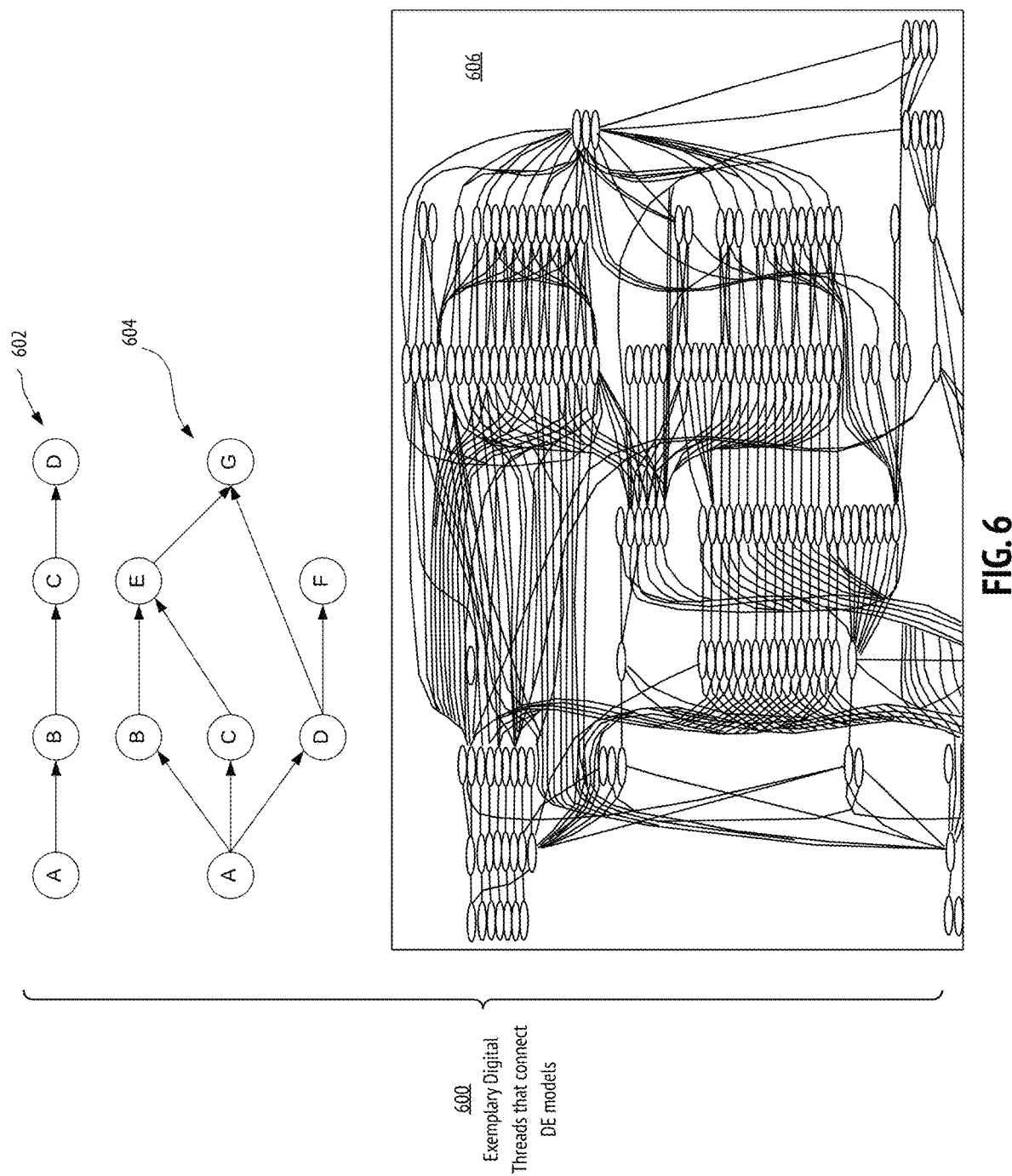

FIG. 6 is a schematic diagram comparing exemplary digital threads that connect DE models, in accordance with some embodiments of the present invention.

Figure 7:
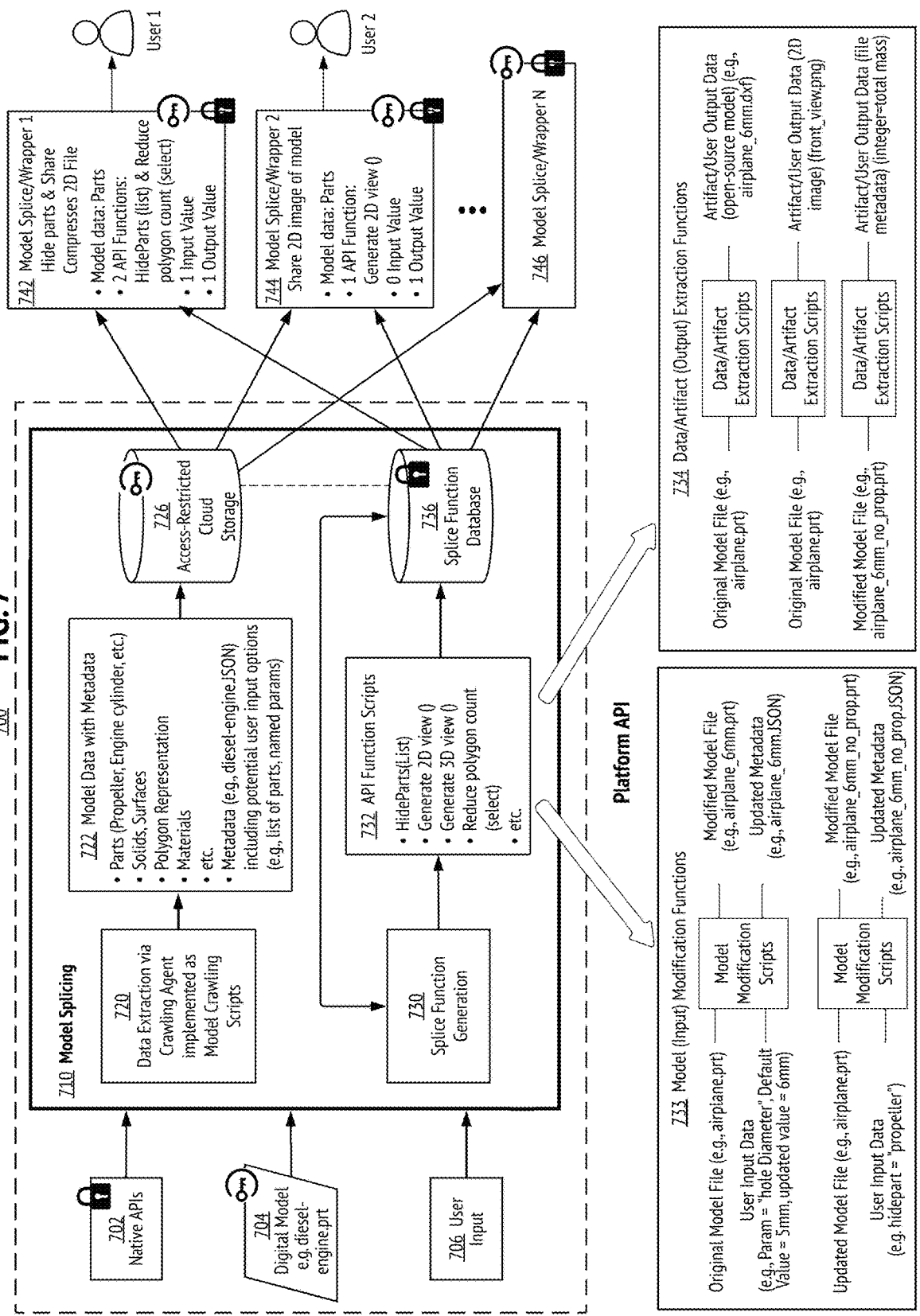

FIG. 7 is a schematic showing an exemplary DE model splicing setup, according to some embodiments of the present invention.

Figure 8:
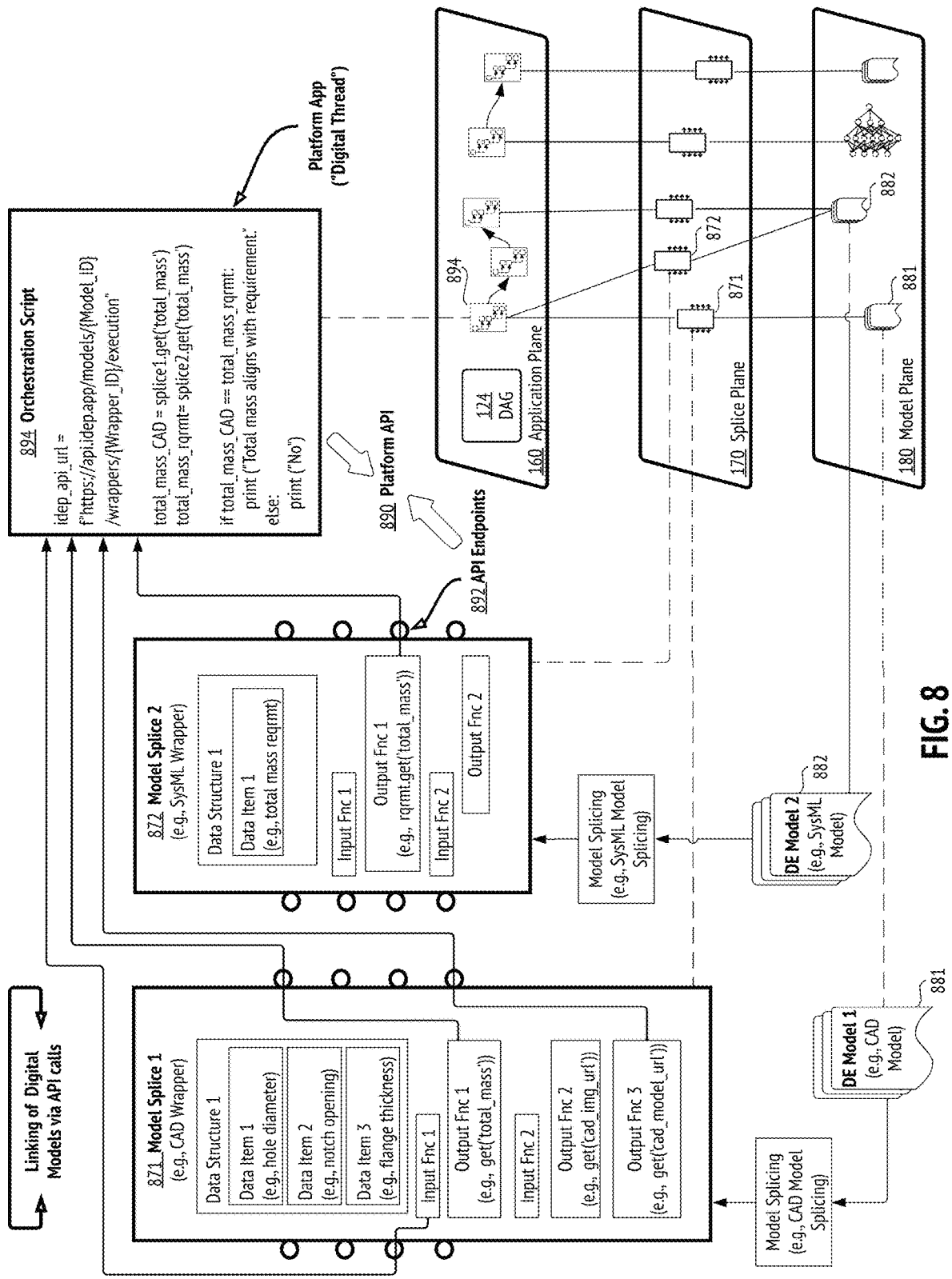

FIG. 8 is a schematic showing digital threading of DE models via model splicing, according to some embodiments of the present invention.

Figure 9:
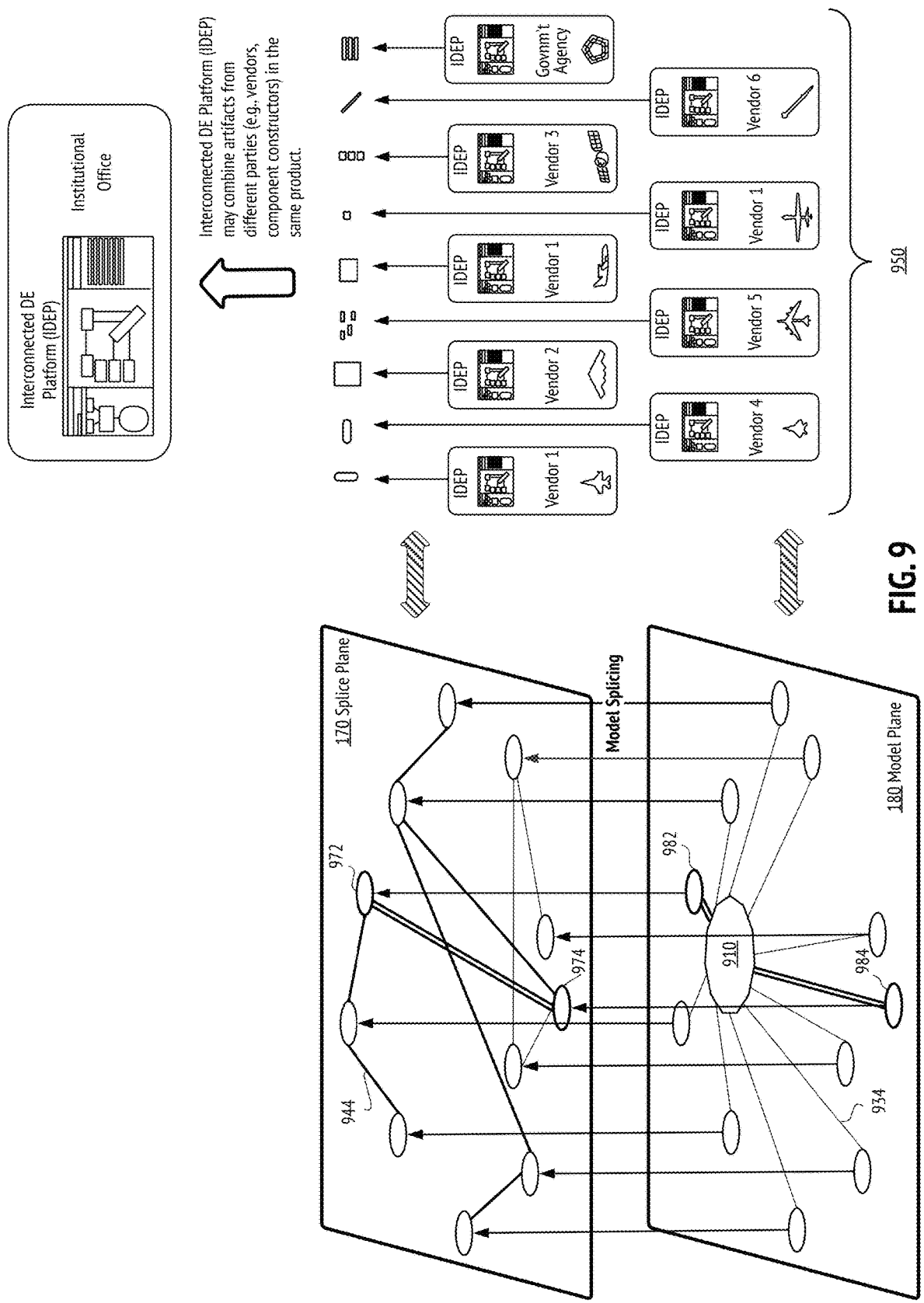

FIG. 9 is a schematic illustrating the linking of DE model splices in a splice plane and comparing digital threading with and without model splicing, according to some embodiments of the present invention.

Figure 10:
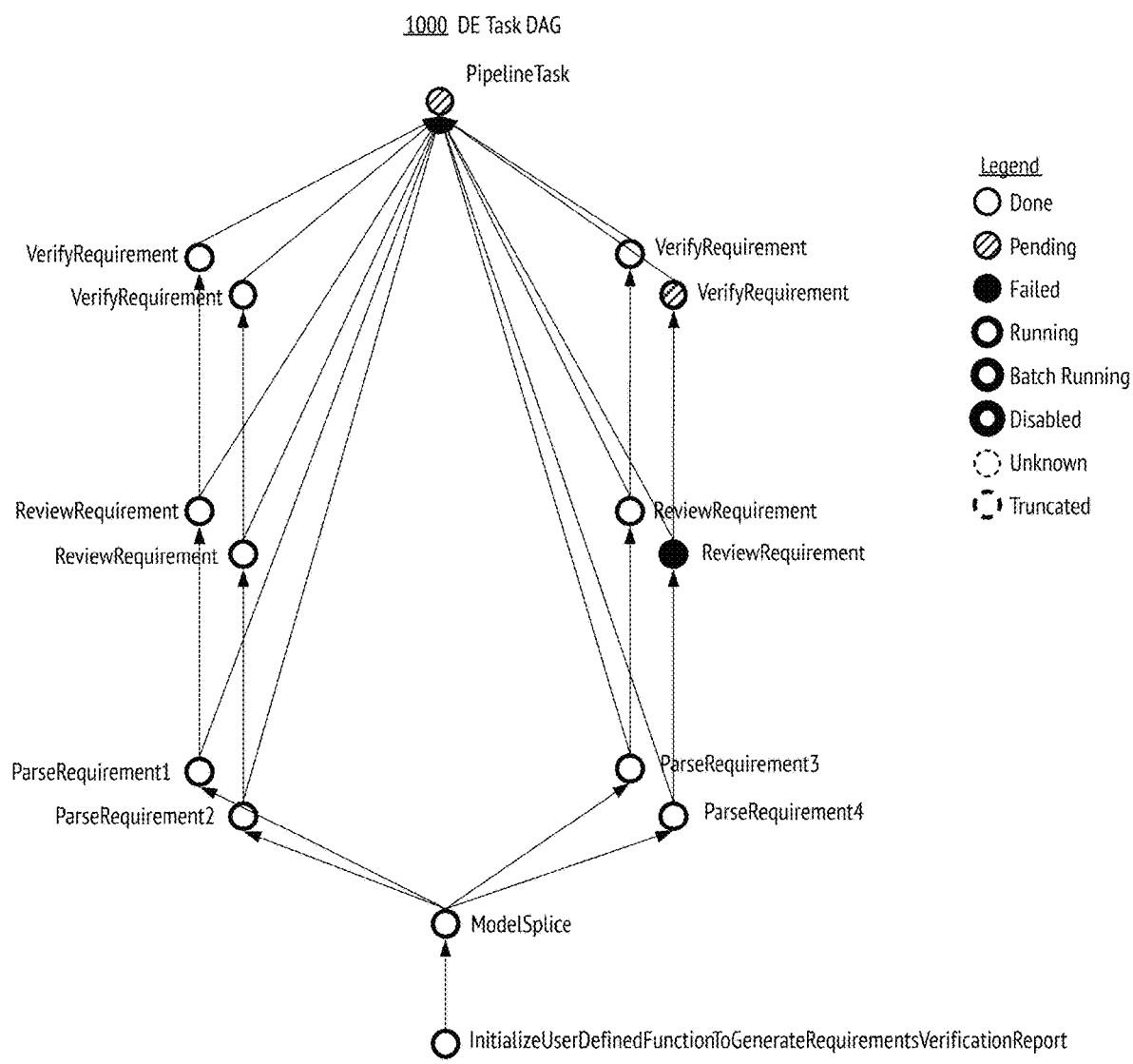

FIG. 10 shows an exemplary directed acyclic graph (DAG) representation of pipelined DE tasks related to digital threads, in accordance with some embodiments of the present invention.

Figure 11:
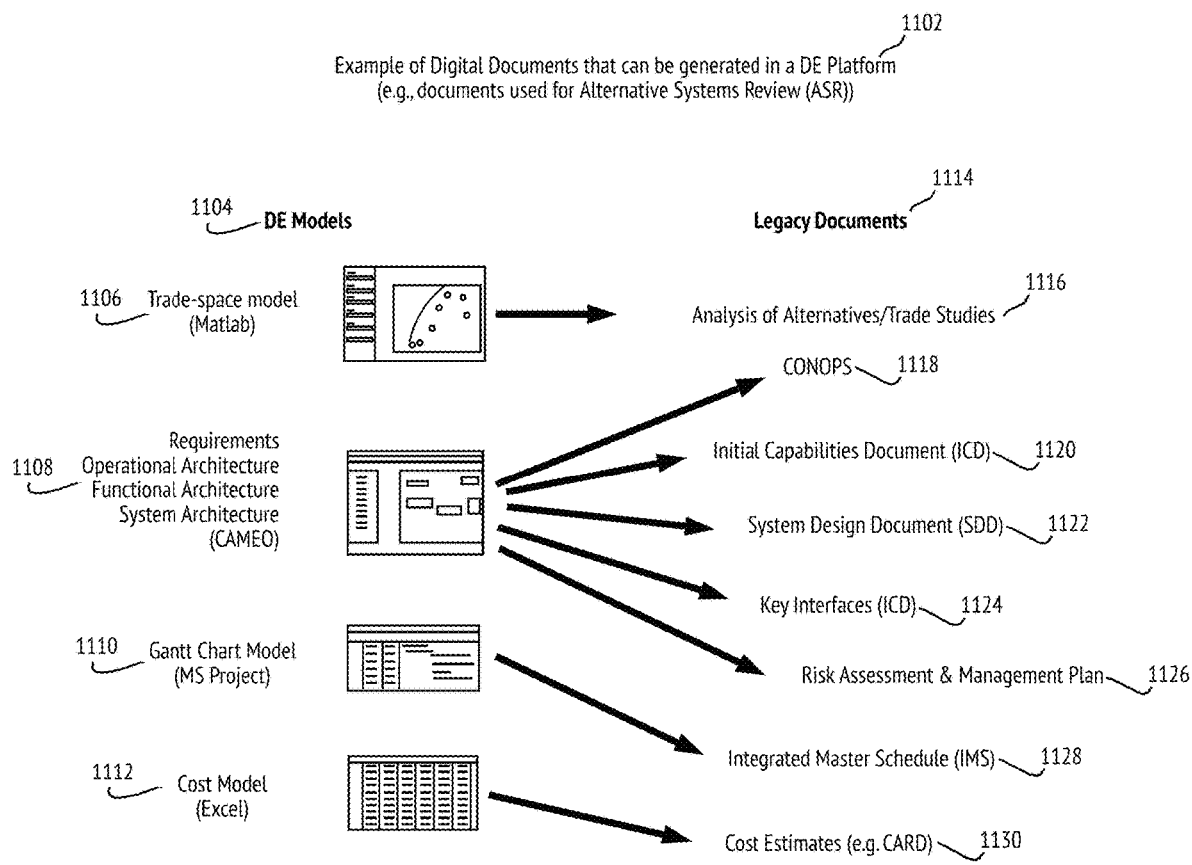

FIG. 11 shows an example of an alternative systems review (ASR), in accordance with the examples disclosed herein.

Figure 12:
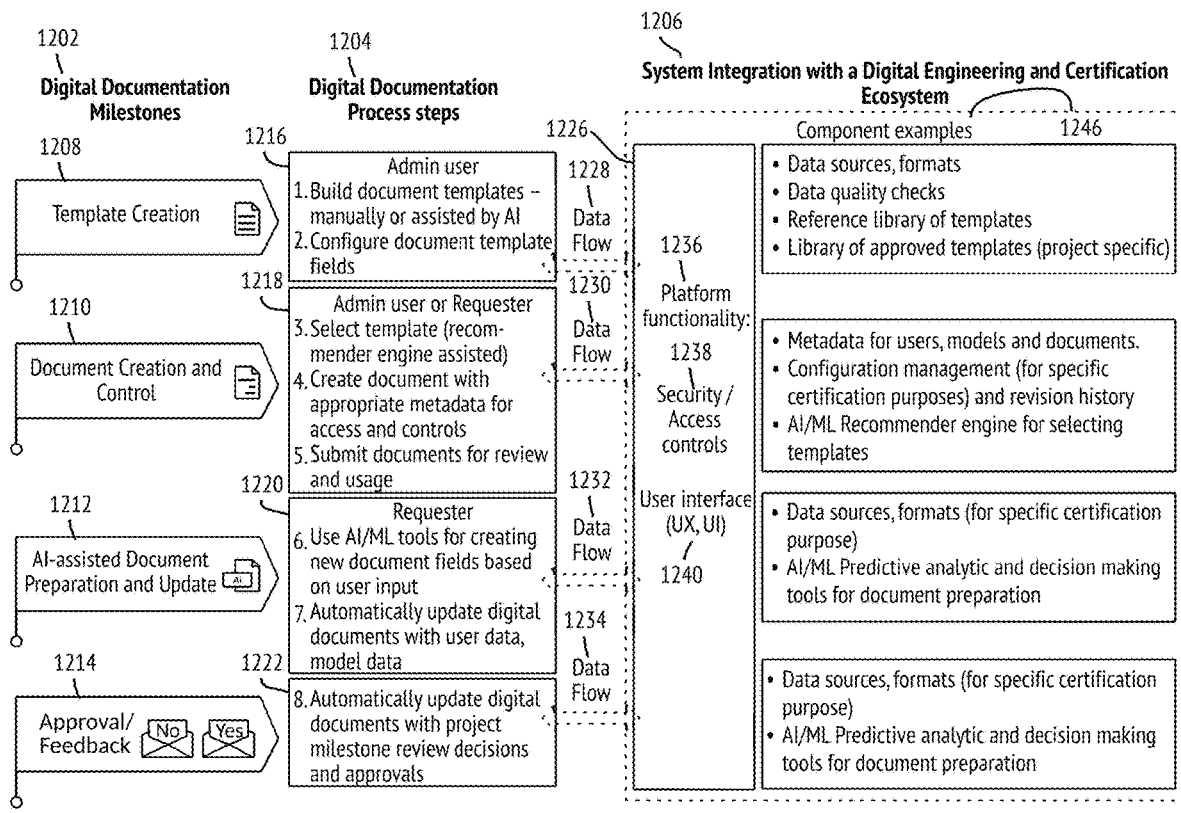

FIG. 12 shows an example digital documentation process, in accordance with the examples disclosed herein.

Figure 13:
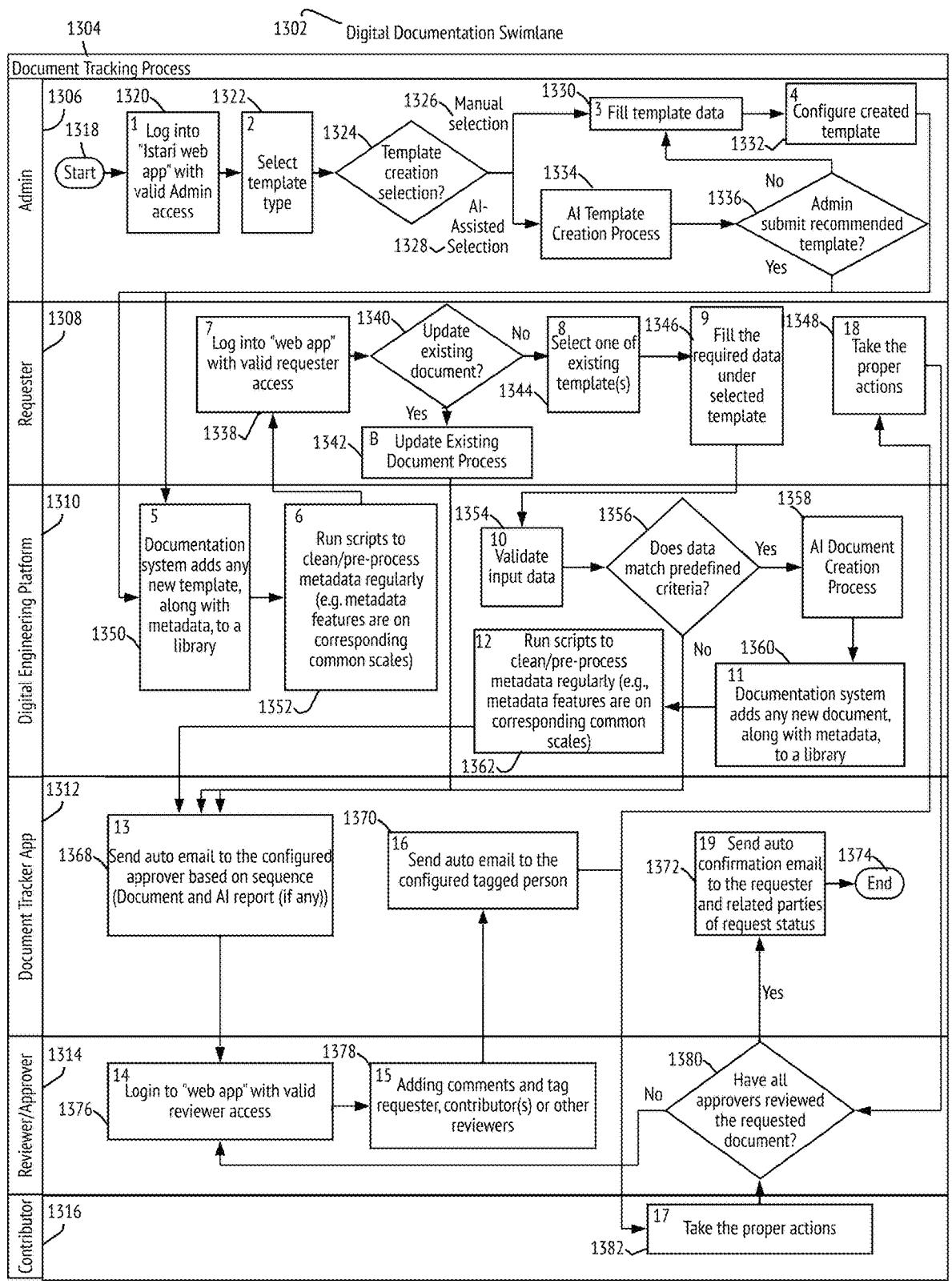

FIG. 13 shows a swimlane diagram of the digital documentation process, in accordance with the examples disclosed herein.

Figure 14:
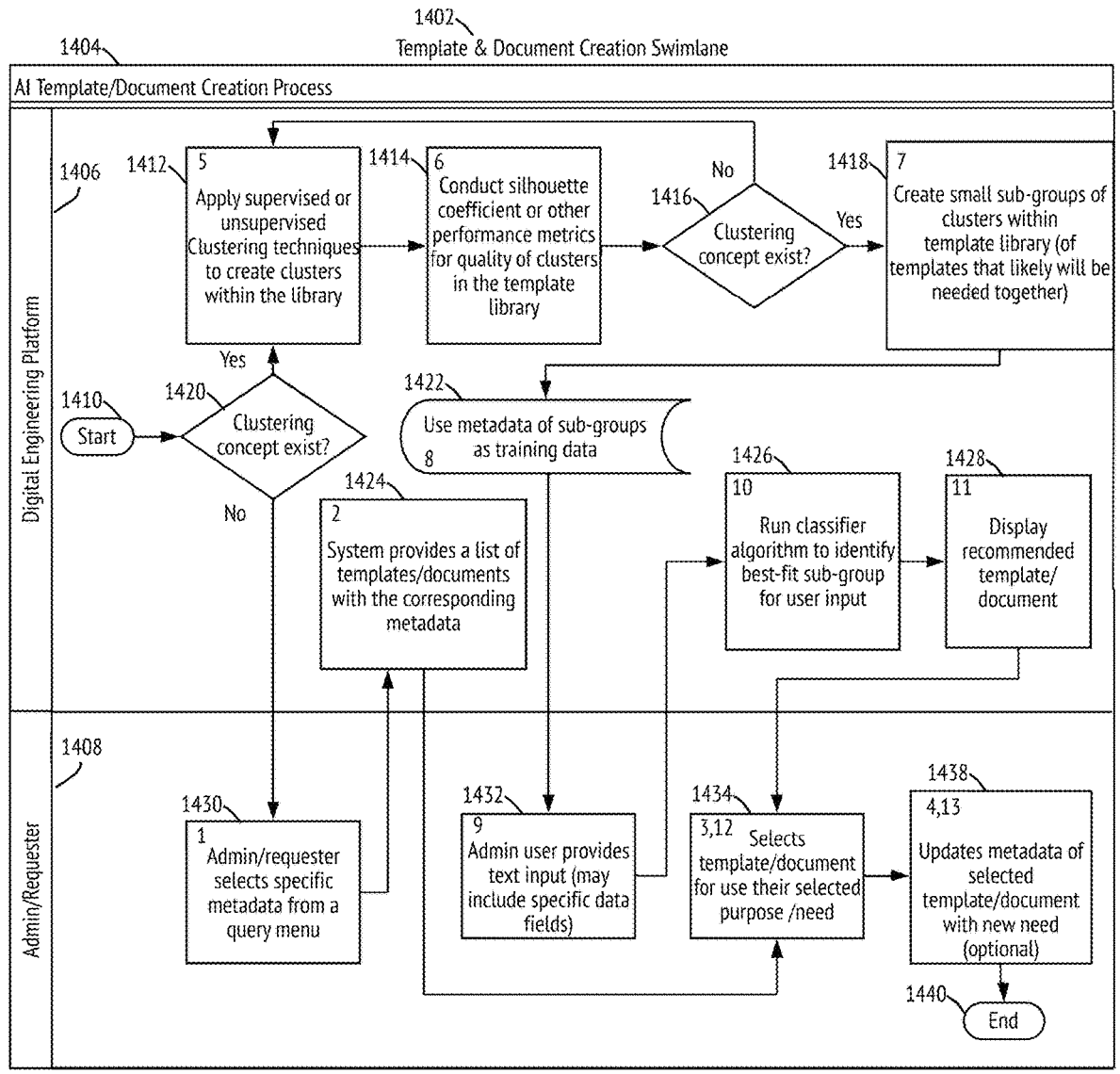

FIG. 14 shows a process flow for template creation and document creation, in accordance with the examples disclosed herein.

Figure 15:
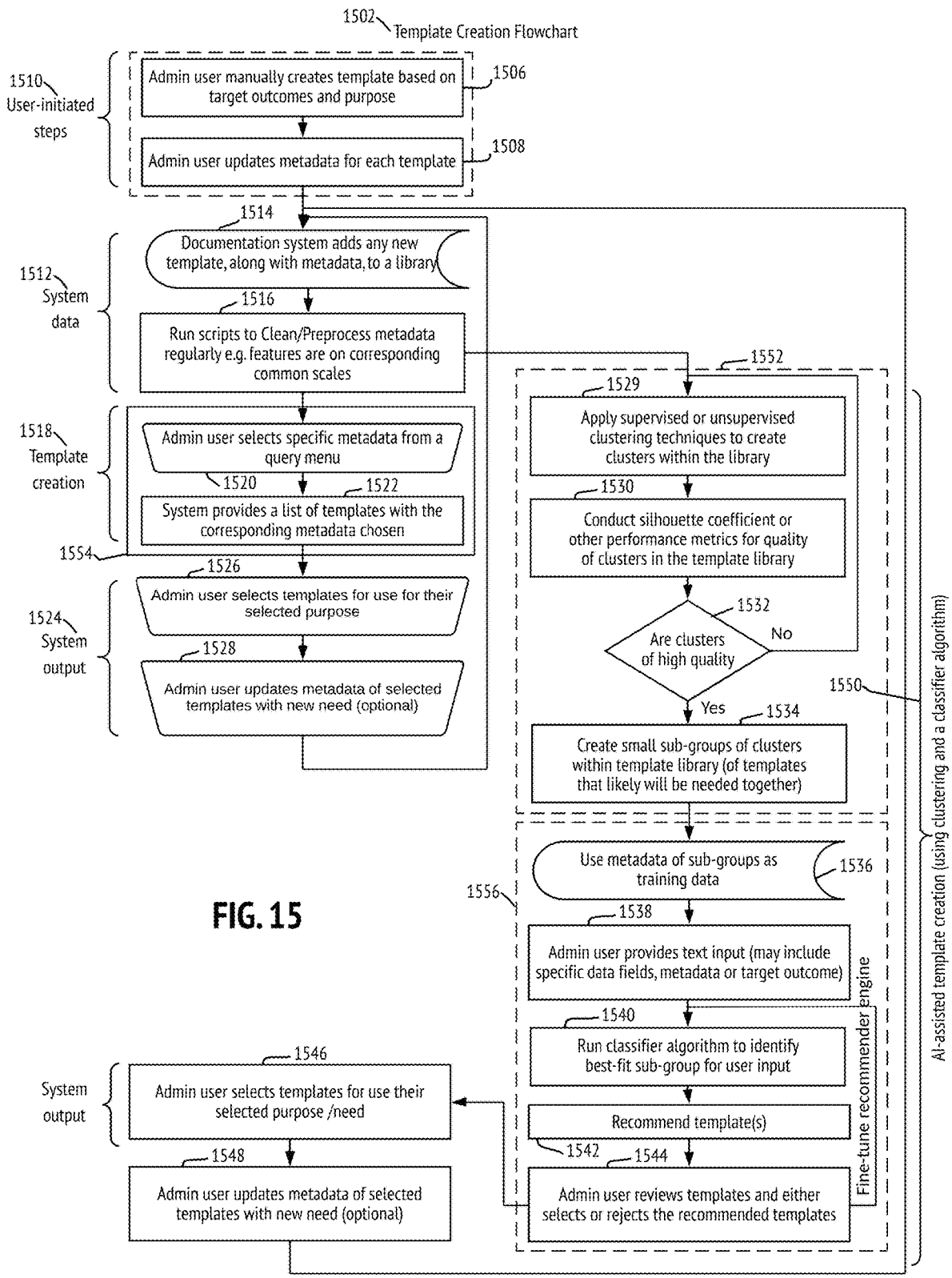

FIG. 15 shows a detailed process flow for template creation, in accordance with the examples disclosed herein.

Figure 16:
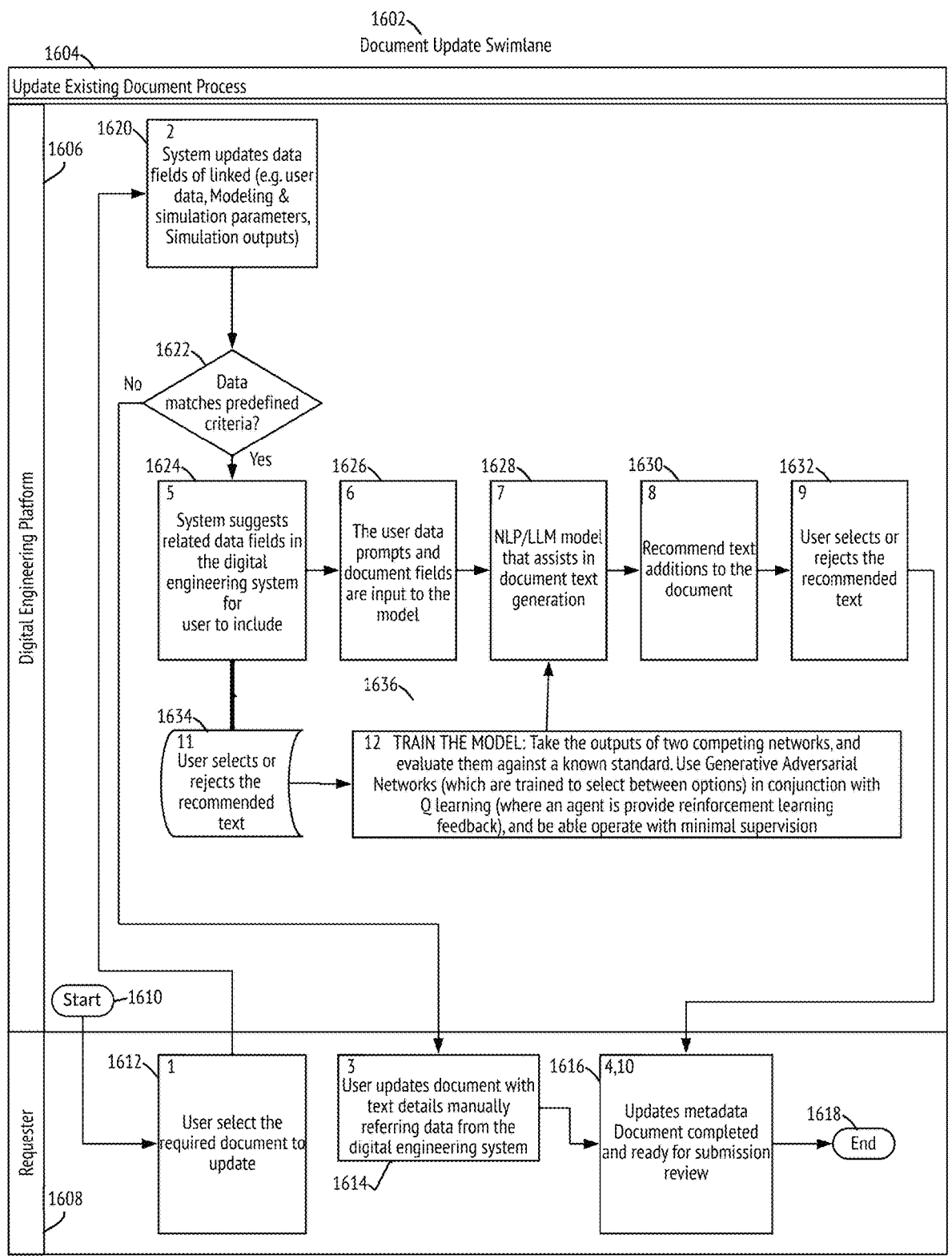

FIG. 16 shows a process flow for document update, in accordance with the examples disclosed herein.

Figure 17:
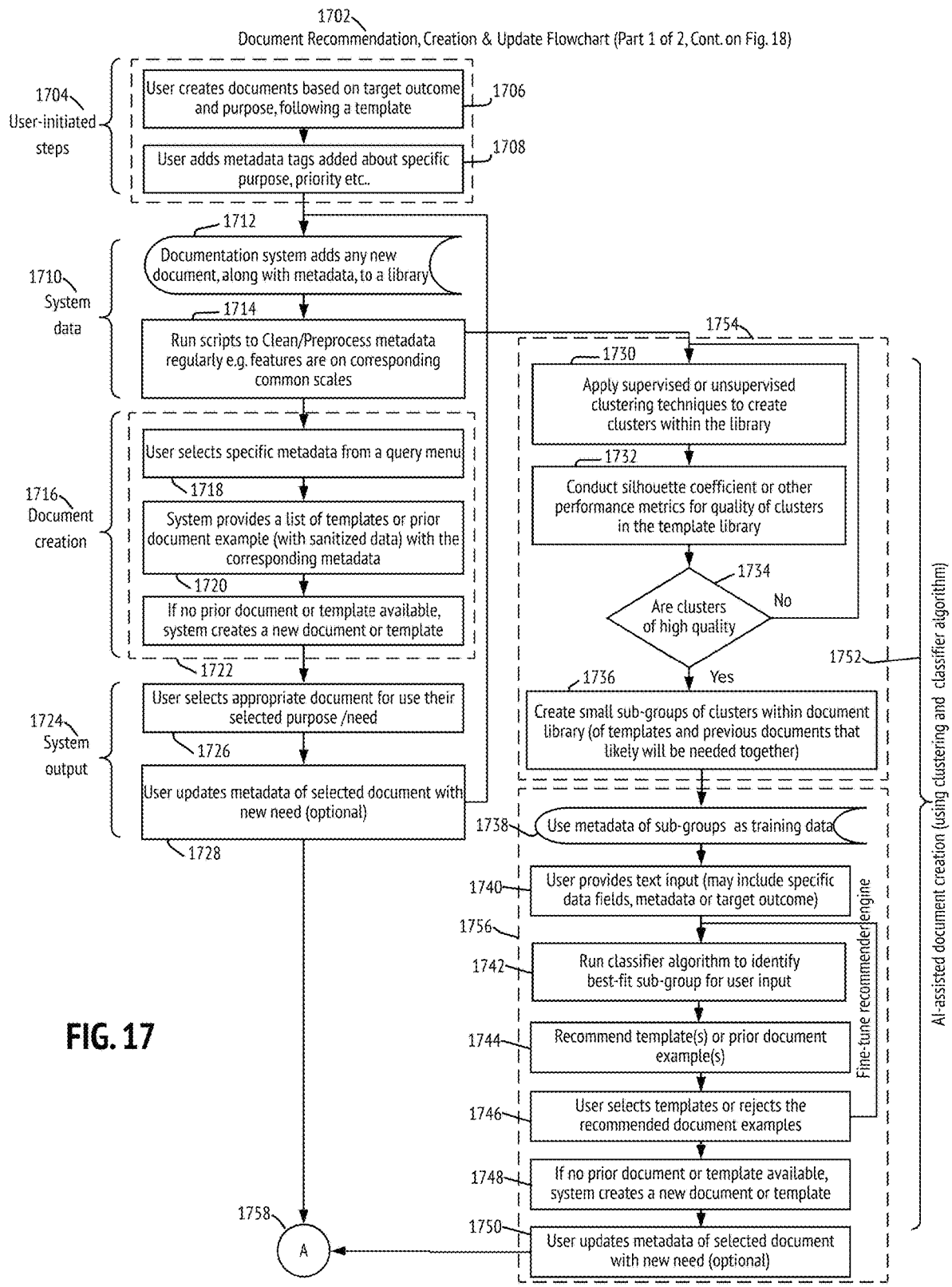
Figure 18:
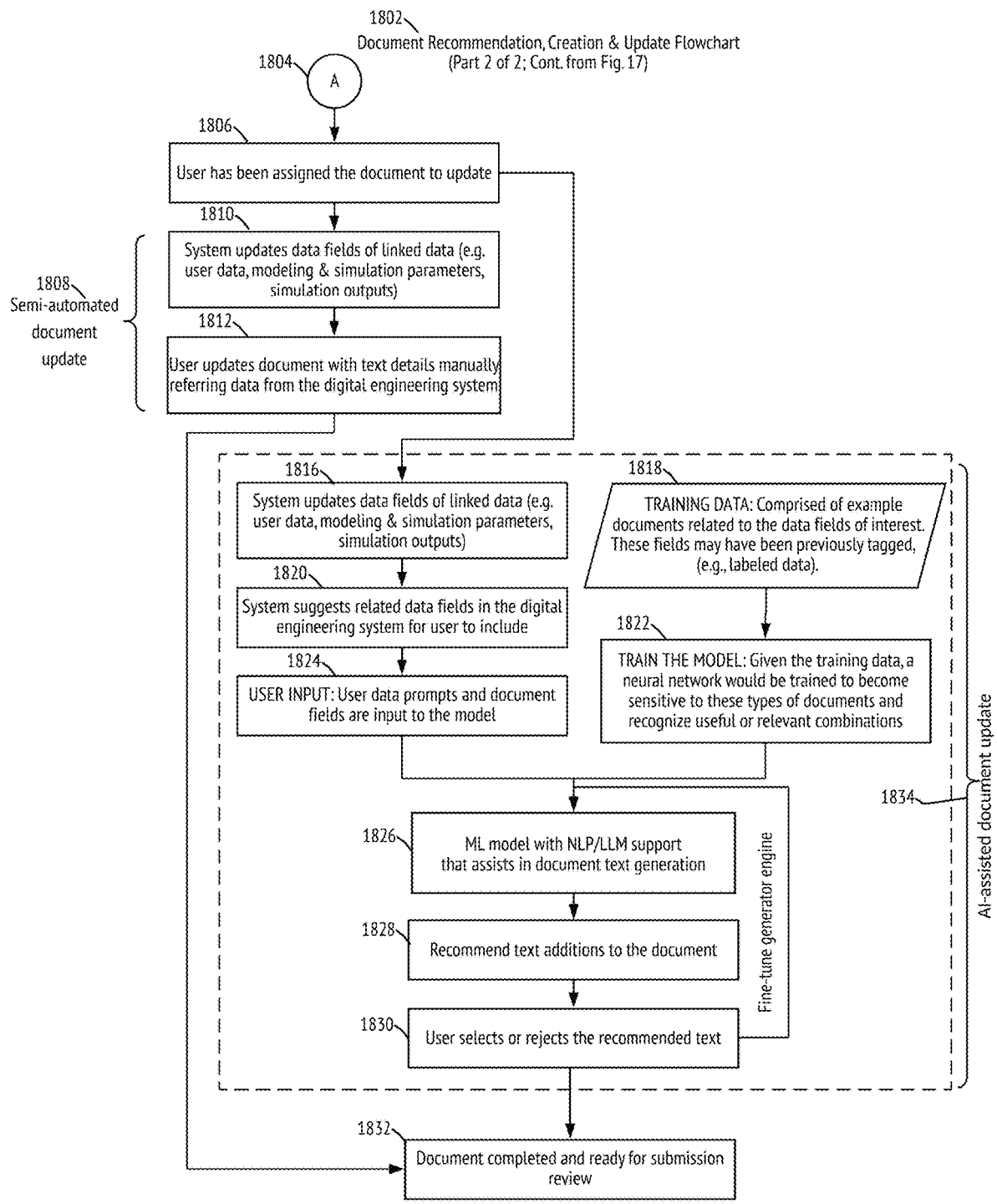

FIGS. 17 and 18 show a detailed process flow for document recommendation, creation and update, in accordance with the examples disclosed herein.

Figure 19:
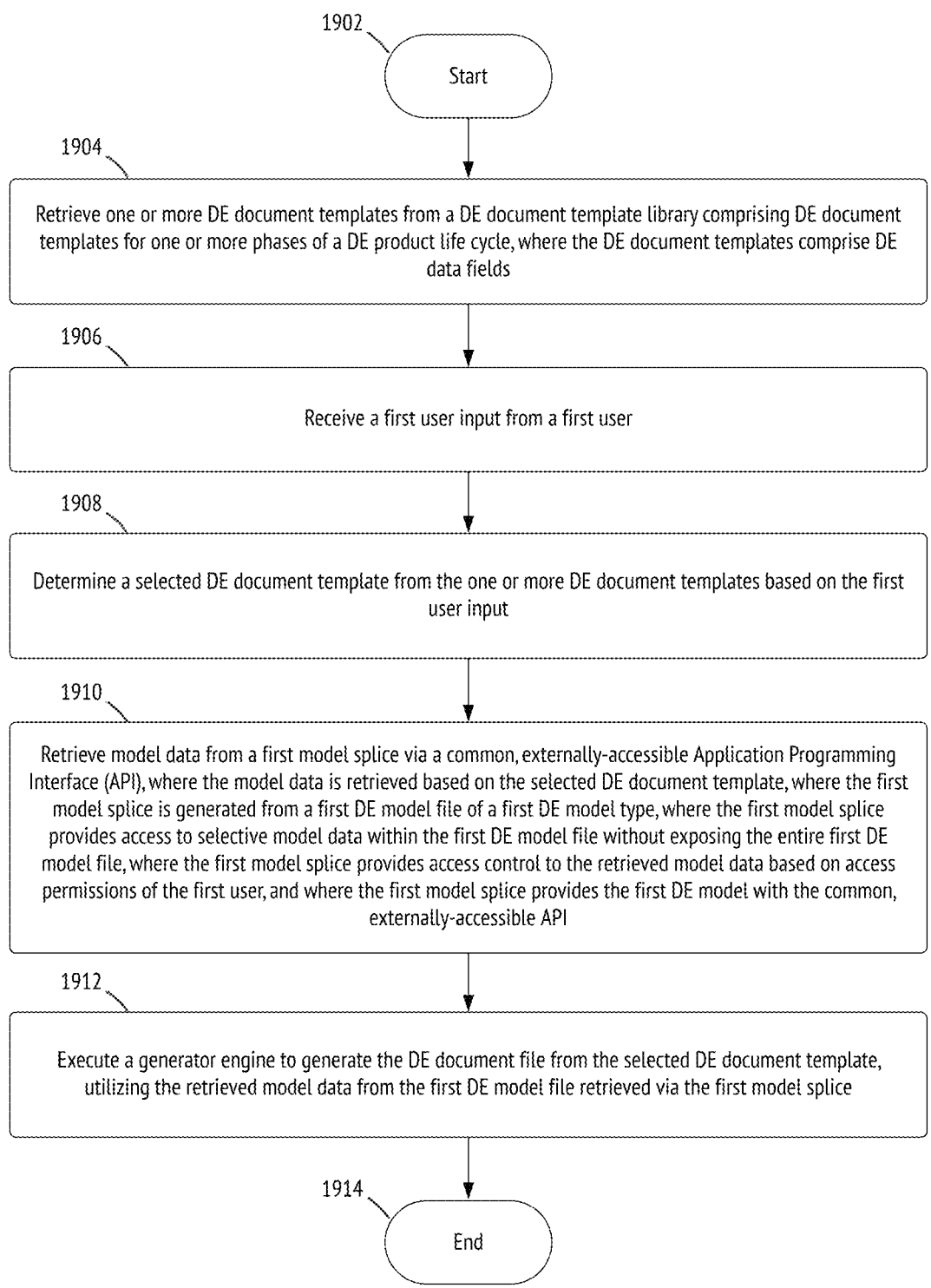

FIG. 19 shows a flowchart of a process for generating a documentation file in a digital engineering system, according to exemplary embodiments of the invention.

Figure 20:
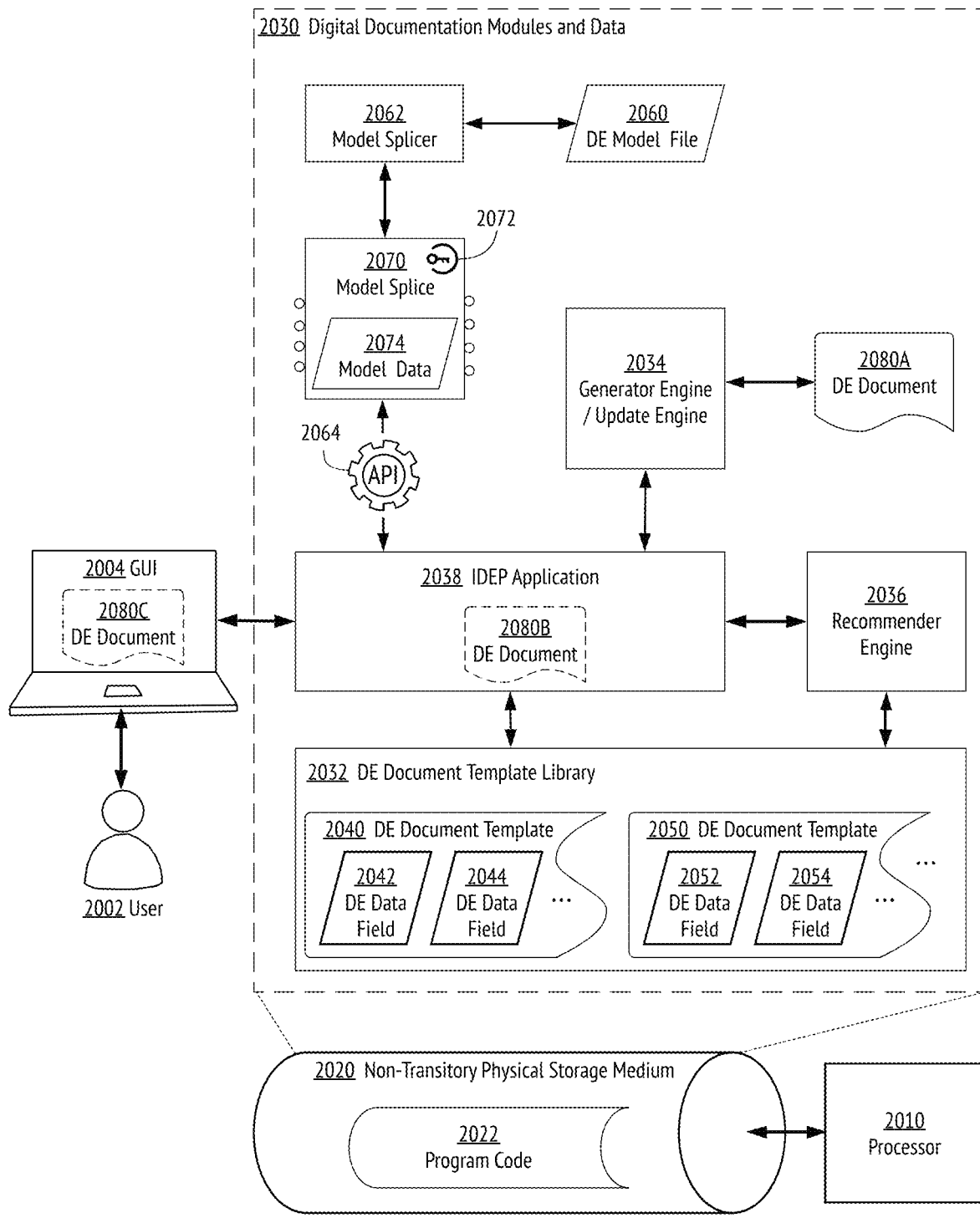

FIG. 20 shows a system for generating a documentation file in a digital engineering system, according to exemplary embodiments of the invention.

Figure 21:
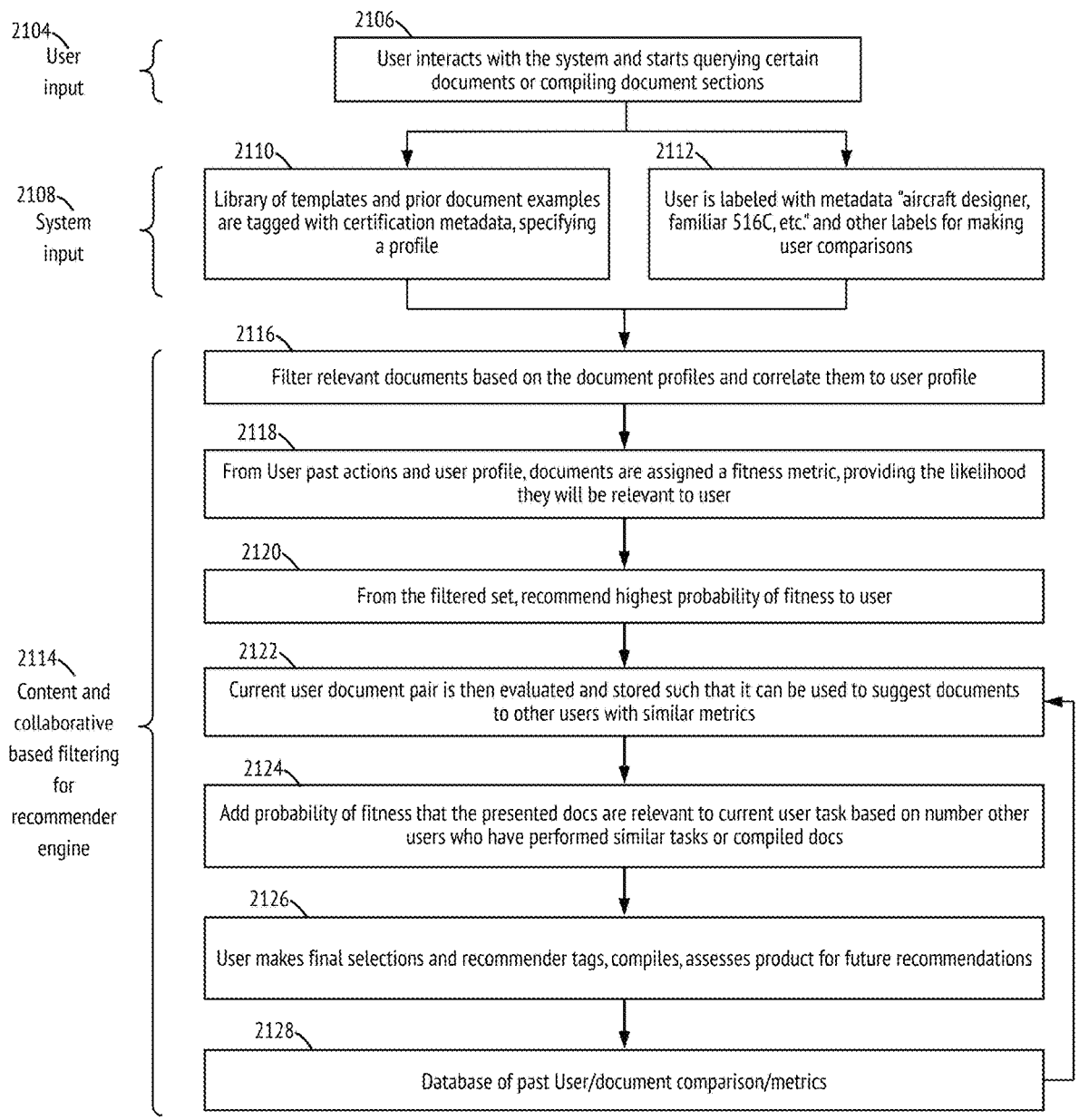

FIG. 21 shows a detailed process flow illustrating a recommender machine learning (ML) module using content and collaboration filtering, in accordance with the examples disclosed herein.

Figure 22:
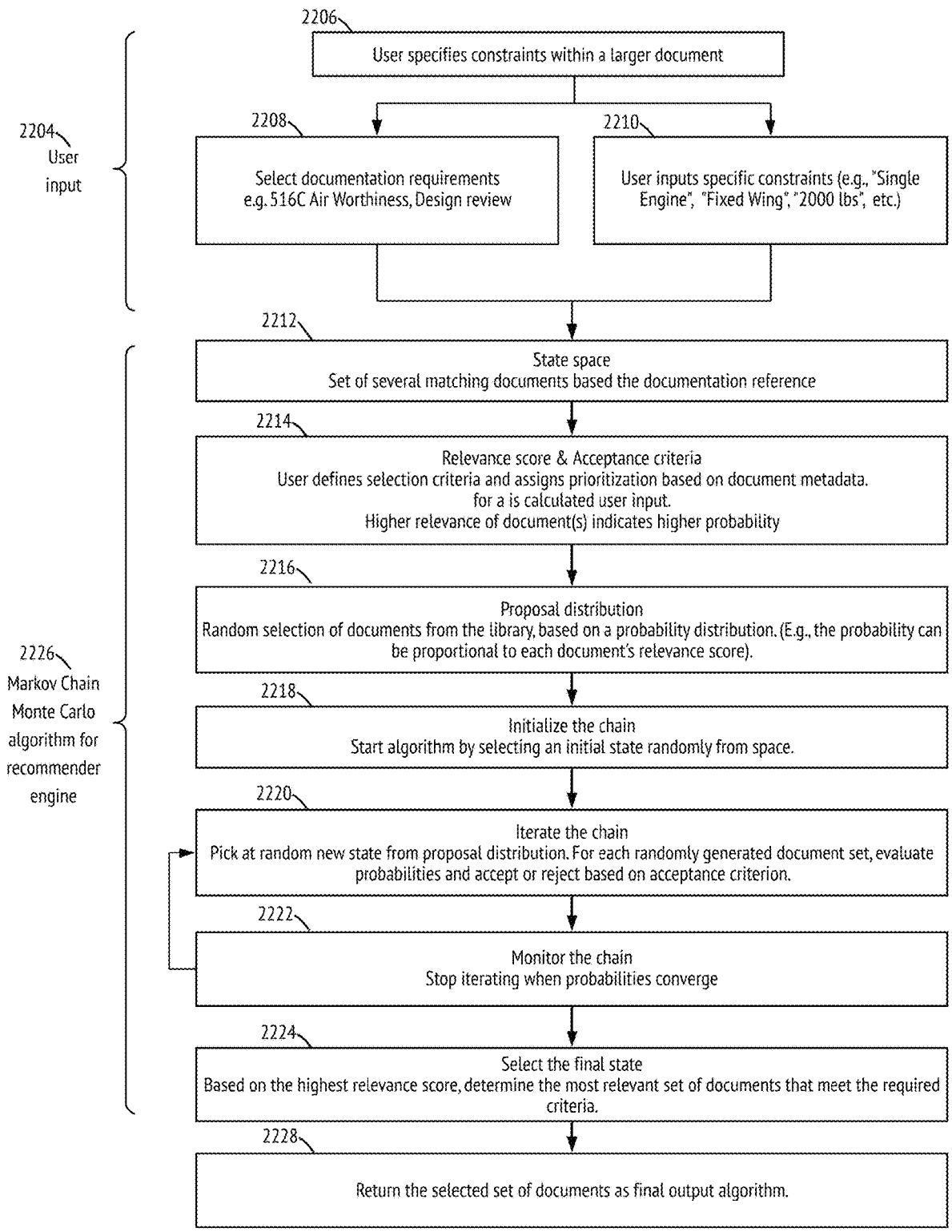

FIG. 22 shows a detailed process flow illustrating a recommender engine based on a Markov Chain Monte Carlo algorithm, in accordance with the examples disclosed herein.

Figure 23:
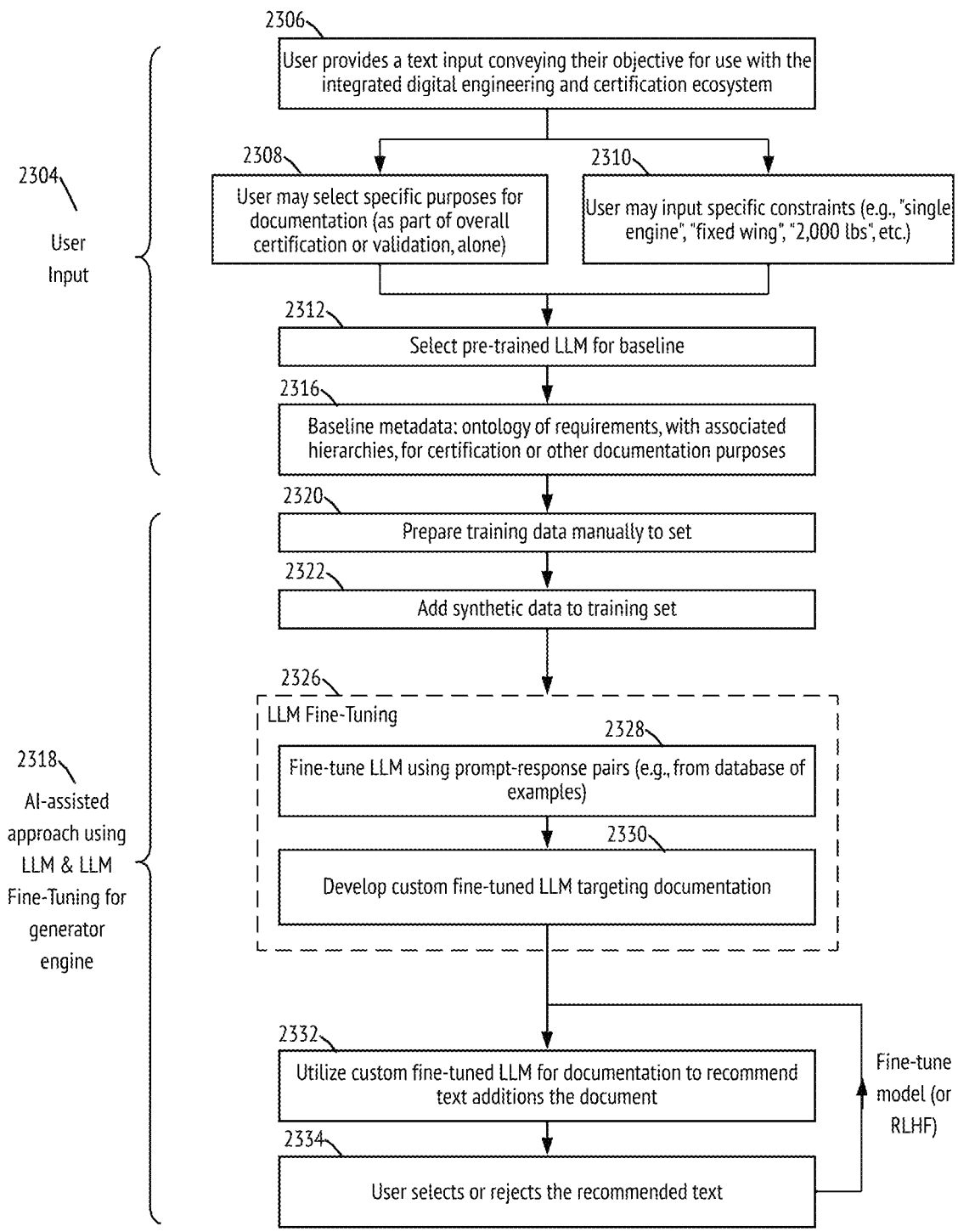
Figure 24:
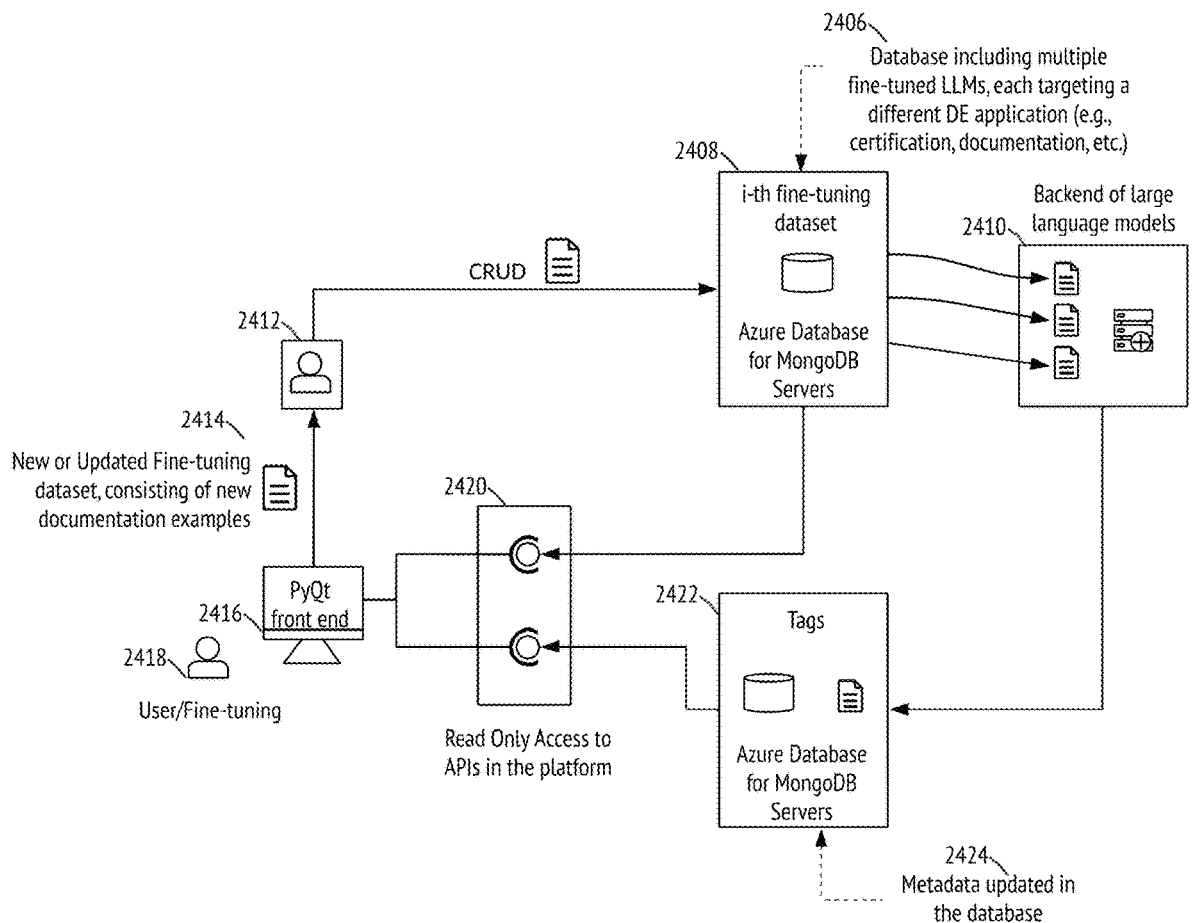

FIGS. 23 and 24 show a detailed process flow for document creation using a generative AI-assisted approach, in accordance with the examples disclosed herein.

Figure 25:
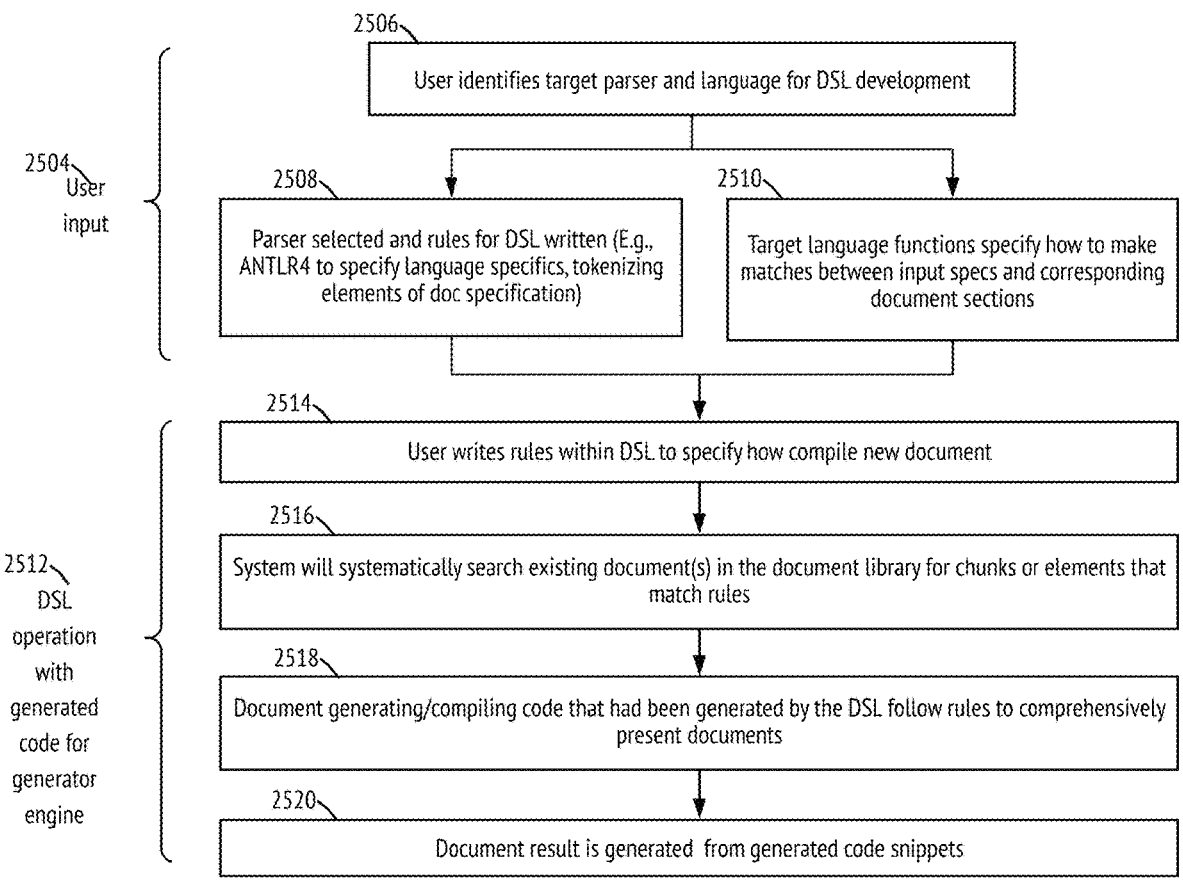

FIG. 25 shows a detailed process flow for a generator engine using a specified domain-specific language (DSL) and a set of rules generated with expert input, in accordance with the examples disclosed herein.

Figure 26:
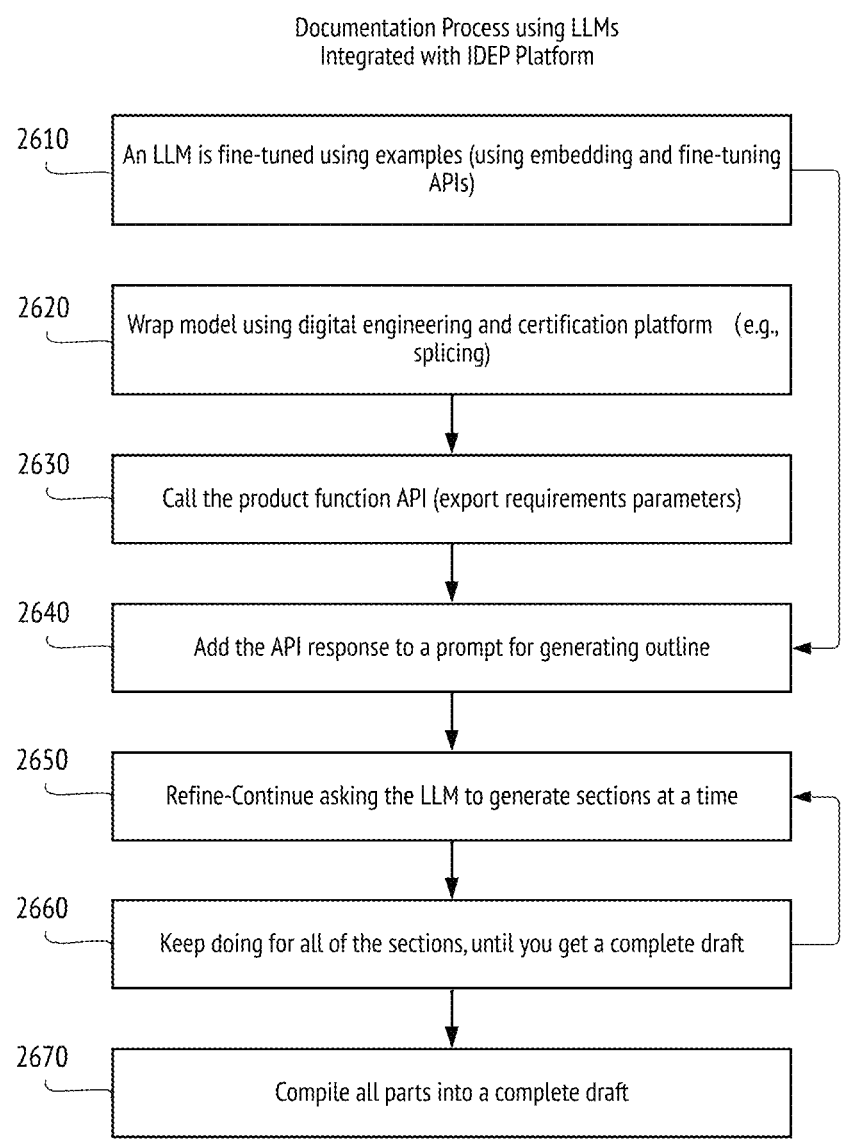

FIG. 26 shows an illustrative flow chart for AI-assisted document generation via model-to-document linking within a digital engineering (DE) platform, according to some embodiments of the present invention.

Figure 27:
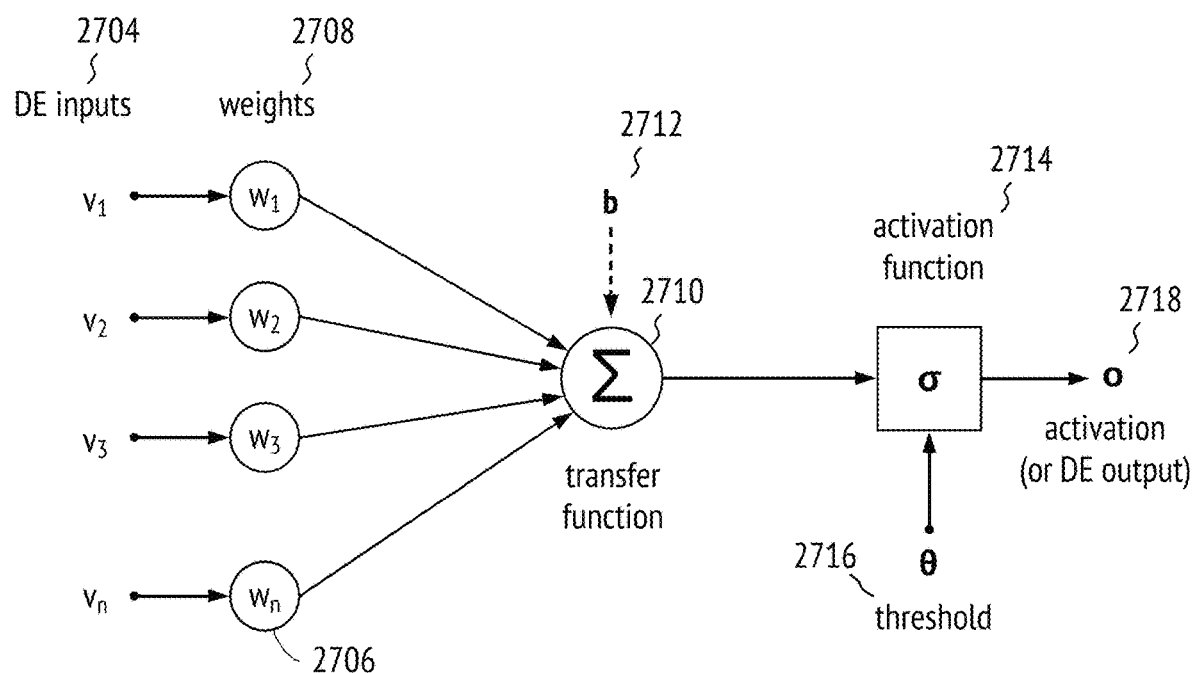

FIG. 27 describes neural network operation fundamentals, according to exemplary embodiments of the present invention.

Figure 28:
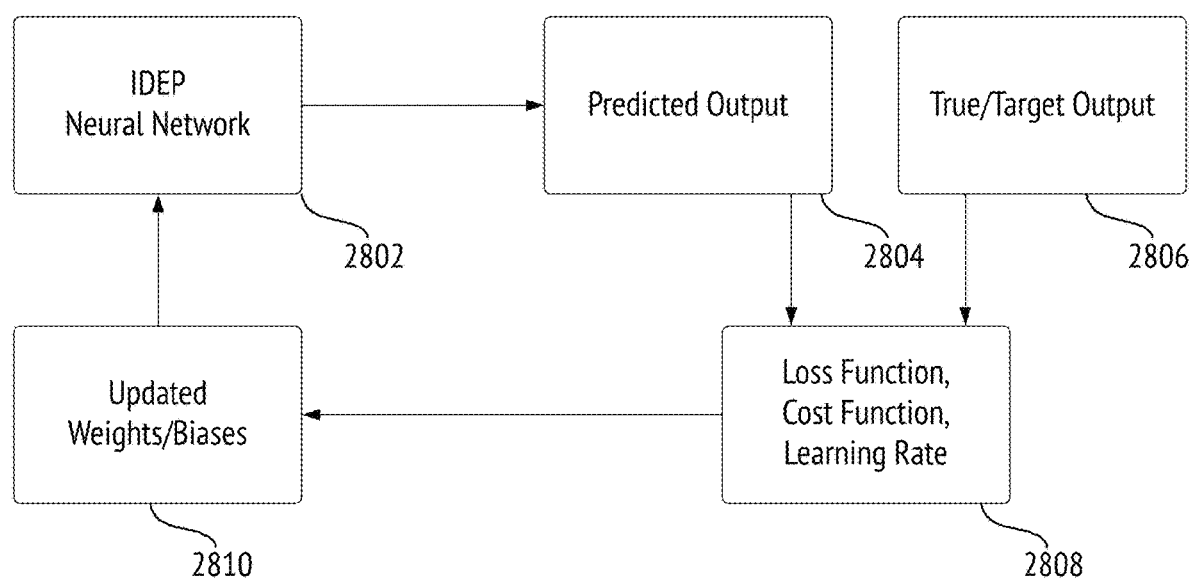

FIG. 28 shows an overview of an IDEP neural network training process, according to exemplary embodiments of the present invention.

Figure 29:
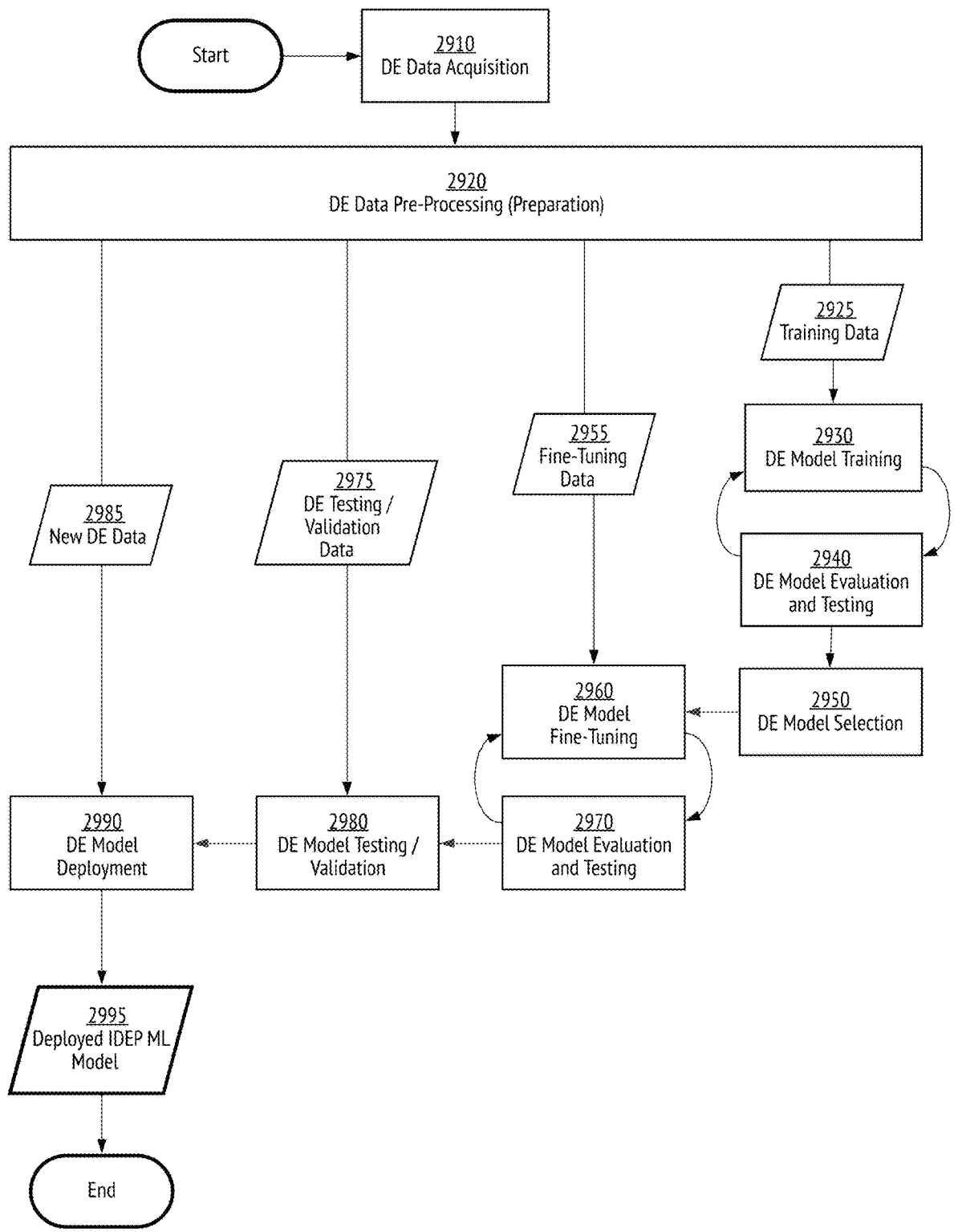

FIG. 29 is an illustrative flow diagram showing the different phases and datasets involved in training an IDEP machine learning model, according to exemplary embodiments of the present invention.

Figure 30:
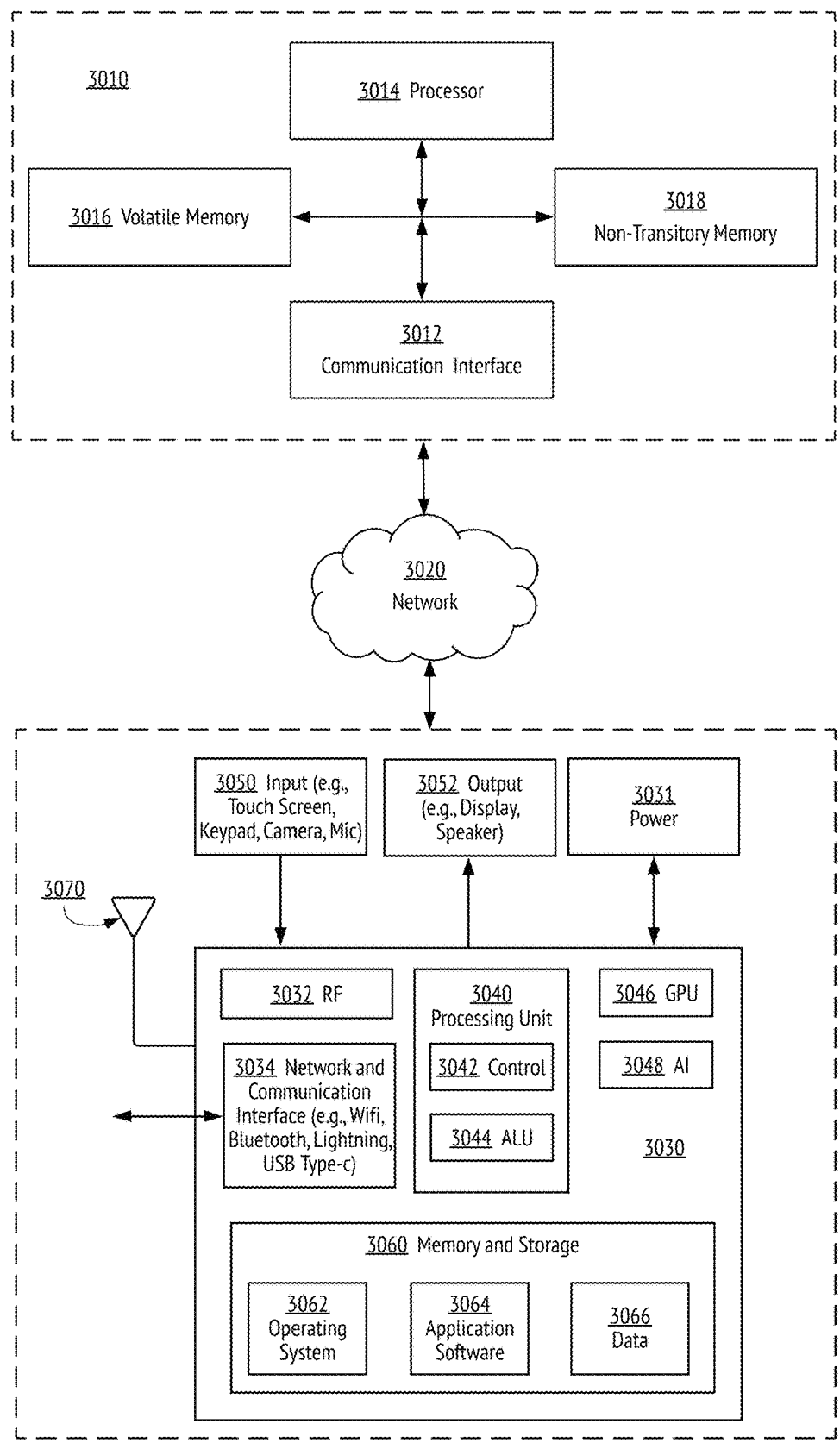

FIG. 30 provides illustrative schematics of a server (management computing entity) and a client (user computing entity) used for documentation within an IDEP, according to some embodiments of the present invention.

FIG. 31 shows a screenshot of an exemplary graphical user interface (GUI) used with the digital documentation system, according to one embodiment of the present invention.

DETAILED DESCRIPTION OF THE INVENTION

In the following description, for purposes of explanation, numerous specific details are set forth in order to provide a thorough understanding of the invention. It will be apparent, however, to one skilled in the art that the invention can be practiced without these specific details. In other instances, structures, devices, activities, methods, and processes are shown using schematics, use cases, and/or diagrams in order to avoid obscuring the invention. Although the following description contains many specifics for the purposes of illustration, anyone skilled in the art will appreciate that many variations and/or alterations to suggested details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

A digital documentation system for preparation of engineering documents utilizing one or more artificial intelligence algorithms is disclosed. The system includes a user interface for selecting and populating templates with data, and one or more machine learning algorithms for recommending and creating templates and preparation of document files based on recommended templates. The system may be integrated with a computer-based system for digital engineering and certification, and includes security and access controls to protect the templates and document files from unauthorized access or modification. The digital documentation system uses natural language processing and semantic analysis to understand the content of the templates and document files and associated engineering data, and to recommend and generate relevant templates to the user based on user input. The system also uses machine learning and predictive modeling and decision-tree algorithms to assist with preparation of document files, by generating suggestions for data fields and values based on the user's previous inputs and the overall context of the document file and the available engineering data. Finally, this system allows for the creation and sharing of authoritative documents that include full traceability and may include dynamic data updating.

With reference to the figures, embodiments of the present invention are now described in detail. First, general DE system and documentation-specific terminologies are introduced. Next, the DE system (IDEP) is explained in detail. Finally, the digital documentation system, which may be considered a subsystem of the IDEP, is described in detail.

General Terminology

Some illustrative terminologies used with an interconnected digital engineering platform (IDEP) are provided below to assist in understanding the present invention, but these are not to be read as restricting the scope of the present invention. The terms may be used in the form of nouns, verbs, or adjectives, within the scope of the definition.

Digital engineering (DE): According to the Defense Acquisition University (DAU) and the Department of Defense (DOD) Digital Engineering Strategy published in 2018, digital engineering is "an integrated digital approach to systems engineering, using authoritative sources of systems' data and models as a continuum across disciplines to support lifecycle activities from concept through disposal." Digital engineering incorporates digital technological innovations into an integrated, model-based approach that empowers a paradigm shift from the traditional design-build-test methodology of systems engineering to a new model-analyze-build methodology, thus enabling systems design, prototyping, and testing all in a virtual environment.

DE data: Digital engineering (DE) data comprises project management, program management, product management, design review, and/or engineering data.

DE data field: A data field for DE data, for example, in a DE document template, defined below.

Phases: The stages within a DE product lifecycle, including but not limited to, stakeholder analysis, concept studies, requirements definition, preliminary design and technology review, system modeling, final design, implementation, system assembly and integration, prototyping, verification and validation on system, subsystem, and component levels, and operations and maintenance.

DE model, also referred to as a "digital model": A computer-generated digital model that represents characteristics or behaviors of a complex product or system. A DE model can be created or modified using a DE tool. A DE model file is the computer model file created or modified using the DE tool. In the present disclosure, the terms "digital model", "DE model" and "DE model file" may be used interchangeably, as the context requires. A DE model within the IDEP as disclosed herein refers to any digital file uploaded onto the platform, including documents that are appropriately interpreted, as defined below. For example, a computer-aided design (CAD) file, a Systems Modeling Language (SysML) file, a Systems Requirements Document (SDR) text file, and a Neural Network Model JSON file may each be considered a DE model, in various embodiments of the present invention. A DE model may be machine-readable only, may be human-readable as well but written in programming codes, or may be human-readable and written in natural language-based texts. For example, a word-processing document comprising a technical specification of a product, or a spreadsheet file comprising technical data about a product, may also be considered a DE model.

Interconnected Digital Engineering Platform (IDEP), also referred to as a "Digital Engineering and Certification Ecosystem": According to the DAU, a "DE ecosystem" is the "interconnected infrastructure, environment, and methodology (process, methods, and tools) used to store, access, analyze, and visualize evolving systems' data and models to address the needs of the stakeholders." Embodiments of the IDEP as disclosed herein comprise software platforms running on hardware to realize the aforementioned capabilities under zero-trust principles. A DE and certification ecosystem performs verification and validation tasks, defined next.

Verification: According to the DAU, verification "confirms that a system element meets design-to or build-to specifications. Through the system's life cycle, design solutions at all levels of the physical architecture are verified through a cost-effective combination of analysis, examination, demonstration, and testing." Verification refers to evaluating whether a product, service, or system meets specified requirements and is fit for its intended purpose, checking externally against customer or stakeholder needs. For example, in the aerospace industry, a verification process may include testing an aircraft component to ensure it can withstand the forces and conditions it will encounter during flight.

Validation: According to the DAU, validation is "1) the review and approval of capability requirement documents by a designated validation authority. 2) The process by which the contractor (or as otherwise directed by the DoD component procuring activity) tests a publication/technical manual for technical accuracy and adequacy. 3) The process of evaluating a system or software component during, or at the end of, the development process to determine whether it satisfies specified requirements." Thus, validation refers to evaluating whether the overall performance of a product, service, or system is suitable for its intended use, including its compliance with regulatory requirements, and its ability to meet the needs of its intended users, checking internally against specifications and regulations. For example, for an industrial product manufacturing, a validation process may include consumer surveys that inform product design, modeling and simulations for validating the design, prototype testing for failure limits and feedback surveys from buyers.

Common Verification & Validation (V&V) products: Regulatory and certification standards, compliances, calculations, and tests (e.g., for the development, testing, and certification of products and/or solutions) are referred to herein as "common verification and validation (V&V) products."

DE tool: A tool or DE tool is a DE application software (e.g., a CAD software), computer program, and/or script that creates or manipulates a DE model during at least one stage or phase of a product lifecycle. A DE tool may comprise multiple functions.

Application Programming Interface (API): A software interface that provides programmatic access to services by a software program, thus allowing application software to exchange data and communicate with each other using standardized requests and responses. It allows different programs to work together without revealing the internal details of how each works. A DE tool is typically provided with an API library for code-interface access.

Script: A sequence of instructions that is interpreted and run within or carried out by another program, without compilation into a binary file to be run by itself through a computer processor without the support of other programs.

API scripts: Scripts that implement particular functions available via the IDEP as disclosed herein. An API script may be an API function script encapsulated in a model splice, or an "orchestration script" or "platform script" that orchestrates a workflow through a digital thread built upon interconnected model splices.

Platform API or ISTARI API: A library of API scripts available on the IDEP as disclosed herein.

API function scripts, "splice functions," "ISTARI functions," or "function nodes" are a type of API scripts. When executed, an API function script inputs into or outputs from a DE model or DE model splice. An "input" splice function or "input node" allows updates or modifications to an input DE model. An "output" splice function or "output node" allows data extraction or derivation from an input DE model via its model splice. An API function script may invoke native API function calls of native DE tools, where the terms "native" and "primal" refer to existing DE model files, functions, and API libraries associated with third-party DE tools, including both proprietary and open-source ones.

Artifact: According to the DAU, a digital artifact is "an artifact produced within, or generated from, a DE ecosystem" to "provide data for alternative views to visualize, communicate, and deliver data, information, and knowledge to stakeholders." In the present disclosure, a "digital artifact" or "artifact" is an execution result from an output API function script within a model splice. Multiple artifacts may be generated from a single DE model or DE model splice.

Model splice: Within the present disclosure, a "model splice", "model wrapper", or "model graft" of a given DE model file comprises (1) DE model data extracted or derived from the DE model file, including model metadata, and (2) API function scripts that can be applied to the DE model data. The API function scripts provide unified and standardized input and output API endpoints for accessing and manipulating the DE model data. The DE model data are model-type-specific, and a model splice is associated with model-type-specific input and output schemas. One or more different model splices may be generated from the same input DE model file, based on the particular user application under consideration, and depending on data access restrictions. In some contexts, the shorter terms "splice", "wrapper", and/or "graft" are used to refer to spliced, wrapped, and/or grafted models.

Model splicing or DE model splicing: A process for generating a model splice from a DE model file. DE model splicing encompasses human-readable document model splicing, where the DE model being spliced is a human-readable text-based document.

Model splicer: Program code or script (uncompiled) that performs model splicing of DE models. A DE model splicer for a given DE model type, when applied to a specific DE model file of the DE model type, retrieves, extracts, or derives DE model data associated with the DE model file, generates and/or encapsulates API function scripts, and instantiates API endpoints according to input/output schemas.

Model splice linking: Generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first and a second splice (e.g., input splice functions from both model splices are called upon). In the present disclosure, "model linking" and "model splice linking" may be used interchangeably, as linked model splices map to correspondingly linked DE models.

Digital thread, Software-defined digital thread, or Software digital thread: According to the DAU, a digital thread is "an extensive, configurable and component enterprise-level analytical framework that seamlessly expedites the controlled interplay of authoritative technical data, software, information, and knowledge in the enterprise data-information-knowledge systems, based on the digital system model template, to inform decision makers throughout a system's lifecycle by providing the capability to access, integrate, and transform disparate data into actionable information." Within the IDEP as disclosed herein, a digital thread is a platform script that calls upon the platform API to facilitate, manage, or orchestrate a workflow through linked model splices to provide the aforementioned capabilities. That is, a digital thread within the IDEP may be termed a "software-defined digital thread" or "software digital thread" that implements a communication framework or data-driven architecture that connects traditionally siloed DE models to enable seamless information flow among the DE models via model splices.

Tool linking: Similar to model splice linking, tool linking generally refers to jointly accessing two or more DE tools via model splices, where model splice functions that encapsulate disparate DE tool functions are called upon jointly to perform a DE task.

Zero-trust security: An information security principle based on the assumption of no implicit trust between any elements, agents, or users. Zero trust may be carried out by implementing systematic mutual authentication and least privileged access, typically through strict access control, algorithmic impartiality, and data isolation. Within the IDEP as disclosed herein, least privileged access through strict access control and data isolation may be implemented via model splicing and the IDEP system architecture.

Hyperscale capabilities: The ability of a system architecture to scale adequately when faced with massive demand.

IDEP enclave or DE platform enclave: A central command hub responsible for the management and functioning of DE platform operations. An enclave is an independent set of cloud resources that are partitioned to be accessed by a single customer (i.e., single-tenant) or market (i.e., multi-tenant) that does not take dependencies on resources in other enclaves.

IDEP exclave or DE platform exclave: A secondary hub situated within a customer environment to assist with customer DE tasks and operations. An exclave is a set of cloud resources outside enclaves managed by the IDEP, to perform work for individual customers. Examples of exclaves include virtual machines (VMs) and/or servers that the IDEP maintains to run DE tools for customers who need such services.

Digital twin: According to the DAU, a digital twin is "a virtual replica of a physical entity that is synchronized across time. Digital twins exist to replicate configuration, performance, or history of a system. Two primary sub-categories of digital twin are digital instance and digital prototype." A digital instance is "a virtual replica of the physical configuration of an existing entity; a digital instance typically exists to replicate each individual configuration of a product as-built or as-maintained." A digital prototype is "an integrated multi-physical, multiscale, probabilistic model of a system design; a digital prototype may use sensor information and input data to simulate the performance of its corresponding physical twin; a digital prototype may exist prior to realization of its physical counterpart." Thus, a digital twin is a real-time virtual replica of a physical object or system, with bi-directional information flow between the virtual and physical domains.

Authoritative twin: A reference design configuration at a given stage of a product life cycle. At the design stage, an authoritative twin is the twin configuration that represents the best design target. At the operational stage, an authoritative twin is the twin configuration that best responds to the actual conditions on the ground or "ground-truths".

Admins or Administrators: Project managers or other authorized users. Admins may create templates in the documentation system and have high-level permissions to manage settings in the IDEP.

Requesters: Users who use the platform for the implementation of the modeling and simulations towards certification and other purposes, and who may generate documentation in the digital documentation system, but do not have admin privileges to alter the required templates, document formats, or other system settings.

Reviewers/Approvers: Users who review and/or approve templates, documents, or other system data.

Contributors: Users who provide comments or otherwise contribute to the IDEP.

Documentation System-Specific Terminology

Document: An electronic file that provides information as an official record. Document examples (i.e., documents with one or more previously completed data fields) may play a similar role to templates in the methods and systems described below, as their data fields can be replaced. Documents include human-readable files that can be read without specialized software, as well as machine-readable documents that can be read with the help of software, such as MICROSOFT WORD (DOCX, DOC), ADOBE (PDF), etc.

DE document: A document with digital engineering (DE) data, for example, project management, program management, design review, and/or engineering data.

Document template: A predetermined page and content layout, with optional style designations, and with designated sample data or data fields to be used as a guide. Templates could be created by a system administrator and/or by another authorized user. A document template may comprise one or more structured document parts having fillable data fields. Templates comprise one or more data fields that may be blank or have placeholder values. Templates also include example or prior documents with completed data fields that are updated or replaced when the example or prior document is used as a starting template for a new document. Templates also include blank or partially filled in documents that serve as starting templates for new documents. Therefore, the term "template" also includes document examples. Indeed, in some of the methods and systems described herein, a template may be defined as any reference starting-point document with a similar structure (e.g., data fields). Therefore, the terms "document template," "template," "example document," "prior example," and "blank document" may be used interchangeably herein, as the context requires.

DE Document template and DE template: A template with fields for DE data, for example, project management, program management, product management, design review, and/or engineering data fields.

Digital documentation: The creation of documents in digital manner in a computer-based system. Based on designated inputs, digital documents are created.

Digitization: The conversion of a process for generating an electronic document or a model, contrasted with either a manual approach or a physical paper-based format.

Document lifecycle: The sequence that a document follows through different phases of a DE product lifecycle, beginning with the creation of the document, possibly from a template, to the update of information within the document based on user inputs, data linked in the computer-based system or using AI-algorithms, to the steps where the document is completed, submitted for review and to the steps of communication and archival, once approved as part of certain documentation purposes.

Recommender engine: A software module that executes a process to recommend one or more DE templates from a DE template library, the DE template library comprising a plurality of templates. The recommender engine may or may not involve a machine learning (ML) model. In some embodiments, the recommender engine comprises a ML model that is an ML algorithm that has been trained and/or fine-tuned on prior data samples.

Generator engine: A software module that executes a process to generate one or more DE documents from a DE template. The DE template used by the generator engine to generate the DE document may come from a template selected by the user, a template recommended by the recommender engine, or a template received from another software process. The generator engine may or may not involve a machine learning (ML) model. In some embodiments, the generator engine comprises a ML model that is an ML algorithm that has been trained and/or fine-tuned on prior data samples. In some embodiments, the generator engine comprises a generative-AI model. In other embodiments, the generator engine comprises a non-generative-AI model.

An Interconnected Digital Engineering Platform (IDEP) Architecture

FIG. 1 shows an exemplary interconnected digital engineering platform (IDEP) architecture, in accordance with some embodiments of the present invention. IDEP 100 streamlines the process of product development from conception to production, by using a virtual representation or digital twin (DTw) 122 of the product to optimize and refine features before building a physical prototype or physical twin (PTw) 132, and to iteratively update DTw 122 until DTw 122 and PTw 132 are in sync to meet the product's desired performance goals.

Specifically, a product (e.g., airplane) manufacturer may use IDEP platform 100 to develop a new product. The engineering team from the manufacturer may create or instantiate digital twin (DTw) 122 of the product in a virtual environment 120, encompassing detailed computer-aided design (CAD) models and finite element analysis (FEA) or computational fluid dynamics (CFD) simulations of component systems such as fuselage, wings, engines, propellers, tail assembly, and aerodynamics. DTw 122 represents the product's design and performance characteristics virtually, allowing the team to optimize and refine features before building a physical prototype 132 in a physical environment 130. In some embodiments, PTw 132 may be an existing entity, while DTw 122 is a digital instance that replicates individual configurations of PTw 132, as-built or as-maintained. In the present disclosure, for illustrative purposes only, DTw 122 and PTw 132 are discussed in the context of building a new product, but it would be understood by persons of ordinary skill in the art that the instantiation of DTw 122 and PTw 132 may take place in any order, based on the particular use case under consideration.

Digital models (e.g., CAD models, FEA models, CFD models) used for creating DTw 122 are shown within a model plane 180 in FIG. 1. Also shown in model plane 180 is a neural network (NN) model 184, which may provide machine-learning based predictive modeling and simulation for a DE process. A DE model such as 182 may be spliced into one or more model splices, such as 172 and 173 within a splice plane 170. Individual DTws such as 122 are instantiated from splice plane 170 via an application plane 160. A model splice such as 172 may be linked to another model splice such as 171 by a platform script or application 162 on application plane 160 into a digital thread. Multiple digital threads such as 162 and 163 may be further linked across different stages or phases of a product life cycle, from concept, design, testing, to production. Digital threads further enable seamless data exchange and collaboration between departments and stakeholders, ensuring optimized and validated designs.

As model splicing provides input and output splice functions that can access and modify DE model data, design updates and DE tasks associated with the digital threads may be represented by scripted, interconnected, and pipelined tasks arranged in Directed Acyclic Graphs (DAGs) such as 124. A DE task DAG example is discussed in further detail with reference to FIG. 1.

To enhance the design, external sensory data 140 may be collected, processed, and integrated into application plane 160. This process involves linking data from different sources, such as physical sensors 134 on prototype 132, physical environmental sensors 136, and other external data streams such as simulation data from model plane 180. API endpoints access digital artifacts from various environments (e.g., physical twin (PTw) sensor 134 data) and integrate them into the spliced plane 170 for the DTw 122. Model splices on the splice plane enable autonomous data linkages and digital thread generation, ensuring DTw 122 accurately represents the product's real-world performance and characteristics.

To validate DTw 122's accuracy, the engineering team may build or instantiate PTw 132 based on the same twin configuration (i.e., digital design). Physical prototype 132 may be equipped with numerous sensors 134, such as accelerometers and temperature sensors, to gather real-time performance data. This data may be compared with the DTw's simulations to confirm the product's performance and verify its design.

Processed sensory data 144 may be used to estimate parameters difficult to measure directly, such as aerodynamic forces or tire contact patch forces. Such processed sensory data provide additional data for DTw 122, further refining its accuracy and reliability. Processed sensory data 144 may be generated from physical environment sensors 136 with physical environment 130, and may be retrieved from other external databases 142, as discussed below.

During development, feedback from customers and market research may be collected to identify potential improvements or adjustments to the product's design. At an analysis & control plane (ACP) 150, subject matter experts (SMEs) may analyze processed sensory data 144 and external expert feedback 114, to make informed decisions on necessary design changes. Such an analysis 154 may be enhanced or entirely enabled by algorithms (i.e., static program code) or artificial intelligence (AI) modules. Linking of digital threads such as 162, physical sensors 134 and 136, processed sensory data 144, and expert feedback data 114 occurs at ACP 150, where sensor and performance data is compared, analyzed, leading to modifications of the underlying model files through digital threads.

In particular, sensory data 144 from physical environment 130 and performance data 126 from virtual environment 120 may be fed into a comparison engine 152. Comparison engine 152 may comprise tools that enable platform users to compare various design iterations with each other and with design requirements, identify performance lapses and trends, and run verification and validation (V&V) tools.

Model splicing is discussed in further detail with reference to FIGS. 7, 8 and 9. Model splicing enables the scripting of any DE operation involving DE model files in model plane 180, where each DE model is associated with disparate and siloed DE tools. Codification of DE models and DE operations with a unified corpus of scripts enable IDEP 100 to become an aggregator where a large space of DE activities associated with a given product (e.g., airplane) may be threaded through program code. Thus, model splicing enables the linking and manipulation of all model files (e.g., 182, 184) associated with a given product within the same interconnected DE platform or DE ecosystem 100. As a consequence, the generation and training of AI modules for the purpose of manipulating DE models (e.g., 182), digital threads (e.g., 162), and digital twins (e.g., 122) become possible over the programmable and unified IDEP 100.

Virtual and Physical Feedback Loops

FIG. 1 uses letter labels "A" to "H" to denote different stages of a product's lifecycle. At each stage, IDEP 100 enables feedback loops whereby data emanating from a PTw or a DTw is analyzed at ACP 150, leading to the generation of a new twin configuration based on design modifications. The new twin configuration may be stored in a twin configuration set and applied through the application and splice planes, yielding modified model files that are registered on the digital thread.

A virtual feedback loop 104 starts with a decision 106 to instantiate new DTw 122. A DAG of hierarchical tasks 124 allows the automated instantiation of DTw 122 within virtual environment 120, based on a twin configuration applied at a process step 108 from a twin configuration set 156. DTw 122 and/or components thereof are then tested in virtual environment 120, leading to the generation of DTw performance data 126. Concurrently, DTw 122 and/or components thereof may be tested and simulated in model plane 180 using DE software tools, giving rise to test and simulation performance data 174. Performance data 126 and 174 may be combined, compared via engine 152, and analyzed at ACP 150, potentially leading to the generation and storage of a new twin configuration. The eventual decision to instantiate a DTw from the new twin configuration completes virtual feedback loop 104.

A physical feedback loop 102 starts with a decision 106 to instantiate a new PTw 132. PTw 132 may be instantiated in a physical environment 130 from the model files of model plane 180 that are associated with an applied twin configuration from the twin configuration set 156. PTw 132 and/or components thereof are then tested in physical environment 132, leading to the generation of sensory data from PTw sensors 134 and environmental sensors 136 located in physical environment 130. This sensory data may be combined with data from external databases to yield processed sensory data 144.

Data from PTw sensors 134 may be directly added to the model files in model plane 180 by the DE software tools used in the design process of PTw 132. Alternatively, PTw sensor data may be added to digital thread 162 associated with PTw 132 directly via application plane 160. In addition, processed sensory data 144 may be integrated into IDEP 100 directly via application plane 160. For example, processed sensory data 144 may be sent to ACP 150 for analysis, potentially leading to the generation and storage of a new twin configuration. The eventual decision to instantiate a PTw from the new twin configuration completes physical feedback loop 102.

At each stage A to H of the product life cycle, the system may label one twin configuration as a current design reference, herein described as an "authoritative twin" or "authoritative reference". The authoritative twin represents the design configuration that best responds to actual conditions (i.e., the ground truth). U.S. provisional patent application No. 63/470,870 provides a more complete description of authoritative twins and their determination, and is incorporated by reference in its entirety herein.

With faster feedback loops from sensor data and expert recommendations, the system updates DTw 122 to reflect latest design changes. This update process may involve engineering teams analyzing feedback 154 and executing the changes through IDEP 100, or automated changes enabled by IDEP 100 where updates to DTw 122 are generated through programmed algorithms or AI modules. This iterative updating process continues until DTw 122 and PTw 132 are in sync and the product's performance meets desired goals. While IDEP 100 may not itself designate the authoritative reference between a DTw or a PTw, the platform provides configurable mechanisms such as policies, algorithms, voting schema, and statistical support, whereby agents may designate a new DTw as the authoritative DTw, or equivalently in what instances the PTw is the authoritative source of truth.

When significant design improvements are made, a new PTw prototype may be built based on the updated DTw. This new prototype undergoes further testing and validation, ensuring the product's performance and design align with project objectives.

Once DTw 122 and PTw 132 have been validated and optimized, the product is ready for production. A digital thread connecting all stages of development can be queried via splice plane 170 to generate documentation as needed to meet validation and verification requirements. The use of model splicing, along with the feedback architecture shown in FIG. 1, improves the efficiency of the overall product innovation process.

Interconnected DE Platform and Product Lifecycle

In FIG. 1, letter labels "A" to "H" indicate the following major steps of a product lifecycle, according to some embodiments of the current invention:

A. Digital models reside within customer environments: a product may be originally represented by model files that are accessible via software tools located within customer environments. Model plane 180 encompasses all model files (e.g., 182) associated with the product.

B. Preparatory steps for design in the digital realm: splice plane 170 encompasses model splices (e.g., 172) generated from DE model file through model splicing. Model splicing enables the integration and sharing of DE model files within a single platform, as described in detail with reference to FIGS. 7, 8 and 9.

C. Link threads as needed among model splices: to implement a product, model splices are linked through scripts within application plane 160. A digital twin (DTw) 122 englobing as-designed product features may be generated from application plane 160 for running in virtual environment 120. The complete twin configuration of a generated DTw is saved in twin configuration set 156 located at the analysis & control plane (ACP) 150. Features or parts of DTw 122 may be simulated in model plane 180, with performance data 174 accessed through splice plane 170. In one embodiment, features or parts of PTw 132 or DTw 122 configuration may be simulated outside the platform, where performance data is received by the ACP 150 for processing, in a similar way as performance data 126 received from DTw 122.

D. Finalize "As-designed": performance data 126 from DTw 122 or simulation performance data 174 attained through model plane 180 and accessed through model splicing may be collected and sent to ACP 150 for analysis. Performance data from different iterations of DTw 122 may be compared via engine 152 to design requirements. Analysis of the differences may lead to the generation of new twin configurations that are stored at twin configuration set 156. Each twin configuration in twin configuration set 156 may be applied at application plane 160 and splice plane 170 via process step 108 to instantiate a corresponding DTw. Multiple DTws may be generated and tested, consecutively or simultaneously, against the design requirements, through comparison engine 152 and analysis module 154. Verification and validation tools may be run on the various DTw iterations.

E. Finalize "As-manufactured": once a DTw 122 satisfies the design requirements, a corresponding PTw 132 prototype may be instantiated from the spliced model files (e.g., 172). Sensor data originating from the PTw 134 or from within the physical environment 136 may be collected, combined with other external data 142 (e.g., sensor data from other physical environments). The resulting processed sensory data 144 may be sent to the analysis & control plane 150 to be compared with performance data 126 from DTws and simulations (e.g., 174), leading to further DTw 122 and PTw 132 iterations populating the twin configuration set 156. Processed sensory data 144 may also be mapped to the digital threads (e.g., 164) and model splices (e.g., 172) governing the tested PTw 132 through the application plane 160.

F. Finalize "As-assembled": once the manufacturing process is completed for the various parts, as a DTw and as a PTw, the next step is to finalize the assembled configuration. This involves creating a digital representation of the assembly to ensure it meets the specified requirements. The digital assembly takes into account the dimensions and tolerances of the "as-manufactured" parts. To verify the feasibility of the digital assembly, tests are conducted using the measured data obtained from the physical assembly and its individual components. Measurement data from the physical component parts may serve as the authoritative reference for the digital assembly, ensuring alignment with the real-world configuration. The digital assembly is compared with the actual physical assembly requirements for validation of the assembled configuration. Subsequently, the digital assembly tests and configurations serve as an authoritative reference for instructions to guide the physical assembly process and ensure accurate replication. IDEP 100 components described above may be used in the assembly process. In its authoritative iteration, DTw 122 ultimately captures the precise details of the physical assembly, enabling comprehensive analysis and control in subsequent stages of the process.

G. Finalize "As-operated": to assess the performance of the physical assembly or its individual component parts, multiple digital twins 122 may be generated as needed. These digital twins are created based on specific performance metrics and serve as virtual replicas of the physical system. Digital twins 122 are continuously updated and refined in real-time using the operational data (e.g., 144) collected from monitoring the performance of the physical assembly or its components. This data may include, but are not limited to, processed sensory data, performance indicators, and other relevant information. By incorporating this real-time operational data, digital twins 122 stay synchronized with the actual system and provide an accurate representation of its operational performance. Any changes or improvements observed via sensory data 144 during the real-world operation of the assembly are reflected in DE models within the digital twins and recorded in the twin configuration set 156. This ensures that the digital twins remain up-to-date and aligned with the current state of the physical system.

H. Predictive analytics/Future performance: The design process may continue iteratively in virtual environment 120 through new DTw 122 configurations as the product is operated. Multiple digital twins may be created to evaluate the future performance of the physical assembly or its component parts based on specific performance metrics. Simulations are conducted with various control policies to assess the impact on performance objectives and costs. The outcome of these simulations helps in deciding which specific control policies should be implemented (e.g., tail volume coefficients and sideslip angle for an airplane product). The digital twin DE models (e.g., 182) are continuously updated and refined using the latest sensor data, control policies, and performance metrics to enhance their predictive accuracy. This iterative process ensures that the digital twins (e.g., 122, 156) provide reliable predictions of future performance and assist in making informed decisions.

The hardware components making up IDEP 100 (e.g., servers, computing devices, storage devices, network links) may be centralized or distributed among various entities, including one or more DE service providers and DE clients, as further discussed in the context of FIGS. 3 and 4. FIG. 4 shows an illustration of various potential configurations for instancing a DE platform within a customer's physical system and information technology (IT) environment, usually a virtual private cloud (VPC) protected by a firewall.

De Documentation with Live or Magic Documents

The methods and systems described herein enable the updating and generation of DE documents using the full functionality of the IDEP shown in FIG. 1. In FIG. 1, the IDEP virtual feedback loop 104 allows the scripting of program code within a digital thread 162 for the generation, storing, and updating of digital twins 122 and twin configurations 156. Similarly, the IDEP virtual feedback loop 104 also allows the scripting of program code within a digital thread 162 for the generation, storing, and updating of DE documents. This enables the creation and maintenance of so-called live digital engineering documents.

Live DE documents are more akin to a DTw than a conventional static document in that they are configured, through a digital thread, to be continuously updated to reflect the most current changes within a particular twin configuration. In particular, an authoritative live DE document is configured to reflect the latest authoritative twin configuration. The "printing" of a live DE document corresponds to the generation of a frozen (i.e., static) time-stamped version of a live DE document. Therefore, "printing"—for a live DE document—is equivalent to "instantiation" for a DTw.

Live DE documents may also be known as magic documents as changes implemented within a twin configuration (e.g., through a modification of a model file) may appear instantaneously within the relevant data fields and sections of the live DE document. Similarly, authoritative live DE documents may also be known as authoritative magic documents as they continuously reflect data from the authoritative twin, thus always representing the authoritative source of truth.

Given the massive quantities of data and potential modifications that are carried out during a product's lifecycle, the scripts implementing live DE documentation may be configured to allow for a predefined maximum delay between the modification of a model file and the execution of the corresponding changes within a live DE document. Moreover, for similar reasons, the scripts implementing live DE documentation may be restricted to operate over a specified subset of model files within a DTw, thus reflecting changes only to key parameters and configurations of the DTw.

In one embodiment of the present invention, an IDEP script (e.g., an IDEP application) having access to model data via one or more model splices and DE document templates to create and/or update a live DE document may dynamically update the live DE document using software-defined digital threads over an IDEP platform. In such an embodiment, the IDEP script may receive user interactions dynamically. In response to the user updating data for a model and/or a specific parameter setting, the IDEP script may dynamically propagate the user's updates into the DE document through a corresponding digital thread.

In another embodiment of the present invention, the IDEP script may instantiate a DE document with sufficient specification to generate a physical twin (PTw). In such an embodiment, the IDEP script may receive a digital twin configuration of a physical twin, generate a live DE document associated with the digital twin configuration, receive a predetermined timestamp, and generate a printed DE document (i.e., a static, time-stamped version of the live DE document at the predetermined timestamp). Such an operation may be referred to as the "printing of a digital twin".

In yet another embodiment of the present invention, an IDEP script may instantiate (i.e., "print") a DE document specifying an updated digital twin upon detecting the update. In such an embodiment, the IDEP script may detect a modification of a DE model or an associated digital thread. In response to detecting the modification, the IDEP script may update relevant data fields and sections of the live DE document based on the detected modification, and generate an updated printed DE document with the updated relevant data fields and sections based on the always-updated live DE document.

In some embodiments, receiving user interactions with a DE model, modifications to a DE model, or modifications to an associated digital thread, may be carried out through a push configuration, where a model splicer or a script of the digital thread sends any occurring relevant updates to the IDEP script immediately or within a specified maximum time delay. In other embodiments, receiving user interactions with a DE model, modifications of a DE model, or modifications of an associated digital thread, may be carried out through a pull configuration, where a model splicer or a script of the digital thread flag recent modifications until the IDEP script queries relevant DE models (via their model splices) or associated digital threads, for flagged modification. In these embodiments, the IDEP script may extract the modified information from the modified DE models (via their model splices) or the modified digital threads, in order to update a live DE document. In yet other embodiments, receiving user interactions with a DE model, modifications of a DE model, or modifications of an associated digital thread, may be carried out through a pull configuration, where the IDEP script regularly checks relevant DE models (via their model splices) or associated digital threads, for modified data fields, by comparing the data found in the live DE document with regularly extracted model and digital thread data. In these embodiments, the IDEP script may use the modified data to update the live DE document.

Dynamic Document Updates

Some embodiments described herein center around documentation, or document preparation and update and on document management (e.g., for reviews). As discussed, some embodiments of the system allow for dynamic updates to documents, which pertain to software-defined digital threads in the IDEP platform and the accompanying documentation.

Use of an ML engine with the model data and templates to create and/or update documents almost instantaneously as a one-time action have been presented. Furthermore, the digital engineering platform interacts dynamically with the user. As the user interacts with the system and updates data for a model or a specific parameter setting, these changes may be propagated through the corresponding digital threads and to the associated documentation. The AI architectures involved include locally-instanced LLMs (for data security reasons) as well as non-LLM approaches (e.g., NLP-based), in order to create, update, or predict documentation in the form of sentences, paragraphs, and whole documents. At the same time, trying to update the entire system of digital threads for every update may be prohibitively slow and may present security risks to the system. Generating live DE documents that are updated based on a subset of a system's DE models and within a maximum time delay is therefore preferable.

Interconnected Digital Engineering and Certification Ecosystem

FIG. 2 shows an exemplary implementation of the IDEP as an interconnected digital engineering (DE) and certification ecosystem 200, and exemplary digitally certified products, in accordance with some embodiments of the present invention. Interconnected DE and certification ecosystem 200 may be viewed as a particular instantiation or implementation of IDEP 100 shown in FIG. 1. The IDEP may also be referred to as a "DE Metaverse."

Interconnected DE and certification ecosystem 200 is a computer-based system that links models and simulation tools with their relevant requirements in order to meet verification, validation, and certification purposes. Verification refers to methods of evaluating whether a product, service, or system meets specified requirements and is fit for its intended purpose. For example, in the aerospace industry, a verification process may include testing an aircraft component to ensure it can withstand the forces and conditions it will encounter during flight. Verification also includes checking externally against customer or stakeholder needs. Validation refers to methods of evaluating whether the overall performance of a product, service, or system is suitable for its intended use, including its compliance with regulatory requirements and its ability to meet the needs of its intended users. Validation also includes checking internally against specifications and regulations. Interconnected DE and certification ecosystem 200 as disclosed herein is designed to connect and bridge large numbers of disparate DE tools and models from multitudes of engineering domains and fields, or from separate organizations who may want to share models with each other but have no interactions otherwise. In various embodiments, the system implements a robust, scalable, and efficient DE model collaboration platform, with extensible model splices having data structures and accompanying functions for widely distributed DE model types and DE tools, an application layer that links or connects DE models via APIs, digital threads that connect live engineering model files for collaboration and sharing, digital documentation management to assist with the preparation of engineering and certification documents appropriate for verification and validation (V&V) purposes, and AI-assistance with the functionalities of the aforementioned system components.

More specifically, FIG. 2 shows an example of an interconnected DE and certification ecosystem and examples of digitally certified products 212A, 212B, and 212C (collectively referred to as digitally certified products 212). For example, in some implementations, digitally certified product 212A may be an unmanned aerial vehicle (UAV) or other aircraft, digitally certified product 212B may be a drug or other chemical or biologic compound, and the digitally certified product 212C may be a process such as a manufacturing process. In general, the digitally certified products 212 can include any product, process, or solution that can be developed, tested, or certified (partially or entirely) using DE tools such as 202. In some implementations, digitally certified products 212 may not be limited to physical products, but can include non-physical products such as methodologies, processes and software, etc. While physical and physically-interacting systems often require multiple DE tools to assess for compliance with common V&V products simply by virtue of the need for modeling and simulation (M&S), many complex non-physical systems may also require multiple DE tools for product development, testing, and/or certification. With this in mind, various other possibilities for digitally certified products will be recognized by one of ordinary skills in the art. The inclusion of regulatory and certification standards, compliances, calculations, and tests (e.g., for the development, testing, and certification of products and/or solutions) enables users to incorporate relevant regulatory and certification standards, compliances, calculations, and test data directly into their DE workflow. Regulatory and certification standards, compliances, calculations, and tests are sometimes referred to herein as "common validation and verification (V&V) products."

Digitally certified products 212 in FIG. 2 may be designed and/or certified using interconnected DE and certification ecosystem 200. Interconnected DE and certification ecosystem 200 may include a user device 206A, API 206B, or other similar human-to-machine, or machine-to-machine communication interfaces operated by a user. A user may be a human 204 of various skill levels, or artificial users such as algorithms, artificial intelligence, or other software that interface with ecosystem 200 through API 206B. Ecosystem 200 may further comprise a computing system 208 connected to and/or including a data storage unit 218, an artificial intelligence (AI) engine 220, and an application and service layer 222. In some embodiments, the artificial intelligence (AI) engine 220 is a machine learning (ML) engine. References to "machine learning engine 220" or "ML engine 220" may be extended to artificial intelligence (AI) engines 220 more generally. For the purposes of clarity, any user selected from various potential human or artificial users are referred to herein simply as the user 204. In some implementations, computing system 208 may be a centralized computing system; in some implementations, computing system 208 may be a distributed computing system. In some cases, user 204 may be considered part of ecosystem 200, while in other implementations, user 204 may be considered separately from ecosystem 200. Ecosystem 200 may include one or more DE tools 202, such as data analysis tool 202A, computer-aided design (CAD) and finite element analysis (FEA) tool 202B, simulation tool 202C, drug modeling and simulation (M&S) tools 202D-202E, manufacturing M&S tools 202F-202G, etc. Ecosystem 200 may also include a repository of common V&V products 210, such as regulatory standards 210A-210F related to the development and certification of a UAV, medical standard 210G (e.g., CE marking (Europe), FCC Declaration of Conformity (USA), IECEE CB Scheme (Europe, North America, parts of Asia & Australia), CDSCO (India), FDA (USA), etc.), medical certification regulation 210H (e.g., ISO 13485, ISO 14971, ISO 9001, ISO 62304, ISO 10993, ISO 15223, ISO 11135, ISO 11137, ISO 11607, IEC 60601, etc.), manufacturing standard 210I (e.g., ISO 9001, ISO 9013, ISO 10204, EN 1090, ISO 14004, etc.), and manufacturing certification regulation 210J (e.g., General Certification of Conformity (GCC), etc.), etc.

In FIG. 2, computing system 208 is centrally disposed within the architecture and is configured to communicate with (e.g., receive data from and transmit data to) user device 206A or API 206B such as an API associated with an artificial user, DE tools 202 via an API or software development kit (SDK) 214, and repository of common V&V products 210 via an API/SDK interface 216. For example, computing system 208 may be configured to communicate with user device 206A and/or API 206B to send or receive data corresponding to a prototype of a design, information about a user (e.g., user credentials), engineering-related inputs/outputs associated with DE tools 202, digitized common V&V products, an evaluation of a product design, user instructions (e.g., search requests, data processing instructions, etc.), and more. Computing system 208 may also be configured to communicate with one or more DE tools 202 to send engineering-related inputs for executing analyses, models, simulations, tests, etc. and to receive engineering-related outputs associated with the results. Computing system 208 may also be configured to communicate with repository of common V&V products 210 to retrieve data corresponding to one or more digitized common V&V products 210 and/or upload new common V&V products, such as those received from user 204, to repository of common V&V products 210. All communications may be transmitted and corroborated securely, for example, using methods relying on zero-trust security. In some implementations, the computing system of the ecosystem may interface with regulatory and/or certification authorities (e.g., via websites operated by the authorities) to retrieve digitized common V&V products published by the regulatory authorities that may be relevant for a product that a user is designing. In some implementations, the user may upload digitized common V&V products to the ecosystem themselves.

Computing system 208 may process and/or store the data that it receives, and in some implementations, may access machine learning engine 220 and/or application and service layer 222, to identify useful insights based on the data, as further described herein. The central disposition of computing system 208 within the architecture of the ecosystem has many advantages including reducing the technical complexity of integrating the various DE tools; improving the product development experience of user 204; intelligently connecting common V&V products such as standards 210A-210F to DE tools 202 most useful for satisfying requirements associated with the common V&V products; and enabling the monitoring, storing, and analysis of the various data that flows between the elements of the ecosystem throughout the product development process. In some implementations, the data flowing through and potentially stored by the computing system 208 can also be auditable to prevent a security breach, to perform data quality control, etc.

Referring to one particular example shown in FIG. 2, user 204 may use the DE and certification ecosystem to produce a digitally certified UAV 212B. For example, user 204 may be primarily concerned with certifying the UAV as satisfying the requirements of a particular regulatory standard 210E relating to failure conditions of the UAV (e.g., "MIL-HDBK 516C 4.1.4—Failure Conditions"). In this usage scenario, user 204 may develop a digital prototype of the UAV on user device 206A or using API 206B and may transmit prototype data (e.g., as at least one of a CAD file, a MBSE file, etc.) to computing system 208. Along with the prototype data, user 204 can transmit, via user device 206A, additional data including an indication of the common V&V product that user 204 is interested in certifying the product for (e.g., regulatory standard 210E), user credential information for accessing one or more capabilities of computing system 208, and/or instructions for running one or more digital models, tests, and/or simulations using a subset of DE tools 202.

Referring to another example shown in FIG. 2, user 204 can use the DE and certification ecosystem to produce a digitally certified drug, chemical compound, or biologic 212A. For example, user 204 may be primarily concerned with certifying drug, chemical compound, or biologic 212A as satisfying the requirements of a particular medical standard 210G and medical certification regulation 210H. In this usage scenario, user 204 can develop a digital prototype of the drug, chemical compound, or biologic on user device 206A or using API 206B and can transmit the prototype data (e.g., as a molecular modeling file) to computing system 208. Along with the prototype data, user 204 can transmit, via user device 206A, additional data including an indication of the common V&V products that user 204 is interested in certifying the product for (e.g., medical standard 210G and medical certification regulation 210H), user credential information for accessing one or more capabilities of computing system 208, and/or instructions for running one or more digital models, tests, and/or simulations using a subset of DE tools 202 (e.g., drug M&S tools 202D-202E).

Referring to yet another example shown in FIG. 2, user 204 can use the digital engineering and certification ecosystem to produce a digitally certified manufacturing process 212C. For example, user 204 may be primarily concerned with certifying manufacturing process 212C as satisfying the requirements of a particular manufacturing standard 210I and manufacturing certification regulation 210J. In this usage scenario, user 204 can develop a digital prototype of the manufacturing process on user device 206A or using API 206B and can transmit the prototype data to computing system 208. Along with the prototype data, user 204 can transmit, via the user device 206A, additional data including an indication of the common V&V products that user 204 is interested in certifying the process for (e.g., manufacturing standard 210I and manufacturing certification regulation 210J), user credential information for accessing one or more capabilities of computing system 208, and/or instructions for running one or more digital models, tests, and/or simulations using a subset of DE tools 202 (e.g., manufacturing M&S tools 202F-202G).

In any of the aforementioned examples, computing system 208 can receive the data transmitted from user device 206A and/or API 206B and can process the data to evaluate whether the common V&V product of interest (e.g., regulatory standard 210E, medical standard 210G, medical certification regulation 210H, manufacturing standard 210I, manufacturing certification regulation 210J, etc.) is satisfied by the user's digital prototype. For example, this can involve communicating with the repository of common V&V products 210 via the API/SDK 216 to retrieve the relevant common V&V product of interest and processing the regulatory and/or certification data associated with the common V&V product to identify one or more requirements for the UAV prototype; the drug, chemical compound, or biologic prototype; the manufacturing process prototype; etc. In some implementations, repository of common V&V products 210 can be hosted by a regulatory and/or certification authority (or another third party), and retrieving the regulatory and/or certification data can involve using API/SDK 216 to interface with one or more data resources maintained by the regulatory and/or certification authority (or the another third party). In some implementations, the regulatory and/or certification data can be provided directly by user 204 via user device 206A and/or API 206B (e.g., along with the prototype data).

Evaluating whether the common V&V product of interest is satisfied by the user's digital prototype can also involve processing the prototype data received from user device 206A or API 206B to determine if the one or more identified requirements are actually satisfied. In some implementations, computing system 208 can include one or more plugins, local applications, etc. to process the prototype data directly at the computing system 208. In some implementations, the computing system can simply pre-process the received prototype data (e.g., to derive inputs for DE tools 202) and can then transmit instructions and/or input data to a subset of DE tools 202 via API/SDK 214 for further processing.

Not all DE tools 2102 are necessarily required for the satisfaction of particular regulatory and/or certification standards. Therefore, in the UAV example provided in FIG. 2, computing system 208 may determine that only a data analysis tool 202A and a finite element analysis tool 202B are required to satisfy regulatory standard 210E for failure conditions. In the drug, chemical compound, or biologic example provided in FIG. 2, computing system 208 may determine that only drug M&S tools 202D-202E are required to satisfy medical standard 210G and medical certification regulation 210H. In the manufacturing process example provided in FIG. 2, computing system 208 may determine that only manufacturing M&S tools 202F-202G are required to satisfy manufacturing standard 210I and manufacturing certification regulation 210J. In other implementations, user 204 may themselves identify the particular subset of DE tools 202 that should be used to satisfy the common V&V product of interest, provided that user 204 is a qualified subject matter expert (SME). In other implementations, user 204 may input to computing system 208 some suggested DE tools 202 to satisfy a common V&V product of interest, and computing system 208 can recommend to user 204 a modified subset of DE tools 202 for final approval by user 204, provided that user 204 is a qualified SME. After a subset of DE tools 202 has been identified, computing system 208 can then transmit instructions and/or input data to the identified subset of DE tools 202 to run one or more models, tests, and/or simulations. The results (or "engineering-related data outputs") of these models, tests, and/or simulations can be transmitted back and received at computing system 208.

In still other implementations, user 204 may input a required DE tool such as 202F for meeting a common V&V product 210I, and the computing system 208 can determine that another DE tool such as 102G is also required to satisfy common V&V product 210I. The computing system can then transmit instructions and/or input data to both DE tools (e.g., 202F and 202G), and the outputs of these DE tools can be transmitted and received at computing system 208. In some cases, the input data submitted to one of the DE tools (e.g., 202G) can be derived (e.g., by computing system 208) from the output of another of the DE tools (e.g., 202F).

After receiving engineering-related data outputs from DE tools 202, computing system 208 can then process the received engineering-related data outputs to evaluate whether or not the requirements identified in the common V&V product of interest (e.g., regulatory standard 210E, medical standard 2110G, medical certification regulation 210H, manufacturing standard 210I, manufacturing certification regulation 210J, etc.) are satisfied. In some implementations, computing system 208 can generate a report summarizing the results of the evaluation and can transmit the report to device 206A or API 206B for review by user 204. If all of the requirements are satisfied, then the prototype can be certified, resulting in digitally certified product 212 (e.g., digitally certified drug, chemical compound, or biologic 212A; digitally certified UAV 212B; digitally certified manufacturing process 212C, etc.). However, if some of the regulatory requirements are not satisfied, then additional steps may need to be taken by user 204 to certify the prototype of the product. In some implementations, the report that is transmitted to the user can include recommendations for these additional steps (e.g., suggesting one or more design changes, suggesting the replacement of one or more components with a previously designed solution, suggesting one or more adjustments to the inputs of the models, tests, and/or simulations, etc.). If the requirements of a common V&V product are partially met, or are beyond the collective capabilities of distributed engineering tools 202, computing systems 208 may provide user 204 with a report recommending partial certification, compliance, or fulfillment of a subset of the common V&V products (e.g., digital certification of a subsystem or a sub-process of the prototype). The process of generating recommendations for user 204 is described in further detail below.

In response to reviewing the report, user 204 can make design changes to the digital prototype locally and/or can send one or more instructions to computing system 208 via user device 206A or API 206B. These instructions can include, for example, instructions for computing system 208 to re-evaluate an updated prototype design, use one or more different DE tools 202 for the evaluation process, and/or modify the inputs to DE tools 202. Computing system 208 can, in turn, receive the user instructions, perform one or more additional data manipulations in accordance with these instructions, and provide user 204 with an updated report. Through this iterative process, user 204 can utilize the interconnected digital engineering and certification ecosystem to design and ultimately certify (e.g., by providing certification compliance information) the prototype (e.g., the UAV prototype, drug prototype, manufacturing process prototype, etc.) with respect to the common V&V product of interest. Importantly, since all of these steps occur in the digital world (e.g., with digital prototypes, digital models/tests/simulations, and digital certification), significant amount of time, cost, and materials can be saved in comparison to a process that would involve the physical prototyping, evaluation and/or certification of a similar UAV, drug, manufacturing process, etc. If the requirements associated with a common V&V product are partially met, or are beyond the collective capabilities of DE tools 202, computing system 208 may provide user 204 with a report recommending partial certification, compliance or fulfillment of a subset of the common V&V products (e.g., digital certification of a subsystem or a sub-process of the prototype).

While the examples described above focus on the use of the interconnected digital engineering and certification ecosystem by a single user, additional advantages of the ecosystem can be realized through the repeated use of the ecosystem by multiple users. As mentioned above, the central positioning of computing system 208 within the architecture of the ecosystem enables computing system 208 to monitor and store the various data flows through the ecosystem. Thus, as an increasing number of users utilize the ecosystem for digital product development, data associated with each use of the ecosystem can be stored (e.g., in storage 218) and analyzed to yield various insights, which can be used to further automate the digital product development process and to make the digital product development process easier to navigate for non-subject matter experts.

Indeed, in some implementations, user credentials for user 204 can be indicative of the skill level of user 204, and can control the amount of automated assistance the user is provided. For example, non-subject matter experts may only be allowed to utilize the ecosystem to browse pre-made designs and/or solutions, to use DE tools 202 with certain default parameters, and/or to follow a predetermined workflow with automated assistance directing user 204 through the product development process. Meanwhile, more skilled users may still be provided with automated assistance, but may be provided with more opportunities to override default or suggested workflows and settings.

In some implementations, computing system 208 can host applications and services 222 that automate or partially automate components of common V&V products; expected or common data transmissions, including components of data transmissions, from user 204; expected or common interfaces and/or data exchanges, including components of interfaces, between various DE tools 202; expected or common interfaces and/or data exchanges, including components of interfaces, with machine learning (ML) models implemented on computing system 208 (e.g., models trained and/or implemented by the ML engine 220); and expected or common interfaces and/or data exchanges between the applications and services themselves (e.g., within applications and services layer 222).

In some implementations, the data from multiple uses of the ecosystem (or a portion of said data) can be aggregated to develop a training dataset. This training dataset can then be used to train ML models (e.g., using ML engine 220) to perform a variety of tasks including the identification of which of DE tools 202 to use to satisfy a particular common V&V product; the identification of specific models, tests, and/or simulations (including inputs to them) that should be performed using DE tools 202; the identification of the common V&V products that need to be considered for a product of a particular type; the identification of one or more recommended actions for user 204 to take in response to a failed regulatory requirement; the estimation of model/test/simulation sensitivity to particular inputs; etc. The outputs of the trained ML models can be used to implement various features of the interconnected digital engineering and certification ecosystem including automatically suggesting inputs (e.g., inputs to DE tools 202) based on previously entered inputs, forecasting time and cost requirements for developing a product, predictively estimating the results of sensitivity analyses, and even suggesting design changes, original designs or design alternatives (e.g. via assistive or generative AI) to a user's prototype to overcome one or more requirements (e.g., regulatory and/or certification requirements) associated with a common V&V product. In some implementations, with enough training data, ML engine 220 may generate new designs, models, simulations, tests, and/or common V&V products on its own based on data collected from multiple uses of the ecosystem.

In addition to storing usage data to enable the development of ML models, previous prototype designs and/or solutions (e.g., previously designed components, systems, models, simulations and/or other engineering representations thereof) can be stored within the ecosystem (e.g., in storage 218) to enable users to search for and build upon the work of others. For example, previously designed components, systems, models, simulations and/or other engineering representations thereof can be searched for by user 204 and/or suggested to user 204 by computing system 208 in order to satisfy one or more requirements associated with a common V&V product. The previously designed components, systems, models, simulations and/or other engineering representations thereof can be utilized by user 204 as is, or can be utilized as a starting point for additional modifications. This store, or repository, of previously designed components, systems, models, simulations and/or other engineering representations thereof (whether or not they were ultimately certified) can be monetized to create a marketplace of digital products, which can be utilized to save time during the digital product development process, inspire users with alternative design ideas, avoid duplicative efforts, and more. In some implementations, data corresponding to previous designs and/or solutions may only be stored if the user who developed the design and/or solution opts to share the data. In some implementations, the repository of previous designs and/or solutions can be containerized for private usage within a single company, team, organizational entity, or technical field for private usage (e.g., to avoid the unwanted disclosure of confidential information). In some implementations, user credentials associated with user 204 can be checked by computing system 208 to determine which designs and/or solutions stored in the repository can be accessed by user 204. In some implementations, usage of the previously designed components, systems, models, simulations and/or other engineering representations thereof may be available only to other users who pay a fee for a usage.

The advent of model splicing as described herein enables the scripting of DE model operations encompassing disparate DE tools into a corpus of normative program code. As a consequence, a large space of DE activities can be threaded into program code, enabling the generation and training of ML and artificial intelligence (AI) modules for the purpose of manipulating DE models, digital threads, and digital twins. Furthermore, ML and AI techniques may be used to create scripts to carry out almost any DE task. This allows for programmable, machine-learnable, and dynamic changes to DE model files, digital threads, and ultimately to digital or physical twins, throughout the product life cycle.

In the embodiment shown in FIG. 2, ML engine 220 may manage the interactions between spliced files, tools, and DE requirements. Sample DE tasks that may be carried out by ML engine 220 include, but are not limited to, (1) aligning models/analysis to certification lifecycle requirement steps, (2) optimizing compute by determining the appropriate fidelity of each model, (3) optimizing compute resources for specific tools/models, or (4) optimizing compute resources across multiple models. However, DE tasks are not limited to certification or resource optimization, and encompass the whole DE space of operations. Rather, ML engine 220 may act as an AI multiplexer for the DE platform.

Exemplary IDEP Implementation Architecture with Services and Features

FIG. 3 shows another exemplary implementation of the IDEP illustrating its offered services and features, in accordance with some embodiments of the present invention. Specifically, an exemplary implementation architecture diagram 300 is shown in FIG. 3 to include multiple illustrative components: an IDEP enclave 302, cloud services 304, and a customer environment 310 which optionally includes an IDEP exclave 316. This exemplary architecture 300 for the IDEP is designed in accordance with zero-trust security principles and is further designed to support scalability as well as robust and resilient operations. IDEP enclave 302 and IDEP exclave 316 together instantiate IDEP 100 shown in FIG. 1, with IDEP exclave 316 implementing model splicing and splice plane 170 in some embodiments of the present invention. An enclave is an independent set of cloud resources that are partitioned to be accessed by a single customer (i.e., single-tenant) or market (i.e., multi-tenant) that does not take dependencies on resources in other enclaves. An exclave is a set of cloud resources outside enclaves managed by the IDEP, to perform work for individual customers. Examples of exclaves include virtual machines (VMs) and/or servers that the IDEP maintains to run DE tools for customers who need such services.

In particular, IDEP enclave or DE platform enclave 302 may serve as a starting point for services rendered by the IDEP, and may be visualized as a central command and control hub responsible for the management and orchestration of all platform operations. For example, enclave 302 may be implemented using computer system 208 of the interconnected DE and certification ecosystem shown in FIG. 2. DE platform enclave 302 is designed to integrate both zero-trust security models and hyperscale capabilities, resulting in a secure and scalable processing environment tailored to individual customer needs. Zero-trust security features include, but are not limited to, strict access control, algorithmic impartiality, and data isolation. Enclave 302 also supports an ML engine such as 220 for real-time analytics, auto-scaling features for workload adaptability, and API-based interoperability with third-party services. Security and resource optimization are enhanced through multi-tenancy support, role-based access control, and data encryption both at rest and in transit. DE platform enclave 302 may also include one or more of the features described below.

First, IDEP enclave 302 may be designed in accordance with zero-trust security principles. In particular, DE platform enclave 302 may employ zero-trust principles to ensure that no implicit trust is assumed between any elements, such as digital models, platform agents or individual users (e.g., users 204) or their actions, within the system. The model is further strengthened through strict access control mechanisms, limiting even the administrative team (e.g., a team of individuals associated with the platform provider) to predetermined, restricted access to enclave resources. To augment this robust security stance, data encryption is applied both at rest and in transit, effectively mitigating risks of unauthorized access and data breaches.

IDEP enclave 302 can also be designed to maintain isolation and independence. A key aspect of the enclave's architecture is its focus on impartiality and isolation. DE enclave 302 disallows cryptographic dependencies from external enclaves and enforces strong isolation policies. The enclave's design also allows for both single-tenant and multi-tenant configurations, further strengthening data and process isolation between customers 306 (e.g., users 204). Additionally, DE enclave 302 is designed with decoupled resource sets, minimizing interdependencies and thereby promoting system efficiency and autonomy.

IDEP enclave 302 can further be designed for scalability and adaptability, aligning well with varying operational requirements. For example, the enclave 302 can incorporate hyperscale-like properties in conjunction with zero-trust principles to enable scalable growth and to handle high-performance workloads effectively.

IDEP enclave 302 can further be designed for workflow adaptability, accommodating varying customer workflows and DE models through strict access control mechanisms. This configurability allows for a modular approach to integrate different functionalities ranging from data ingestion to algorithm execution, without compromising on the zero-trust security posture. Platform 300's adaptability makes it highly versatile for a multitude of use-cases, while ensuring consistent performance and robust security.

IDEP enclave 302 can further be designed to enable analytics for robust platform operations. At the core of the enclave's operational efficiency is a machine learning engine (e.g., machine learning engine 220) capable of performing real-time analytics. This enhances decision-making and operational efficiency across platform 300. Auto-scaling mechanisms can also be included to enable dynamic resource allocation based on workload demand, further adding to the platform's responsiveness and efficiency.

In the exemplary embodiment shown in FIG. 3, IDEP enclave 302 includes several components as described in further detail herein.

A "Monitoring Service Cell. may provide "Monitoring Service" and "Telemetry Service." A cell may refer to a set of microservices, for example, a set of microservices executing within a kubernetes pod. These components focus on maintaining, tracking and analyzing the performance of platform 300 to ensure optimal service delivery, including advanced machine learning capabilities for real-time analytics. A "Search Service Cell" provides "Search Service" to aid in the efficient retrieval of information from DE platform 300, adding to its overall functionality. A "Logging Service Cell" and a "Control Plane Service Cell" provides "Logging Service," "File Service", and "Job Service" to record and manage operational events and information flow within platform 300, and instrumental in the functioning of platform 300. A "Static Assets Service Cell," provides "Statics Service", and may house user interface, SDKs, command line interface (CLI), and documentation for platform 300. An "API Gateway Service Cell" provides "API Gateway Service," and may provide DE platform API(s) (e.g., APIs 214, 216) and act as a mediator for requests between the client applications (e.g., DE tools 202, the repository of common V&V products 210, etc.) and the platform services.

As shown in FIG. 3, the architecture of DE platform 300 may also include a cloud services 304 that provide services which cannot interact with customer data but can modify the software for the orchestration of DE platform operations. In example implementations, several cloud resources provide support and foundational services to the platform. For example, in the embodiment of the DE platform 300 shown in FIG. 3, cloud services 304 includes a "Customer Identity and Access Management (IAM) Service" that ensures secure and controlled access to platform 300. Cloud services 304 also includes a "Test Service" that tests tools to validate platform operations. Cloud services 304 may also include an "Orchestration Service" that controls and manages the lifecycle of containers on the platform 300. Cloud services 304 may also include an "Artifact Service" and "Version Control and Build Services," which are crucial in maintaining the evolution of projects, codes, and instances in the system, while also managing artifacts produced during the product development process.

As shown in FIG. 3, the architecture of DE platform 300 may also include a customer environment 310 with an "Authoritative Source of Truth" 312, customer tools 314, and an optional DE platform exclave 316. Customer environment 310 is where customer data resides and is processed in a zero-trust manner by DE platform 300. As described previously, DE platform enclave 302, by focusing on both zero-trust principles and hyperscale-like properties, provides a robust and scalable environment for the secure processing of significant workloads, according to the customer's unique needs. In some examples, DE platform exclave 316 may be situated within customer environment 310 in order to assist the customer(s) 306 with their DE tasks and operations, including model splicing and digital threading.

When a customer 306 (e.g., user 204) intends to perform a DE task using DE platform 300 (e.g., IDEP 100), typical operations may include secure data ingestion and controlled data retrieval. Derivative data generated through the DE operations, such as updated digital model files or revisions to digital model parameters, may be stored only within customer environment 310, and DE platform 300 may provide tools to access the metadata of the derivative data. Here metadata refers to data that can be viewed without opening the original data. Example implementations may include secure data ingestion, which utilizes zero-trust principles to ensure customer data is securely uploaded to customer environment 310 through a pre-validated secure tunnel, such as Secure Socket Layer (SSL) tunnel. This can enable direct and secure file transfer to a designated cloud storage, such as a simple storage service (S3) bucket, within customer environment 310. Example implementations may also include controlled data retrieval, in which temporary, pre-authenticated URLs generated via secure token-based mechanisms are used for controlled data access, thereby minimizing the risk of unauthorized interactions. Example implementations may also include immutable derivative data, with transformed data generated through operations like data extraction being securely stored within customer environment 310 while adhering to zero-trust security protocols. Example implementations may also include tokenization utility, in which a specialized DE platform tool referred to as a "tokenizer" is deployed within customer environment 310 for secure management of derivative metadata, conforming to zero-trust guidelines.

Customer environment 310 may interact with other elements of secure DE platform 300 and includes multiple features that handle data storage and secure interactions with platform 300. For example, one element of the customer environment 310 is "Authoritative Source of Truth" 312, which is a principal repository for customer data, ensuring data integrity and accuracy. Nested within this are "Customer Buckets" where data is securely stored with strict access controls, limiting data access to authorized users or processes through pre-authenticated URL links. This setup ensures uncompromising data security within customer environment 310 while providing smooth interactions with other elements of DE platform 300.

Customer environment 310 may also include additional software tools such as customer tools 314 that can be utilized based on specific customer requirements. For example, a "DE Tool Host" component may handle necessary DE applications for working with customer data. It may include a DE Tools Command-Line Interface (DET CLI), enabling user-friendly command-line operation of DE tools (e.g., DE tools 102). A "DE platform Agent" ensures smooth communication and management between customer environment 310 and elements of DE platform 300. Furthermore, there can be another set of optional DE tools designed to assist customer-specific DE workflows. Native DE tools are typically access-restricted by proprietary licenses and end-user license agreements paid for by the customer. IDEP platform functions call upon native DE tools that are executed within customer environment 310, therefore closely adhering to the zero-trust principle of the system design.

In some cases, an optional "IDEP Exclave" 316 may be employed within customer environment 310 to assist with customer DE tasks and operations, supervise data processing, and rigorously adhering to zero-trust principles while delivering hyperscale-like platform performance. IDEP exclave 316 is maintained by the IDEP to run DE tools for customers who need such services. IDEP exclave 316 may contain a "DE Tool Host" that runs DE tools and a "DE Platform Agent" necessary for the operation. Again, native DE tools are typically access-restricted by proprietary licenses and end-user license agreements paid for by the customer. IDEP exclave 316 utilities and manages proprietary DE tools hosted with customer environment 310, for example, to implement model splicing and digital threading functionalities.

IDEP Deployment Scenarios

FIG. 4 shows potential scenarios for instantiating an IDEP in connection to a customer's physical system and IT environment, in accordance with some embodiments of the present invention. Specifically, FIG. 4 illustrates various potential configurations for instancing or instantiating an IDEP ("DE platform) 402 in connection to a customer's IT environment and physical system 404. The IT environment may be located on a virtual private cloud (VPC) protected by a firewall. The physical system may refer to a physical twin as discussed with reference to FIG. 1. In some embodiments, IDEP 402 may be instanced as an enclave such as 302 shown in FIG. 3. For example, IDEP 402 may be instanced on the cloud, possibly in a software-as-a-service (SaaS) configuration. The platform instances in these embodiments include software and algorithms, and may be described as follows:

1. External Platform Instance 410: This option showcases the IDEP as a separate platform instance. The platform interacts with the physical system through the customer's virtual environment, or a Customer Virtual Private Cloud ("Customer VPC"), which is connected to the physical system.
2. External Platform Instance 420 with Internal Agent: The IDEP is instantiated as a separate platform, connected to an internal agent ("DE Agent") wholly instanced within the Customer VPC. For example, the IDEP may be instantiated as enclave 302, and the DE agent may be instantiated as exclave 316 within the Customer VPC linked to the physical system.
3. External Platform Instance with Internal Agent and Edge Computing 430: This scenario displays the IDEP as a separate instantiation, connected to an internal DE Agent wholly instanced within the Customer VPC, which is further linked to an edge instance ("DE Edge Instance") on the physical system. The DE agent is nested within the customer environment, with a smaller edge computing instance attached to the physical system.
4. Edge Instance Connection 440: This option shows the DE platform linked directly to an DE edge instance on the physical system. The DE platform and the physical system are depicted separately, connected by an edge computing instance in the middle, indicating the flow of data.
5. Direct API Connection 450: This deployment scenario shows the DE platform connecting directly to the physical system via API calls. In this depiction, an arrow extends directly from the platform sphere to the physical system sphere, signifying a direct interaction through API.
6. Air-Gapped Platform Instance 460: This scenario illustrates the IDEP being completely instanced on an air-gapped, or isolated, physical system as a DE agent. The platform operates independently from any networks or internet connections, providing an additional layer of security by eliminating external access points and potential threats. Interaction with the platform in this context would occur directly on the physical system, with any data exchange outside the physical system being controlled following strict security protocols to maintain the air-gapped environment.

Across these deployment scenarios, the IDEP plays a crucial role in bridging the gap between a digital twin (DTw) established through the IDEP and its physical counterpart. Regardless of how the IDEP is instantiated, it interacts with the physical system, directly or through the customer's virtual environment. The use of edge computing instances in some scenarios demonstrates the need for localized data processing and the trade-offs between real-time analytics and more precise insights in digital-physical system management. Furthermore, the ability of the platform to connect directly to the physical system through API calls underscores the importance of interoperability in facilitating efficient data exchange between the digital and physical worlds. In all cases, the DE platform operates with robust security measures.

In some embodiments, the IDEP deployment for the same physical system can comprise a combination of the deployment scenarios described above. For example, for the same customer, some physical systems may have direct API connections to the DE platform (scenario 5), while other physical systems may have an edge instance connection (scenario 4).

Multimodal User Interfaces

FIG. 5 illustrates the use of multimodal user interfaces 590 for the interconnected DE platform, which can handle various input and output modalities such as Virtual Reality (VR), Mixed Reality (MR), auditory, text, and code. These interfaces are designed to manage the complexity of data streams and decision-making processes, and provide decision support including option visualization, impact prediction, and specific decision invocation. Specifically, data streams 502 and 504 are processed in the Analysis & Control Plane (ACP) 150 of FIG. 1. The user interface may receive data streams from physical and virtual feedback loops 102 and 104, as well as external expert feedback 114, analysis module 154, and twin configuration set 156 of ACP 150.

The multimodal interfaces illustrated in FIG. 5 are configured to carry out all the DE tasks and actions described in the context of FIG. 1, by catering to both humans and bots/algorithms, handling the intricacies of data stream frequency and complexity, decision-making time scales, and latency impacts. In the case of human decision makers, the user interface may need to manage inputs and outputs while for algorithmic decision making, the user interface may need to present rationale and decision analysis to human users. Some examples of human interfaces include a dashboard-style interface 594, a workflow-based interface 596, conversational interfaces 598, spatial computer interfaces 592, and code interfaces 599.

Dashboard-style interface 594 offers a customizable overview of data visualizations, performance metrics, and system status indicators. It enables monitoring of relevant information, sectional review of documents, and decision-making based on dynamic data updates and external feedback. Such an interface may be accessible via web browsers and standalone applications on various devices.

Workflow-based interface 596 guides users through the decision-making process, presenting relevant data, options, and contextual information at each stage. It integrates external feedback and is designed as a progressive web app or a mobile app. In the context of alternative tool selection, workflow-based interface 596 may provide options on individual tools at each stage, or provide combinations of tool selections through various stages to achieve better accuracy or efficiency for the overall workflow.

Conversational interfaces 598 are based on the conversion of various input formats such as text, prompt, voice, audiovisual, etc. into input text, then integrating the resulting input text within the DE platform workflow. Outputs from the DE platform may undergo the reverse process. This enables interoperability with the DE platform, and specifically the manipulation of model splices. In the broad context of audio-visual inputs, the conversational interfaces may comprise data sonification, which involves using sound to represent data, information, or events, and using auditory cues or patterns to communicate important information to users, operators, or reviewers. Sonified alerts (e.g., alerts sent via sound, e.g., via a speaker) are especially useful when individuals need to process information quickly without having to visually focus on a screen. For example, sonified alerts can be used to notify security analysts of potential threats or breaches.

FIG. 5 also illustrates the use of spatial computing interfaces 592 and code interfaces 599 in the management of DTws and PTws. Spatial computing interfaces allow for more immersive and intuitive user experiences, and enable real-time synchronization between DTws and PTws. Code interfaces allow bots and digital engineers to interact with the DE platform through scripting and code. It also allows the collection of user preference, task history, and tool usage patterns for alternative tool selection purposes.

Digital Threads and Autonomous Data Linkages

As discussed previously, a "digital thread" is intended to connect two or more digital engineering (DE) models for traceability across the systems engineering lifecycle, and collaboration and sharing among individuals performing DE tasks. In a digital thread, appropriate outputs from a preceding digital model may be provided as the inputs to a subsequent digital model, allowing for information and process flow. That is, a digital thread may be viewed as a communication framework or data-driven architecture that connects traditionally siloed elements to enable the flow of information and actions between digital models.

FIG. 6 describes the architecture and inherent complexity of digital threads, in accordance with the examples disclosed herein. Specifically, FIG. 6 is a schematic diagram comparing exemplary digital threads 600 that connect DE models, in accordance with some embodiments of the present invention. In the most basic sense, digital threads may be represented as a simple daisy-chain architecture 602 where modifications in any upstream DE model will affect all DE models downstream from the modified DE model. For example, a modification of any parameter or process of a DE model B will cause changes in DE model C, which in turn will cause changes in DE model D. Cause-and-effect changes will therefore cascade downstream. Since a change in one DE model may affect more than one downstream model, diagram 604 represents more accurately a digital thread. In both 602 and 604, digital threads are represented by a directed acyclic graph (DAG).

DAGs are frequently used in many kinds of data processing and structuring tasks, such as scheduling tasks, data compression algorithms, and more. In the context of service platforms and network complexities, a DAG might be used to represent the relationships between different components or services within the platform. In digital thread 604, different models may depend on each other in different ways. Model A may affect models B, C, and D, with models B and C affecting model E, and models D and E affecting model G. Such dependencies are denoted as a DAG, where each node is associated with a component (e.g., a model), and each directed edge represents a dependency.

A major issue with dealing with interdependent DE models is that graph consistencies can be polynomial, and potentially exponential, in complexity. Hence, if a node fails (e.g., a model is unreliable), this can have a cascading effect on the rest of the DAG, disrupting the entire design. Furthermore, adding nodes or dependencies to the graph does not yield a linear increase in complexity because of the interdependencies between models. If a new model is added that affects or depends on several existing models, the resulting increase in graph complexity is multiplicative in nature, hence potentially exponential. The multiplicative nature of digital thread consistencies is compounded by the sheer number of interconnected models, which may number in the hundreds or thousands. Diagram 606 is a partial representation of a real digital thread, illustrating the complexity of digital threads and its multiplicative growth.

Model Splicing for Digital Threading and Digital Twin Generation

As disclosed herein, model splicing encapsulates and compartmentalizes digital engineering (DE) model data and model data manipulation and access functionalities. As such, model splices provide access to selective model data within a DE model file without exposing the entire DE model file, with access control to the encapsulated model data based on user access permissions. Model splicing also provides the DE model with a common, externally-accessible Application Programming Interface (API) for the programmatic execution of DE models. Model splices thus generated may be shared, executed, revised, or further spliced independently of the native DE tool and development platform used to generate the input digital model. The standardization of DE model data and the generalization of API interfaces and functions allow the access of DE model type files outside of their native software environments, and enable the linking of different DE model type files that may not previously be interoperable. Model splicing further enables the scripting and codification of DE operations encompassing disparate DE tools into a corpus of normative program code, facilitating the generation and training of artificial intelligence (AI) and machine learning (ML) models for the purpose of manipulating DE models through various DE tools across different stages of a DE process, DE workflow, or a DE life cycle.

Digital threads are created through user-directed and/or autonomous linking of model splices. A digital thread is intended to connect two or more DE models for traceability across the systems engineering life cycle, and collaboration and sharing among individuals performing DE tasks. In a digital thread, appropriate outputs from a preceding digital model are provided as inputs to a subsequent digital model, allowing for information flow. That is, a digital thread may be viewed as a communication framework or data-driven architecture that connects traditionally siloed elements to enable the flow of information between digital models. The extensibility of model splicing over many different types of DE models and DE tools enables the scaling and generalization of digital threads to represent each and every stage of the DE life cycle.

A digital twin (DTw) is a real-time virtual replica of a physical object or system, with bi-directional information flow between the virtual and physical domains, allowing for monitoring, analysis, and optimization. Model splicing allows for making individual DE model files into executable splices that can be autonomously and securely linked, thus enabling the management of a large number of DE models as a unified digital thread. Such a capability extends to link previously non-interoperable DE models to create digital threads, receive external performance and sensor data streams (e.g., data that is aggregated from DE models or linked from physical sensor data), calibrate digital twins with data streams from physical sensors outside of native DTw environments, and receive expert feedback that provides opportunity to refine simulations and model parameters.

Unlike a DTw, a virtual replica, or simulation, is a mathematical model that imitates real-world behavior to predict outcomes and test strategies. Digital twins use real-time data and have bidirectional communication, while simulations focus on analyzing scenarios and predicting results. In other words, a DTw reflects the state of a physical system in time and space. A simulation is a set of operations done on digital models that reflects the potential future states or outcomes that the digital models can progress to in the future. A simulation model is a DE model within the context of the IDEP as disclosed herein.

When testing different designs, such as variations in wing length or chord dimensions, multiple DTws (sometimes numbering in 100s to 1,000s) may be created, as a bridge between design specifications and real-world implementations of a system, allowing for seamless updates and tracking of variations through vast numbers of variables, as detailed in the context of FIG. 1. As an example, if three variations of a system are made, each one would have its own DTw with specific measurements. These DTws may be accessed and updated via API function scripts, which allow for easy input of new measurements from the physical parts during the manufacturing process. By autonomous linking with appropriate data, a DTw may be updated to reflect the actual measurements of the parts, maintaining traceability and ensuring accurate data representation through hundreds or thousands of models.

Exemplary Model Splicing Setup

FIG. 7 is a schematic showing an exemplary model splicing setup, according to some embodiments of the present invention. Specifically, FIG. 7 is a schematic showing an embedded CAD model splicing example.

In the present disclosure, a "model splice", "model wrapper", or "model graft" of a given DE model file comprises (1) DE model data extracted or derived from the DE model file, including model metadata, and (2) API function scripts that can be applied to the DE model data. The API function scripts provide unified and standardized input and output API endpoints for accessing and manipulating the DE model data. The DE model data are model-type-specific, and a model splice is associated with model-type-specific input and output schemas. One or more different model splices may be generated from the same input DE model file, based on the particular user application under consideration, and depending on data access restrictions. In some contexts, the shorter terms "splice", "wrapper", and/or "graft" are used to refer to spliced, wrapped, and/or grafted models.

Model splicing is the process of generating a model splice from a DE model file. Correspondingly, model splicers are program codes or uncompiled scripts that perform model splicing of DE models. A DE model splicer for a given DE model type, when applied to a specific DE model file of the DE model type, retrieves, extracts, and/or derives DE model data associated with the DE model file, generates and/or encapsulates API function scripts, and instantiates API endpoints according to input/output schemas. In some embodiments, a model splicer comprises a collection of API function scripts that can be used as templates to generate DE model splices. "Model splicer generation" refers to the process of setting up a model splicer, including establishing an all-encompassing framework or template, from which individual model splices may be deduced.

Thus, a DE model type-specific model splicer extracts or derives model data from a DE model file and/or stores such model data in a model type-specific data structure. A DE model splicer further generates or enumerates API function scripts that call upon native tools and API functions for application on DE model data. A DE model splice for a given user application contains or wraps DE model data and API function scripts that are specific to the user application, allowing only access to and enabling modifications of limited portions of the original DE model file for collaboration and sharing with stakeholders of the given user application.

Additionally, a document splicer is a particular type of DE model splicer, specific to document models. A "document" is an electronic file that provides information as an official record. Documents include human-readable files that can be read without specialized software, as well as machine-readable documents that can be viewed and manipulated by a human with the help of specialized software such as word processor and/or web services. Thus, a document may contain natural language-based text and/or graphics that are directly readable by a human without the need of additional machine compilation, rendering, visualization, or interpretation. A "document splice", "document model splice" or "document wrapper" for a given user application can be generated by wrapping document data and API function scripts that are specific to the user application, thus revealing text at the component or part (e.g., title, table of contents, chapter, section, paragraph) level via API endpoints, and allowing access to and enabling modifications of portions of an original document or document template for collaboration and sharing with stakeholders of the given user application, while minimizing manual referencing and human errors.

In the CAD model splicing example shown in FIG. 7, a CAD model file diesel-engine.prt 704 proceeds through a model splicing process 710 that comprises a data extraction step 720 and a splice function generation step 730. Data extraction may be performed via a DE model crawling agent implemented as model crawling scripts within a model splicer to crawl through the input DE model file and to distill model data with metadata 722. Metadata are data that can be viewed without opening the input DE model file, and may include entries such as file name, file size, file version, last modified date and time, and potential user input options as identified from a user input 706. Model data are extracted and/or derived from the input DE model, and may include but are not limited to, parts (e.g., propeller, engine cylinder, engine cap, engine radiator, etc.), solids, surfaces, polygon representation, and materials, etc. When a model splicer crawls through the model file, it determines how model data may be organized and accessed, as fundamentally defined by DE tool 702 that is being used in splicing the DE model, and establishes a model data schema. This data schema describes the structure and format of the model data, some of which are translated into, or used to create input/output API endpoints with corresponding input/output schemas. In some embodiments, model data with metadata 722 may be stored in an access-restricted storage 726, such as the "customer buckets" 312 within customer environment 310 in FIG. 3, so that model splices such as 742, 744, and 746 may be generated on-demand once an input DE model 704 has been crawled through.

The model splicer further generates splice functions or API function scripts 732 from native APIs 702 associated with input CAD model. In the present disclosure, "native" and "primal" refer to existing DE model files, functions, and API libraries associated with third-party DE tools, including both proprietary and open-source ones. Native API 702 may be provided by a proprietary or open source DE tool. For example, the model splicer may generate API function scripts that call upon native APIs of native DE tools to perform functions such as: HideParts (parts list), Generate2DView( ), etc. These model-type-specific splice functions may be stored in a splice function database 736, again for on-demand generation of individual model splices. A catalog or specification of splice functions provided by different model splices supported by the IDEP, and orchestration scripts that link multiple model splices, constitutes a Platform API. This platform API is a common, universal, and externally-accessible platform interface that masks native API 702 of any DE tool integrated into the IDEP, thus enabling engineers from different disciplines to interact with unfamiliar DE tools, and previously non-interoperable DE tools to interoperate freely.

Next, based on user input or desired user application 706, one or more model splices or wrappers 742, 744, and 746 may be generated, wrapping a subset or all of the model data needed for the user application with API function scripts that can be applied to the original input model and/or wrapped model data to perform desired operations and complete user-requested tasks. Any number of model splices/wrappers may be generated by combining a selection of the model data such as 722 and the API function scripts such as 732. As the API function scripts provide unified and standardized input and output API endpoints for accessing and manipulating the DE model and DE model data, such API handles or endpoints may be used to execute the model splice and establish links with other model splices without directly calling upon native APIs. Such API endpoints may be formatted according to an input/output scheme tailored to the DE model file and/or DE tool being used, and may be accessed by orchestration scripts or platform applications that act on multiple DE models.

In some embodiments, when executed, an API function script inputs into or outputs from a DE model or DE model splice. "Input" splice functions or "input nodes" such as 733 are model modification scripts that allow updates or modifications to an input DE model. "Output" splice functions or "output nodes" 734 are data/artifact extraction scripts that allow data extraction or derivation from a DE model via its model splice. An API function script may invoke native API function calls of native DE tools. An artifact is an execution result from an output API function script within a model splice. Multiple artifacts may be generated from a single DE model or DE model splice. Artifacts may be stored in access-restricted cloud storage 726, or other similar access-restricted customer buckets.

One advantage of model splicing is its inherent minimal privileged access control capabilities for zero-trust implementations of the IDEP as disclosed herein. In various deployment scenarios discussed with reference to FIG. 4, and within the context of IDEP implementation architecture discussed with reference to FIG. 3, original DE input model 704 and model data storage 726 may be located within customer buckets 312 in customer environment 310 of FIG. 3. Splice functions 732 stored in database 736 call upon native APIs 702. The execution or invocation of splice functions 732 may rely on the authorization via proprietary licenses of DE tools, which may also reside within customer environment 310 of FIG. 3. Thus, model splicing unbundles monolithic access to digital model-type files as whole files and instead provide specific access to a subset of functions or that allow limited, purposeful, and auditable interactions with subsets of the model-type files built from component parts or atomic units that assemble to parts.

Digital Threading of DE Models Via Model Splicing

FIG. 8 is a schematic showing digital threading of DE models via model splicing, according to some embodiments of the present invention. A digital thread is intended to connect two or more DE models for traceability across the systems engineering lifecycle, and collaboration and sharing among individuals performing DE tasks.

Linking of model splices generally refers to jointly accessing two or more DE model splices via API endpoints or splice functions. For example, data may be retrieved from one splice to update another splice (e.g., an input splice function of a first model splice calls upon an output splice function of a second model splice); data may be retrieved from both splices to generate a new output (e.g., output splice functions from both model splices are called upon); data from a third splice may be used to update both a first splice and a second splice (e.g., input splice functions from both model splices are called upon). In the present disclosure, "model linking" and "model splice linking" may be used interchangeably, as linked model splices map to correspondingly linked DE models. Similarly, linking of DE tools generally refers to jointly accessing two or more DE tools via model splices, where model splice functions that encapsulate disparate DE tool functions may interoperate and call each other, or be called upon jointly by an orchestration script to perform a DE task.

Thus, model splicing allows for making individual digital model files into model splices that can be autonomously and securely linked, enabling the management of a large number of digital models as a unified digital thread written in scripts. Within the IDEP as disclosed herein, a digital thread is a platform script that calls upon the platform API to facilitate, manage, or orchestrate a workflow through linked model splices. Model splice linking provides a communication framework or data-driven architecture that connects traditionally siloed elements to enable the flow of information between digital models via corresponding model splices. The extensibility of model splicing over many different types of digital models enables the scaling and generalization of digital threads to represent each and every stage of the DE lifecycle and to instantiate and update DTws as needed.

In the particular example shown in FIG. 8, an orchestration script 894 is written in Python code and designed to interact via API endpoints such as 892 to determine if a CAD model meets a total mass requirement. API endpoint 892 is an output splice function and part of a platform API 890. Platform API 890 comprises not only splice functions but also platform scripts or orchestration scripts such as 894 itself.

Orchestration script 894 is divided into three main steps:
1. Get Data From a CAD Model Splice: A POST request may be sent via the IDEP platform API to execute a computer-aided design (CAD) model splice 871. This model splice provides a uniform interface to modify and retrieve information about a CAD model 881. The parameters for the CAD model, such as hole diameter, notch opening, flange thickness, etc., may be sent in the request and set via an input splice function. The total mass of the CAD model may be derived from model parameters and retrieved via an output splice function.

The response from the platform API includes the total mass of CAD model 881, and a Uniform Resource Identifier/Locator (URL) for the CAD model. The response may further comprise a URL for an image of the CAD model.

2. Get Data From a SysML Model Splice: Another POST request may be sent via the IDEP platform API to execute a Systems Modeling Language (SysML) model splice 872. SysML is a general-purpose modeling language used for systems engineering. Output function 892 of model splice 872 retrieves the total mass requirements for the system from a SysML model 882. The response from the platform API includes the total mass requirement for the system.

3. Align the Variables and Check If Requirement Met: The total mass from CAD model 881 is compared with the total mass requirement from SysML model 882. If the two values are equal, a message is printed indicating that the CAD model aligns with the requirement. Otherwise, a message is printed indicating that the CAD model does not align with the requirement.

In short, orchestration script 894, which may be implemented in application plane 160 of IDEP 100 shown in FIG. 1, links digital models 881 and 882 via model splice API calls. Orchestration script 894 is a scripted platform application that modifies a CAD model, retrieves the total mass of the modified CAD model, retrieves the total mass requirement from a SysML model, and compares the two values to check if the CAD model meets the requirement. In some embodiments, a platform application within IDEP 100 utilizes sets of functions to act upon more than one DE model.

Model Splice Plane

FIG. 9 is a schematic illustrating the linking of DE model splices in a splice plane and comparing digital threading with and without model splicing, according to some embodiments of the present invention. The bottom model plane 180 demonstrates current digital threading practices, where each small oval represents a DE model, and the linking between any two DE models, such as models 982 and 984, requires respective connections to a central platform 910, and potential additional linkages from every model to every other model. The central platform 910 comprises program code that is able to interpret and manipulate original DE models of distinct model types. For example, platform 910 under the control of a subject matter expert may prepare data from digital model 982 into formats that can be accessed by digital model 984 via digital model 984's native APIs, thus allowing modifications of digital model 982 to be propagated to digital model 984. Any feedback from digital model 984 to digital model 982 would require similar processing via platform 910 so that data from digital model 984 are converted into formats that can be accessed by digital model 982 via digital model 982's native APIs. This hub-and-spoke architecture 934 is not scalable to the sheer number (e.g., hundreds or thousands) of digital models involved within typical large-scale DE projects, as model updates and feedback are only possible through central platform 910.

In contrast, once the DE models are spliced, each original model is represented by a model splice comprising relevant model data, unified and standardized API endpoints for input/output, as shown in the upper splice plane 170. Splices within splice plane 170 may be connected through scripts (e.g., python scripts) that call upon API endpoints or API function scripts and may follow a DAG architecture, as described with reference to FIG. 1 and FIG. 6. Note that in FIG. 1, only the set of generated splices are shown within splice plane 170, while in FIG. 9, scripts that link model splices are also shown for illustrative purposes within the splice plane. Such scripts are referred to as orchestration scripts or platform scripts in this disclosure, as they orchestrate workflow through a digital thread built upon interconnected DE model splices. Further note that while splice plane 170 is shown in FIG. 1 as part of IDEP 100 for illustrative purposes, in some embodiments, splice plane 170 may be implemented behind a customer firewall and be part of an agent of the DE platform, as discussed in various deployment scenarios shown in FIG. 4. That is, individual API function scripts generated via model splicing by a DE platform agent may be tailored to call upon proprietary tools the customer has access to in its private environment. No centralized platform 910 with proprietary access to all native tools associated with all individual digital models shown in FIG. 9 is needed. Instead, orchestration scripts call upon universal API function scripts that may be implemented differently in different customer environments.

Hence, model splicing allows model splices such as model splice 972 from digital model 982 and model splice 974 from digital model 984 to access each other's data purposefully and directly, thus enabling the creation of a model-based "digital mesh" 944 via platform scripts and allowing autonomous linking without input from subject matter experts.

An added advantage of moving from the model plane 180 to the splice plane 170 is that the DE platform enables the creation of multiple splices per native model (e.g., see FIG. 7), each with different subsets of model data and API endpoints tailored to the splice's targeted use. For example, model splices may be used to generate multiple digital twins (DTws) that map a physical product or object design into the virtual space. Two-way data exchanges between a physical object and its digital object twin enable the testing, optimization, verification, and validation of the physical object in the virtual world, by choosing optimal digital model configuration and/or architecture combinations from parallel digital twins built upon model splices, each reacting potentially differently to the same feedback from the physical object.

Supported by model splicing, digital threading, and digital twining capabilities, the IDEP as disclosed herein connects DE models and DE tools to enable simple and secure collaboration on digital engineering data across engineering disciplines, tool vendors, networks, and model sources such as government agencies and institutions, special program offices, contractors, small businesses, Federally Funded Research and Development Centers (FFRDC), University Affiliated Research Centers (UARC), and the like. An application example 950 for the IDEP is shown on the right side of FIG. 9, illustrating how data from many different organizations may be integrated to enable cross-domain collaboration while maintaining data security, traceability, and auditability. Here DE models from multiple vendors or component constructors are spliced or wrapped by IDEP agents, and data artifacts are extracted with data protection. Turning DE models into data artifacts enables cross-domain data transfer and allows for the protection of critical information, so that model owners retain complete control over their DE models using their existing security and IT stack, continue to use DE tools that best fit their purposes, and also preserve the same modeling schema/ontology/profile that best fit their purposes. The IDEP turns DE models into micro-services to provide minimally privileged data bits that traverse to relevant stakeholders without the DE models ever leaving their home servers or being duplicated or surrogate.

The IDEP also provides simple data access and digital threading options via secure web applications or secure APIs.

Dag Representation of Threaded Tasks

Model splicing provides a unified interface among DE models, allowing model and system updates to be represented by interconnected and pipelined DE tasks. FIG. 10 shows an exemplary directed acyclic graph (DAG) representation 1000 of pipelined DE tasks related to digital threads, in accordance with some embodiments of the present invention. In diagram 1000, tasks performed through a digital thread orchestration script (e.g., 894) are structured as nodes within a DAG. Actions are therefore interconnected and carried out in a pipeline linking the DE model splices with a range of corresponding parameter values. Therefore, a digital thread can be created by establishing, via interpretable DE platform scripts, the right connections between any model splices for their corresponding models at the relevant endpoints.

Referring to FIGS. 1 and 8, DAGs of threaded tasks are built from digital threads and are part of the DE platform's application plane 160. Different DAGs may target different DE actions. For example, in FIG. 1, building or updating a DTw 122 in the virtual environment 120 has its own DAG 124. Model splicing turns DE models into data structures that can be accessed via API, thus enabling the use of software development tools, from simple python scripts to complex DAGs, in order to execute DE actions. A digital thread of model splices eliminates the scalability issue of digital thread management, and speeds up the digital design process, including design updates based on external feedback.

Following the above description of the basic elements and core aspects of the IDEP as disclosed herein, the documentation system that enhances the IDEP's functionality with respect to digital documentation is described in detail next.

Overview of Digital Documentation System

An interconnected digital engineering and certification ecosystem is a computer-based system that may be used for a variety of validation and certification and other documentation purposes. The digital documentation management system and methodology are integrated within the digital engineering and certification ecosystem to assist with the preparation of engineering and certification documents and support the creation of the right documentation, with the right data, appropriate for verification and validation (V&V) purposes. For example, the system is integrated with a computer-based system for digital engineering and certification, and includes security and access controls to protect the templates and documents from unauthorized access or modification. In some embodiments, the system includes a user interface for selecting and populating templates with data, and a machine learning algorithm for recommending templates and assisting with document preparation. In alternative embodiments, APIs, and a software IDE (such as VS code), automatically performs these tasks. In some embodiments, the system may generate documents, even without a user interface, by directly linking the system data and using the system APIs, a software IDE and machine learning algorithms for assisting in document preparation. The system tracks and communicates approval decisions throughout the certification process, and provides metrics for measuring the efficiency, accuracy, and user satisfaction of the documentation system. The documentation system is scalable and flexible, and can be customized to support different types of certification or other documentation processes and user needs. The system may also use blockchain technology to enhance the security and transparency of the system, and may use augmented reality or virtual reality technologies to improve the visualization and interaction with the digital documents.

For digital engineering and certification, the modeling and simulation outputs are evaluated against acceptable error bounds for specific requirements towards validation, verification, or certification. Verification is a process to ensure that the input data is accurate, e.g., checking the center of gravity against the source to verify whether it is correct. Validation is a process to ensure the input data is correct, e.g., confirming that center of gravity is within an agreed range. Documentation is a necessary step for approvals and used as part of overall assurance of a project.

Ultimately, as discussed within the context of FIG. 1, the methods and systems described herein enable the creation and maintenance of so-called live digital engineering documents. Similar to digital twins, live DE documents are configured, through a digital thread, to be perpetually updated to reflect the most current changes within a particular twin configuration. In particular, an authoritative live DE document is configured to reflect the latest authoritative twin configuration. The "printing" of a live DE document corresponds to the generation of a static time-stamped version of a live DE document. Therefore, "printing"—for a live DE document—is equivalent to "instantiation" for a DTw (see FIG. 1).

Live DE documents may also be known as magic documents as changes implemented within a twin configuration (e.g., through a modification of a model file) may appear instantaneously within the relevant data fields and sections of the live DE document. Similarly, authoritative live DE documents may also be known as authoritative magic documents as they perpetually reflect data from the authoritative twin, thus always representing the authoritative source of truth.

The digital documentation system is thus designed to improve efficiency, reduce wasted time and effort, and eliminate the risks associated with manual documentation processes. The digital documentation system may be considered a subsystem of the IDEP. FIGS. 1-10 support the implementation of such a digital documentation system via, e.g., an interconnected digital engineering (IDEP) platform architecture; the implementation of the IDEP as an interconnected digital engineering (DE) and certification ecosystem, and exemplary digitally certified products; digital threads that connect DE models; DE model splicing setups; digital threading of DE models via model splicing; and linking of DE model splices in a splice plane.

Documentation Generation and Templates

A company may be motivated to update its documentation processes because the digital engineering process may have frequent iterations, its documentation requirements may update (e.g., due to feedback from stakeholders, regulators, or results from tests), or it wishes to make faster design iterations. The last case is the more likely scenario because many real-life regulations do not change as much as the products in many cases. For example, when the Federal Aviation Administration (FAA) releases a new regulation for US aircraft and airlines, the change may affect how an aircraft manufacturing company documents the operation of its aircraft (e.g., pilot training manuals). As the number of versions of documents increase, it may become difficult or time-consuming to track changes and maintain consistency from version to version. Digitization will permit entities to check the differences easily and track properly. A company can stay ahead of the curve by digitizing its documentation processes and procedures to make changes quickly and easily.

FIG. 11 shows an example 1102 of an alternative systems review (ASR), in accordance with the examples disclosed herein, a common scenario with documentation needs. Various models used by analysts would result in a multitude of legacy documents being generated.

For example, consider a set of digital engineering (DE) models 1104. These may include a trade-space model (e.g., MATLAB) 1106, a requirements model (e.g., operational architecture, functional architecture, system architecture, CAMEO) 1108, a Gantt chart model (e.g., MS PROJECT) 1110, and a cost model (e.g., MS EXCEL) 1112. Next, consider a set of legacy documents 1114. These may include an analysis of alternatives and trade studies 1116, CONOPS 1118, an initial capabilities document (ICD) 1120, a system design document (SDD) 1122, key interfaces (ICD) 1124, a risk assessment and management plan 1126, an integrated master schedule (IMS) 1128, and cost estimates (e.g., CARD) 1130. An alternative systems review (ASR) may generate any of the legacy documents 1114 based on a given set of DE models 1104.

To implement a digitization of the documentation process, all documents may be controlled by a single entity or group of entities, which is able to access extensive features through various integration tools. These tools can include digital signature, revision control, configuration management, and document template creation. Document digitization saves time and reduces the cost as an administrator creates a template once (with the ability to update it as needed) with proper configuration in cases where multiple requesters are using it. The process may also implement documentation with dynamic content (based upon being continually updated by real-world operational data—that is represented in a digital model) to continually show that a designed product (e.g., aircraft) still meets certification or other requirements even after the product has been deployed. Finally, documentation linked to specific products (e.g., registered aircraft) may be compiled over the lifetime of the product for reviews, safety analysis, and archival purposes.

A standardized digital document preparation confers multiple benefits, including lower costs, lower risks, higher productivity, ease of use, better tracking and document controls, reduced human error, and the potential for better compliance with documentation standards and approvals. Productivity improvements may include: the customization of existing templates or documents to generate newer documents (resulting in quicker turnaround time), the ease of making changes, and a reduction in re-work, waste, and costs. The system is robust to changes in project requirements due to a reuse and automatic updating of existing templates and the ability to quickly and automatically adapt templates to changes in requirements. Risk management is also robust, because of consistent document controls (the identity of who makes the changes and when) and consistent version control (what change was made and when). A unified source of veracity (e.g., a single virtual location for documentation with extensive features) enables the user to easily and instantly build reports and to standardize document outputs. Finally, document security is assured for documents and the data they include about users and models.

The documentation process is digitized by building a tool to ensure that standards, rules, and agreed templates are followed. The documentation process is streamlined with automation by applying generic process digitization for documentation that can be used for major capability acquisition (MCA) or other processes. Starting from template creation, authorized users may fill a designated template by authorized users upon selection, and these templates may be custom-built, or built by an AI recommendation engine (depending on certification or the requirements of an end user). Document creation from templates with user data may be in multiple forms and may depend on the project phase. Machine learning algorithms may be trained on libraries of templates and user documentation steps in order to create, fill in, and adapt the templates. Some of the documents may be prepared in an AI-assisted manner to cover a variety of validation and certification purposes. Some documents may be a report that brings forth appropriate user and model data within templates. Some reports are prepared in an AI-assisted manner using user and model data. Documents may experience the appropriate approval cycle process, linked with the project's state in the platform, and with authorized users receiving the appropriate notification for those documents with relevant details. A digital ecosystem and digital documentation combination is an improvement over manual documentation processes, as overall document digitization minimizes the risks, enhances approval process, and results in better document request tracking and revision control. The system enables quick adoption to document changes as all documents may reside in a single virtual location.

The digital documentation system allows for the creation of a library of templates that are approved by an end-user or project administrator. These templates can then be used in specific projects, either by selecting them from the library, or by using a machine learning recommender engine based on prior usage and preferences, or by using a machine learning algorithm trained on existing templates and new user inputs.

Once the library of templates is created, authorized users can select appropriate templates, and populate with data from the platform and thus create the appropriate digital documents. The process for document preparation can be streamlined—using user data, model data, parameters that define modeling and simulations, and certification requirements—or it can be AI-assisted, using prior templates and user inputs. These document preparation steps can correspond to the specific stage of the project, with data and decisions synchronized between the digital documentation and the computer-based system for digital engineering and certification.

The resulting digital documents can then be compiled by authorized users and submitted for approval, with the approval decisions tracked and communicated to the appropriate users. This streamlined and efficient process greatly improves the accuracy and efficiency of the certification process.

The idea of a digital documentation management system and methodology integrated within a digital engineering and certification ecosystem combines multiple technologies and processes. Examples pertaining to certification are merely exemplary to present that the digital documentation system is generic, and is not specific to the certification cycle. By using templates, automation, and machine learning algorithms, the proposed system is able to improve the efficiency, accuracy, and transparency of the certification or other documentation purpose. This is an advancement in the field because it requires a deep understanding of the certification process, as well as the capabilities and limitations of digital engineering technologies, to develop a system that effectively addresses the challenges of manual documentation processes used in the design, test, and certification of complex systems (complex systems have physical, software and regulatory requirements).

Digital documentation may first be implemented as a streamlined workflow of the specific steps (e.g., template creation, document creation and document update). For the initial use cases, there may be known documentation that needs to be submitted. Based on initial use cases, a reference library of templates and documentation examples is built. Using the reference library, an AI-assisted functionality is built and trained. Initial template creation may be performed manually by a human or automated by the system using pre-set criteria or data fields. Based on the initial set of templates, an AI-assisted template creation approach may include a Large Language Model (LLM) that is trained on example templates and data from the platform (e.g., user data, and modeling and simulation data). Based on user input, the algorithm creates several templates for the admin user to review and approve. Among the several generated templates, one is suggested or selected by a machine learning recommender. The recommender is trained on an existing library of templates and expert input. The recommender may learn via a reinforcement learning algorithm based on data labeled by a human user (e.g., tags indicating specific certification purposes). The algorithm's recommendations may further be trained by the acceptance or rejection by a human user. Based on user inputs about certification purposes, the system will recommend templates they may need. Finally, the document itself is updated by another machine learning model. This model may be trained on (a) drafts of documentation, (b) reviews of documents that are submitted, (c) accepted documentation and, (d) rejected documentation. This data may be from the platform (e.g., user data, modeling, and simulation data) or any other viable source.

The implementation of digital documentation includes several components and processes. Several such components and processes are described below.

First, the digital documentation system is integrated with the computer-based system for digital engineering and certification.

Next, data sources and formats that are to be used to populate the templates, and the methods for ensuring the accuracy and consistency of this data are considered. Additionally, the system should implement quality control measures, such as data validation and verification, to ensure the data used to populate the templates is accurate and up-to-date. Data formats may include a variety of user data (e.g., user ID, role), modeling data (e.g., mesh parameters), and modeling and simulations output data (e.g., center of gravity, stress concentration). In other implementations, the input may be a module used for modeling and simulation (e.g., a CAD file) and the parameters are extracted from the module to generate documentation. In other implementations, the template creation may also bring in data fields, e.g., related phase (e.g., Materiel Solutions Analysis (MSA) Phase), approvers' list, approvers' sequence, contributors list, contributors' roles, and template classification (requirement, report).

Machine learning algorithms and techniques may be included for recommending templates and assisting with document preparation. For example, the system could use natural language processing and semantic analysis to understand the content of the templates and documents, and to recommend relevant templates to users based on their input, or generate example templates from a few prompts. Additionally, the system could use predictive modeling and decision-tree algorithms to assist with document preparation, by providing suggestions for data fields and values based on the user's previous inputs and the overall context of the document. Finally, the system could use LLMs to generate the text of documents in a combination of rule based (e.g., variable driven) and machine learning or statistical approaches.

Security and access controls may be put in place to ensure only authorized users can access and modify the templates and documents. This could include measures such as authentication, encryption, and role-based access controls, which would ensure only authorized users can access the system and make changes to the templates and documents.

Methods for tracking and communicating approval decisions throughout the certification process may be considered. This could include features such as digital signatures, notifications, and auditing capabilities, which would allow users to track the status of their documents and receive updates on the approval process.

A user interface and user experience design of the system, including the methods for selecting templates and populating them with data, are considered.

The performance of the system is monitored and evaluated; so, metrics for measuring efficiency, accuracy, and user satisfaction are considered. This could include metrics such as the time taken to prepare a document, the accuracy of the data entered, and the user's satisfaction with the system.

The system may include blockchain technology to further enhance the security and transparency of the system. The security architecture of the interconnected digital engineering and certification ecosystem will apply to the documentation process as well to secure users, models, and the documentation.

The system may include augmented reality or virtual reality technologies to improve the visualization and interaction with the digital documents.

The methods for digital documentation are consistent with project phases and approvals, with the right set of documentation that is presented to the right authorized users. This could include features such as digital signatures, notifications, and auditing capabilities, which would allow users to track the status of their documents and receive updates on the approval process. This could include features such as checklists and visual management tools.

Digital Documentation System and its Integration within the IDEP

Digital documentation brings together a user's data, model data, simulation parameters, test data and modeling & simulation (M&S) outputs so that authorized users are able to submit the right documentation for consideration of supporting "system design reviews," etc. In addition, specific project approvals are tracked in the simulations on the platform and in corresponding documentation. Digital documentation is implemented at two levels: (1) within a project phase for the sake of progress reviews; and (2) between project phases, through approval steps.

FIG. 12 shows an example digital documentation process, in accordance with the examples disclosed herein.

As an overview, in step #1 of the digital documentation cycle (1208), an admin creates a configured template with the ability to update in future, using a reference library of approved templates (project specific). The system may be integrated with a documentation tool (e.g., Google Docs). The admin selects a template type (e.g., doc, presentation) and fills template data (e.g., MSA Report). The admin may configure the following fields for the created template: related phase (e.g., Materiel Solutions Analysis (MSA) Phase), approvers list, approver sequence, contributors list, contributors' roles, and template classification (e.g., requirement, report). Finally, an agreed configured template is generated.

In step #2 of the digital documentation cycle (1210), only authorized users fill appropriate data for a specific document (for reporting, phases). Multiple requesters may use the configured template. The document revision has controls (revision history), includes configuration management, and is integrated with the existing tools. After a request is logged in by an authorized user, a list of templates is displayed based on the user's permission levels. The user selects one of several existing templates. The user then fills the required data in the designated template and submits. A filled document (e.g., report, acquisition strategy) is thus generated.

In step #3 of the digital documentation cycle (1212), a set of parameters for each model is predefined. The user fills data in documents, or links different documents upon recommendations of an AI algorithm, from various parts of the platform (depending on the phase, and user request). The required data is extracted from the requester document. By aligning models/analysis to certification/life cycle requirements steps, the system generates a report based on platform data. An artificial intelligence documents user inputs, models setup parameters, and models outputs needed for V&V purposes. A report based on the data platform is generated by the AI.

In step #4 of the digital documentation cycle (1214), the approval and signing process begins. An application sends a message (e.g., e-mail) in sequence based on the template configuration to the approvers. After the approver logs in, the approver may take actions, which includes rejecting the document, commenting and tagging persons, and approving the document. A message (e.g., e-mail) may then be sent to the tagged person and requester. The result of this step is either an approved document or a rejected document.

With reference to FIG. 12, the digital documentation milestones 1202 include template creation 1208, document creation and control 1210, AI-assisted document preparation and update 1212, and approval 1214. The digital documentation process steps 1204 include the admin user performing steps 1216 (e.g., building document templates manually or assisted by AI, configuring document template fields), the admin user or requester performing steps 1218 (e.g., selecting templates in a recommender-assisted manner, creating documents with appropriate metadata for access and controls, submitting documents for review and usage), the requester performing steps 1220 (e.g., using AI/ML tools for creating new document fields based on user input, automatically updating digital documents with user data and model data), and the requester performing steps 1222 (e.g., automatically updating digital documents with project milestone review decisions and approvals). The digital documentation process steps 1204 send information via data flows 1228, 1230, 1232, 1234 to a digital engineering and certification ecosystem 1206 via a user interface (UX, UI) 1240, which may include platform functionality 1236 and security and access controls 1238. The components 1246 of the digital engineering and certification ecosystem 1206 may include: data sources, formats (perhaps for specific certification purposes), data quality checks, reference libraries of templates, libraries of approved templates (project specific), metadata for users, models and documents, configuration management (for specific certification purposes) and revision history, AI/ML recommender engines for selecting templates, and AI/ML predictive analytic and decision making tools for document preparation.

At the first level (within a project phase for the sake of progress reviews), three sets of items are created: (1) a library of templates, approved by authorized client; (2) an appropriate set of templates for use in a specific project; and (3) an appropriate set of digital documents using the appropriate templates and appropriate project data by authorized users. The appropriate set of templates for use in a specific project may be selected or updated from a library or created new, may be assisted by a machine learning based recommender engine using history of expert inputs, and may permit the user to be assisted by an AI algorithm based on prior templates and user inputs. The creation of the appropriate set digital documents using the appropriate templates and appropriate project data by authorized users may: include templates populated with data from a digital engineering and certification platform; be automated based on user data, model data, M&S parameters, certification requirements, etc.; be AI-assisted based on prior document corpus and user inputs; and be AI-assisted, using LLMs to generate the text of documents in a combination of rule based semantic (e.g., variable driven) and machine learning or statistical approaches.

First, a template is created. An admin creates a configured template with the ability to update in future. Configuration fields of the template include related phase (e.g., Materiel Solutions Analysis (MSA) Phase), approvers list, approvers sequence, contributors' list, contributors' roles, and template classification (e.g., requirement, report). The output is an agreed configured template. In some embodiments, the template is created by a recommender algorithm that has been trained on a user profile and document metadata so that the algorithm is able to recommend a template from a library. For example, a clustering algorithm compares similar templates and runs a classifier algorithm based on user profile metadata, or the algorithm uses content-filtering and collaborative filtering based approaches to recommend templates.

Next, a document is created based on a template. Only authorized users fill data or select appropriate data fields linked to the system for updates. A recommender engine assists in recommending templates for selection by an authorized user. Multiple requesters may then use the configured template. The output is a filled document (e.g., report, acquisition strategy). In some embodiments, two AI algorithms may assist with document creation: a recommender algorithm and an LLM. The recommender algorithm is trained on user profile and document metadata so the algorithm recommends a document from a library (e.g., library of templates, library of prior documents). As an example, the algorithm may use content-filtering and collaborative filtering based approaches to recommend templates. The LLM is fine-tuned with an ontology of documentation requirements and recommends documents to users based on their text input.

Next, the document is prepared or updated in a manner assisted by AI technology. A user fills data in documents from various parts of the platform (depending on the phase and user request). The data may be directly fed, or an AI may assist by using prior document examples. The output is a report based on platform data. In some embodiments, algorithms that use generative-AI for documentation include: (1) a fine-tuned LLM that uses an ontology of certification or documentation requirements and updates documents based on a user's text input and system data to update specific document fields; and (2) a fine-tuned LLM that uses the platform's metadata for wrapper/API creation and links machine-readable system data into human-readable documentation. In some embodiments, algorithms that do not use generative-AI for documentation include: (1) a Markov Chain Monte Carlo algorithm that selects subsets of documents based on the probability of acceptance for documentation requirements; and (2) a rule-based approach using a domain-specific language that updates a document using examples of prior related documents.

Finally, the finished document, or portions thereof, product is approved or rejected by the appropriate parties.

Each step in the digital documentation process referenced above shares data with, and interacts with components from, a digital engineering and certification ecosystem via an appropriate user interface and user experience (UI/UX). The template creation step accesses and writes data sources, formats, data quality checks, reference libraries of templates, and libraries of approved templates (which may be specific to certain projects). The document creation step accesses and writes metadata for users, models and documents, configuration management (for specific certification purposes), revision histories, and AI/ML recommender engine for selecting templates. The document preparation and update step accesses and writes data sources, formats (for specific certification purposes), AI/ML predictive analytics, and decision making tools for document preparation. Finally, the approval step accesses and writes data sources, formats (for specific certification purposes), AI/ML predictive analytics, and decision making tools for document preparation.

At the second level (between project phases, through approval steps), the implementation of digital documentation includes: the compilation of appropriate documents and submission to appropriate approvers; the tracking of approval decisions both in the platform and in the documentation; the communication of approvals and approved documents; and confirming with a designated checklist for each phase. Under the admin configuration, a particular process (e.g., MCA) may have several phases, each of which is associated with a set of templates and a checklist. The document, user and model metadata may be configured to be consistent with the corresponding phase of a task or project. All documents for a project are grouped and are internally consistent. Document controls ensure that documentation for the current phase is reviewed and approved before progressing to documentation of subsequent phases. Digital documentation will also track approvals by authorized users, with clear communication of approval decisions. A user interface may include visual management of the documentation progress.

As an example of digitally documenting progress for phases of a project, consider a software development life cycle (SDLC), with six phases: planning (phase 1), analysis (phase 2), design (phase 3), implementation (phase 4), testing and integration (phase 5), and deployment (phase 6). For such a process, "phase name" is part of the field configuration for a designated template. All documents related to a specific phase are accumulated. The end user may not proceed with the next phase (documentation perspective) until the previous phase has been completed. Each phase has its own designated checklist to be completed before moving forward for the next phase. For example, the planning phase checklist may include communication planning, resources planning, and budget planning documents. Each phase may include a set of related documents with the required actions for those documents. For example, the communication plan is a required document for the planning phase and should be approved by designated persons before moving to the next phase.

Illustrative User Actions in Digital Documentation System

Examples of user interactions for admins, requesters, reviewers/approvers, and contributors within the digital documentation system in one exemplary embodiment are shown in Table 1.

TABLE 1

User Interactions with Digital Documentation System

| No. | Action Name | Actor | Prerequisite | Input | Output |
|---|---|---|---|---|---|
| 1 | Logging into "Istari web app" with valid Admin access | Admin | Active account Web browsers: Google Chrome, Edge, etc. | User name Password | "Istari document tracker" Admin home page will be displayed with authorized data |
| 2 | Select template type | Admin | Action #1 prerequisite | Docs or presentation template | Docs or presentation file will be displayed to be filled |
| 3 | Fill template data | Admin | Familiar with digital documentation docs and presentation (including template concept) | Output of Action #2 | Template created |
| 4 | Configure created template | Admin | Doc or presentation template created | Output of Action #3 Related phase Related ProcessName-OrganizationName (ex: MCA-Airforce) Approvers list Approvers sequence: Contributors list Contributors roles Template classification: | Configured template |

TABLE 1-continued

User Interactions with Digital Documentation System

| No. | Action Name | Actor | Prerequisite | Input | Output |
|---|---|---|---|---|---|
| | | | | (ex: requirement, report) Requester list | |
| 5 | Documentation system adds any new template, along with metadata, to a library | Documentation system | Doc or presentation template created and configured | Output of Action # 4 | Template added to the library |
| 6 | Run scripts to clean/pre-process metadata regularly, e.g. metadata features are on corresponding common scales | Istari Digital Engineering Platform | Doc or presentation template created, configured and exists in the system library | Output of Action #5 AI validation result of user input | Cleaned metadata AI report for predefined data |
| 7 | Logging into "Istari web app" with valid requester access | Requester | Active account (only conferred users within designated organization are allowed to view templates and/or submit requests) | User name Password | "Istari document tracker" Requester home page will be displayed with authorized data |
| 8 | Select an existing template(s) | Requester | Created templates | Output of Action #7 (created templates) | Selected template will be displayed to the requester |
| 9 | Fill the required data under the selected template | Requester | Familiar with digital documentation docs and presentation (including template concept) | Fill the required data based on the created template | Data is filled in Istari platform |
| 10 | MBSE tools based on metadata | Istari Digital Engineering Platform | | Filled data is an input for MBSE tools | M&S data |
| 11 | Validate input data | Istari Digital Engineering Platform | Configured template (with reviewer(s)/approver(s) email list Data filled by requester in designated template | Filled document by requester | The result of input data validation (it could be pre-defined in AI system or not) |
| 12 | Documentation system adds any new document, along with metadata, to a library | Documentation system | Doc or presentation created | Output of Action #9 | Document or presentation added to the library |
| 13 | Run scripts to clean/pre-process metadata regularly, e.g. metadata features are on corresponding common scales | Istari Digital Engineering Platform | Doc or presentation created and exist in the system library | Output of Action #11 AI validation result of user input | Cleaned metadata AI report for predefined data |
| 14 | Send auto email to the configured approver based on configured sequence | Istari Document Tracker App | Configured template (with reviewer(s)/approver(s) email list Filled document to be reviewed by designated reviewer(s) | Filled document to be reviewed by designated reviewer(s) AI report | Email sent successfully to the reviewer(s)/approver(s) that contains document link and AI report |

TABLE 1-continued

User Interactions with Digital Documentation System

| No. | Action Name | Actor | Prerequisite | Input | Output |
|---|---|---|---|---|---|
| 15 | Logging into "Istari web app" with valid reviewer access | Reviewers/ Approvers | Active account | User name Password | "Istari document tracker" Reviewers home page will be displayed with authorized data |
| 16 | Adding comments and tag requester, contributor(s) or other reviewers | Reviewers/ Approvers | Sent file link by email (Action #8 output) Familiar with digital documentation docs and presentation | Fill document request by requester Comments data | Added comments with tagging persons |
| 17 | Send auto email to the configured tagged person | Istari Document Tracker App | Reviewers/Approvers tagged person on the designated file (document or presentation) | Add comments with tagging persons (Action #15) | Email sent successfully to the requester and/or contributor(s) |
| 18 | Take the proper actions | Requester | Added comments with tagging persons (Action #10) | Receive an auto email to take the proper action of designated file (doc or presentation) | Proper action taken |
| 19 | Take the proper actions | Contributor | Added comments with tagging persons (Action #10) | Receive an auto email to take the proper action of designated file (doc or presentation) | Proper action taken |
| 20 | Send auto confirmation email to the requester and related parties of request status | Istari Document Tracker App | All approvers review designated file (doc or presentation) All reviewers submit the approval or rejection of designated file (doc or presentation) | Review file (doc or presentation) by all parties Approve or reject file (doc or presentation) | Email sent successfully to the requester and/or related parties |

Digital Documentation Lifecycle

FIG. 13 shows a swimlane diagram of the digital documentation process, in accordance with the examples disclosed herein. Note that some steps and components in FIG. 13 contain numerals from two sets: the four-digit numerals (e.g., 1320, 1322) are reference characters, whereas the single-digit and double-digit numerals (e.g., 1, 2) show the general chronological sequence of steps.

A detailed description of the digital documentation swimlane 1302/document tracking process 1304 is as follows. An admin 1306 begins 1318 by logging 1320 into an interface (e.g., mobile application), where valid admin access is verified. Next, the admin selects 1322 a template type and selects 1324 either a manual selection 1326 or an AI-assisted selection 1328. If the admin selects a manual selection 1326, the user fills 1330 template data to create a template and configures 1332 the created template. The new template is now ready to be added to a library. If the admin selects an AI-assisted selection 1328, then the system enters an AI template creation process 1334, which shows or sends a recommended template to the admin. The admin then decides whether to submit 1336 the recommended template. If the admin decides "no," then the user fills 1330 template data to create a template, configures 1332 the created template, and the new template is now ready to be added to a library. If the admin decides "yes," then the new template is now ready to be added to a library.

Once a new template is ready to be added to a library, the documentation system on a digital engineering platform 1310 adds 1350 any new template, along with metadata, to the library. The digital engineering platform 1310 runs scripts 1352 to clean and/or pre-process metadata regularly (e.g., metadata features are on corresponding common scales). In some embodiments, metadata may be a set of data tags and attributes, where a template metadata may include a set of common and differentiated fields compared to other document metadata. A requester 1308 may then log 1338 into an interface (e.g., mobile web application), where valid requester access is verified. The requester 1308 then has the option 1340 of updating an existing template or document process. If the requester 1308 decides to update 1342 an existing template or document process, then a document tracker 1312 sends 1368 an email to a configured approver. If the requester 1308 decides not to update an existing template or document process, then the requester 1308 selects 1344 one template among a set of existing templates and fills in the required data (input data) under the selected template 1346. This selection may be at a granular level compared to filling template data 1330, which accomplishes template creation steps (e.g., the equivalent of sections, section headings, etc.), whereas filling the required data 1346 may be updating a template so that some metadata (e.g., the name of the project, authorized person, etc.) are updated. The digital engineering platform 1310 validates 1354 the input data and determines 1356 whether the data matches a set of predefined criteria. For example, an end-user enters a set of parameters (e.g., center of gravity) and based on those parameters, a document is created. If the data does match the set of predefined criteria, a document is created via an AI document creation process 1358, and the digital engineering platform 1310 adds the new document, along with metadata, to the library 1360. The digital engineering platform 1310 then runs scripts 1362 to clean and/or pre-process metadata regularly (e.g., metadata features are on corresponding scales), and then the document tracker 1312 sends an email to a configured approver 1368 as described earlier. If the data does not match the set of predefined criteria, the document tracker 1312 sends an e-mail to a configured approver 1368 as described earlier. In some embodiments, adding the new document 1360 and running scripts 1362 may instead return to adding any new template to the library 1350 and/or to running scripts 1352, showing that any time a new document is updated, a sanitized version is added to the library with appropriate metadata.

After the document tracker 1312 sends 1368 an email to a configured approver, a reviewer/approver 1314 then may log 1376 into an interface (e.g., mobile web application), where valid reviewer access is verified. Next, the reviewer/approver 1314 may add 1378 comments and/or tag a requester, contributor, or other reviewers. The document tracker 1312 then sends 1370 a message (e.g., e-mail) to the configured tagged party, who then takes appropriate action in response. For example, a contributor 1316 takes 1382 proper actions and/or the requester 1308 takes 1348 proper actions. Once all approvers have successfully reviewed the requested document 1380, the document tracker 1312 sends a confirmation message 1372 (e.g., email) to the requester and related parties of the request status. This completes 1374 the digital documentation process. If not all approvers have successfully reviewed the requested document 1380, the reviewer/approver 1314 then may login to the interface 1376 (e.g., mobile web application) and repeat the process.

Template Creation and Document Creation

FIG. 14 shows a process flow swimlane 1402 for template creation and document creation, in accordance with the examples disclosed herein. Note that some steps and components in FIG. 14 contain numerals from two sets: the four-digit numerals (e.g., 1420, 1422) are reference characters, whereas the single-digit and double-digit numbers (e.g., 1, 2) show the general chronological sequence of steps.

The transition of the template creation process from a computer-assisted and user-assisted semi-automated process to a fully or partially automated process assisted by AI is described. It is envisioned that a computer-assisted and user-assisted semi-automated process, as well as a fully automated process assisted by AI, are within the scope of the present invention. Furthermore, an intermediate embodiment where some of the process steps are computer-assisted but still user-assisted, whereas other process steps are fully or partially automated by AI, are also within the scope of the present invention. The various permutations and combinations of which steps are computer-assisted but still user-assisted, and which other steps which are fully or partially automated by AI, is apparent from reading this disclosure. The initial semi-automated steps include the following. The admin user creates templates based on a target outcome, purpose, and requirements. This may include selecting the template type (e.g., text document, slide presentation). The project manager (or admin) creates a template document and configures the created template. "Configure" means filling a set of fields from each created template, where the following are examples: related phase (e.g., Materiel Solutions Analysis (MSA) Phase), approvers list, approvers sequence, contributors list, contributors' roles, and template classification (e.g., requirement, report). Once created, the template has metadata tags added associated with specific purposes, versioning history, audit log, priority, etc., and are added to a common library. Based on target outcome and purpose, an admin user reviews the templates available in the library and selects appropriate ones. These selections may be further reflected in the template metadata and in the template creation automated directly based on the user input for target outcomes and purposes.

To build a machine learning recommendation algorithm (e.g., recommender engine) using a set of text templates as a training set and user input text, the following steps are followed. First, data is collected and pre-processed. This includes compiling a library of initial templates that are created, updating the metadata fields and adding tags for each template document, adding by admin users' additional tags to existing templates (e.g., new use cases) or custom tags, cleaning (which may involve removing any irrelevant or unnecessary information), and formatting the data in a way that is suitable for training the algorithm. The metadata fields may include end-use (e.g., certification), document controls tag (e.g., project stage), technical context (e.g., specific modeling or simulation), template priority (e.g., necessary, high, medium, low), user access restrictions (e.g., admin-only, open-access).

To develop a recommendation algorithm, a variety of machine learning models may be employed. Broadly speaking, supervised, unsupervised and semi-supervised algorithms will be used. In some cases when explainability is important, explainable machine learning models may also be used. Some examples of recommenders include decision trees, clustering models, k-nearest neighbors, and support vector machines. Note, the above is a short list of examples and is not all inclusive of the models that may be employed. The choice of model may be determined by the size and complexity of template metadata, the performance of different models on similar tasks, and any specific requirements or constraints. Training the chosen model using the training set of text templates and user input text typically involves feeding the data into the model and adjusting the model's parameters to optimize its performance on the training data. To test and evaluate the model, the data is divided into a training set and a test set, and the test set is used to evaluate the model's performance. Evaluation metrics, such as accuracy, precision, and recall, may assess the model's performance and determine whether it is suitable. Finally, fine-tuning the model may be done by adjusting its parameters, adding more data, and reinforcement learning approaches where a user's acceptance of algorithm outputs is further used to refine the model parameters.

The transition of the document creation process from a computer-assisted and user-assisted semi-automated process to a fully or partially automated process assisted by AI is described. It is envisioned that a computer-assisted and user-assisted semi-automated process, as well as a fully automated process assisted by AI, are within the scope of the present invention. Furthermore, an intermediate embodiment where some of the process steps are computer-assisted but still user-assisted, whereas other process steps are fully or partially automated by AI, are also within the scope of the present invention. The various permutations and combinations of which steps are computer-assisted but still user-assisted, and which other steps are fully or partially automated by AI, is apparent from reading this disclosure. The initial semi-automated steps include the following. The user creates documents based on a target outcome and purpose, following a selected template. Once created, the document has metadata tags added associated with specific purposes, versioning history, audit log, priority, etc., and are added to a common library. Based on the purpose or requirements, a user selects a template or a prior document example in the library. With linkage to the digital engineering and certification platform, for a specific purpose, the data fields in a template (and their associated metadata) can be used to bring further other related data from the platform into the document.

A machine learning algorithm (e.g., generator engine) based on natural language processing (NLP) or LLM validates the user input to recommend documents, or create new documents, and generates the document text using user input text and based on a training set of existing templates and prior examples of documents. Data is collected and pre-processed. For example, data is collected into a format according to the needs of the system. Typical preprocessing includes Establishing a feature set (e.g., notating what specific sections and subsections of a certification process document correspond to elements of a mechanical system to be certified), separating training data from validation or evaluation data (which ensures that the model is trained on the relevant materials, and introducing purposeful outliers or known true positives is saved for the validation step). The choice of the NLP model and the choice of LLM may be determined by the size and complexity of template metadata or document text. A fine-tuned or retrained transformer such as GPT3 may serve as a foundation for generating the correct documentation.

Training the chosen NLP model using the training set of text templates and user input text typically involves feeding the data into the model and adjusting the model's parameters to optimize its performance on the training data. The process to train the model takes the outputs of two competing networks, and evaluates them against a known standard. Evaluating the two competing networks comprises of the use of Generative Adversarial Networks (GANs), which are trained to select between two or more options, that are used in conjunction with Q learning, where an agent is trained to provide reinforcement learning feedback, and being able to operate with minimal supervision. The established policy yields a reward for the closer result to the desired, while culling the network that presented the result further from ground truth.

To test and evaluate the model, the data is divided into a training set and a test set, and the test set is used to evaluate the model's performance. Evaluation metrics, such as accuracy, precision, and recall, may inform how to update weights and biases within the neural network. Finally, fine-tuning the model may be done by adjusting its parameters, adding more data, and reinforcement learning both through policy selection and human-in-the-loop approaches where a user's acceptance of algorithm outputs is further used to refine the model parameters.

A detailed description of the process flow swimlane 1402 for template creation and document creation is described as follows. The AI template/document creation process 1404 involves at least two entities: a digital engineering platform 1406 and an admin/requester 1408. The digital engineering platform 1406 begins 1410 by determining 1420 whether a clustering concept exists. If "yes," then the digital engineering platform 1406 applies 1412 supervised or unsupervised clustering techniques to create clusters within the library. The digital engineering platform 1406 conducts 1414 silhouette coefficient or other performance metrics to measure the quality of clusters in the template library. The digital engineering platform 1406 determines 1416 whether a clustering concept exists. If "no", then the digital engineering platform 1406 returns to applying 1412 supervised or unsupervised clustering techniques to create clusters within the library. On the other hand, if "yes," then the digital engineering platform 1406 creates 1418 small sub-groups of clusters within a template library (of templates that likely will be needed together). The digital engineering platform 1406 uses 1422 metadata of sub-groups as training data, at which point the admin/requester 1408 provides 1432 text input (which may include specific data fields). The digital engineering platform 1406 then runs 1426 a classifier algorithm to identify a best-fit sub-group for user input. The digital engineering platform 1406 then displayed 1428 a recommended template/document. The admin/requester 1408 then selects 1434 a template/document for their selected purpose and/or need, and finally may update 1438 the metadata of the selected template/document with a new need.

If after determining 1420 whether a clustering concept exists the answer is "no," then the admin/requester 1408 selects 1430 specific metadata from a query menu. The digital engineering platform 1406 provides 1424 a list of template/documents with the corresponding metadata. The admin/requester 1408 then selects 1434 a template/document for their selected purpose and/or need, and finally may update 1438 the metadata of the selected template/document with a new need.

This completes 1440 the AI template/document creation process 1404.

Document Update Process

FIG. 15 shows a detailed process flowchart 1502 for template creation, in accordance with the examples disclosed herein. First, in step 1506, an admin user manually creates a template based on target outcomes and purposes. Next, in step 1508, the admin user updates metadata for each template. Steps 1506 and 1508 constitute user-initiated steps 1510. In step 1514, a documentation system adds any new template, along with metadata, to a library. In step 1516, the documentation system runs scripts to clean and/or preprocess metadata regularly (e.g., so that features are on corresponding common scales). Steps 1514 and 1516 involve system data 1512. In step 1520, the admin user selects specific metadata from a query menu. In step 1522, the system provides a list of templates with the corresponding metadata chosen. Steps 1520 and 1522 constitute template creation 1518. In steps 1526 and 1528, responsive to input from the admin user, the documentation system adds any new templates, along with their associated metadata, to the library. Steps 1526 and 1528 constitute system output 1524. The process flow then proceeds back to step 1514.

After step 1516, the process flow may proceed to a cluster-creating process 1552, which includes steps 1529, 1530, 1532, and 1534. In step 1529, the system applies supervised or unsupervised clustering techniques to create clusters within the library. In step 1530, the system conducts silhouette coefficient or other performance metrics for measuring the quality of clusters in the template library. In step 1532, the system determines whether the clusters are of high quality. If "no," then the system returns to step 1529. If "yes," then the system proceeds to step 1534, where the system creates small sub-groups of clusters within the template library (e.g., of templates that likely will be needed together).

After step 1534, the process flow may proceed to a training process 1556, including steps 1536, 1538, 1540, 1542, and 1544. In step 1536, the system uses metadata of sub-groups as training data. In step 1538, the admin user provides text input (which may include specific data fields, metadata, or target outcomes). In step 1540, the system runs a classifier algorithm to identify a best-fit sub-group for user input. In step 1542, the system recommends one or more template(s). In step 1544, the admin user reviews templates and either selects or rejects the recommended templates.

After step 1544, the system may fine-tune or further fine-tune the recommender engine by returning to step 1540, or it may proceed to step 1546, where the admin user selects templates for use, depending on their selected purpose and/or need. Finally, in step 1548, the admin user may update metadata of the selected templates with new needs.

Overall, the cluster-creating process 1552 and the training process 1556 constitute AI-assisted template creation 1550 (e.g., using clustering and a classifier algorithm).

FIG. 16 shows a process flow swimlane 1602 for document update, in accordance with the examples disclosed herein. The transition of the document update process from a computer-assisted and user-assisted semi-automated process to a fully or partially automated process assisted by AI is described. It is envisioned that a computer-assisted but still user-assisted semi-automated process, as well as a fully automated process assisted by AI are within the scope of the present invention. Furthermore, an intermediate embodiment where some of the process steps are computer-assisted but still user-assisted, whereas other process steps are fully or partially automated by AI, are also within the scope of the present invention. The various permutations and combinations of which steps are computer-assisted but still user-assisted, and which other steps are fully or partially automated by AI, is apparent from reading this disclosure. The initial semi-automated steps include the following. A user updates documents manually by referring to the data from the digital engineering platform, the target outcome, purpose, and other requirements. The user may also update document metadata as appropriate. At various points in the document update workflow, the user may add the document to a library of example documents (whether scrubbed of all data, or as example data fields and illustrative data).

With linkage to the digital engineering and certification platform, for a specific purpose, the data fields in a document may be populated with current user data, modeling and simulation data and other parameters. The document update may also include a diff (file compare) with prior versions to highlight specific data that is updated, along with commentary that is prompted to the user or automatically updated from the system using any revision history.

A machine learning algorithm (e.g., generator engine and/or document update engine) based on NLP or LLM updates documents based on a training set of prior examples of documents, modeling and simulation data and using user input text. Data is collected and pre-processed. For example, data is collected into a format according to the needs of the system. Typical preprocessing includes Establishing a feature set (e.g., notating what specific sections and subsections of a certification process document correspond to elements of a mechanical system to be certified), separating training data from validation or evaluation data (which ensures that the model is trained on the relevant materials, and introducing purposeful outliers or known true positives is saved for the validation step). The choice of the NLP model and the choice of LLM may be determined by the size and complexity of template metadata or document text. A fine-tuned or retrained transformer such as GPT3 may serve as a foundation for generating the correct documentation.

For an already generated document requiring updating, establishing a feature set may be performed by using diffs between current version and desired version. If no desired version is present, the current version may at least have metadata associated with sections that point to relevant certification criteria but without corresponding certification documentation. For an existing document, the training data may be surrounding examples of additions to be made to the current document that are not currently present, and then point to potential documentation to incorporate.

Training the chosen NLP model using the training set of text templates and user input text typically involves feeding the data into the model and adjusting the model's parameters to optimize its performance on the training data. The process to train the model takes the outputs of two competing networks, and evaluates them against a known standard. The known standard in this case is the ground-truth certification documentation, which is then contextualized for the mechanical system in question, and then updated with likely relevant section verbiage. Evaluating the two competing networks comprises of the use of Generative Adversarial Networks (GANs), which are trained to select between two or more options, that are used in conjunction with Q learning, where an agent is trained to provide reinforcement learning feedback, and being able to operate with minimal supervision. With existing documentation requiring updates, this is facilitated by contextualizing each component with existing certification documentation pointers. The relevance of potential updates can serve as policy scores over several iterations of the Q learning process. The established policy yields a reward for the closer result to the desired, while culling the network that presented the result further from ground truth.

To test and evaluate the model, the data is divided into a training set and a test set, and the test set is used to evaluate the model's performance. Evaluation metrics, such as accuracy, precision, and recall, may inform how to update weights and biases within the neural network. Finally, fine-tuning the model may be done by adjusting its parameters, adding more data, and reinforcement learning approaches where a user's acceptance of algorithm outputs is further used to refine the model parameters. For updates, this can be done in much the same way as previously established, but adds a layer facilitating scoring, because updates may be fed through transformers that take into account what is there, making sequencing easier.

A detailed description of the process flow swimlane 1602 for document update is described as follows. Note that some steps and components in FIG. 16 contain numerals from two sets: the four-digit numerals (e.g., 1620, 1622) are reference characters, whereas the single- and double-digit numbers (e.g., 1, 2) show the general chronological sequence of steps. The update existing document process 1604 involves at least two entities: a digital engineering platform 1606 and a requester 1608. The digital engineering platform 1606 begins 1610 by the requester 1608 selecting 1612 a required document to update. The digital engineering platform 1606 then updates 1620 data fields of linked information (e.g., user data, modeling and simulation parameters, simulation outputs). The digital engineering platform 1606 determines 1622 whether the data matches predefined criteria. If "no," then the requester 1608 updates 1614 the document with text details manually, referring to data from the digital engineering platform 1606. The requester 1608 updates 1616 metadata, and then the document is completed and ready for submission review. This completes 1618 a branch of the process.

On the other hand, if the digital engineering platform 1606 determines 1622 that the data indeed matches predefined criteria, then the digital engineering platform 1606 suggests 1624 related data fields in the digital engineering platform 1606 for the requester 1608 to include. The requester 1608 selects or rejects 1634 the suggested related data fields/recommended text. The digital engineering platform 1606 is then able to train 1636 an NLP/LLM model by taking the outputs of two competing networks and evaluating them against a known standard. The training uses generative adversarial networks (GANs), which are trained to select between options, in conjunction with Q learning, where an agent is provided reinforcement learning feedback, and is able to operate with minimal supervision. After the digital engineering platform 1606 suggests 1624 related data fields in the digital engineering platform 1606 for the requester 1608 to include, the user data prompts and document fields are input 1626 to the NLP/LLM model. The NLP/LLM model assists 1628 in document text generation. The digital engineering platform 1606 recommends 1630 text additions to the document. The requester 1608 selects or rejects 1632 the recommended text. The requester 1608 updates 1616 metadata, and then the document is completed and ready for submission review. This completes 1618 another branch of the process.

In some embodiments, a "user" and a "requester" are the same entity when they perform 1612, 1614 and 1616. In some cases, a requester may only perform 1612 to hand off the process to another user to complete 1614 and 1616.

Exemplary Template/Document Creation & Document Update

FIGS. 17 and 18 show a detailed process flow for document recommendation, creation and update, in accordance with the examples disclosed herein. The detailed process flow for document creation and updating comprises a part 1 of 2 flowchart 1702 shown in FIG. 17 and a part 2 of 2 flowchart 1802 shown in FIG. 18. First, user-initiated steps 1704 include steps 1706 and 1708. In step 1706, a user creates documents based on target outcome and purpose, following a template. Then in step 1708, the user adds metadata tags about specific purpose, priority etc. Next, system data steps 1710 include steps 1712 and 1714. In step 1712, a documentation system adds any new document, along with metadata, to a library. In step 1714, the system runs scripts to clean and/or pre-process metadata regularly, e.g., so that features are on corresponding common scales. Next, document creation steps 1716 include steps 1718, 1720, and 1722. In step 1718, the user selects specific metadata from a query menu. In step 1720, the system provides a list of templates or prior document examples (with sanitized data) with the corresponding metadata. In step 1722, if no prior document or template is available, the system creates a new document or template. Next, System output steps 1724 include steps 1726 and 1728. In step 1726, the user selects an appropriate document for use for their selected purpose and/or need. In step 1728, the user may update the metadata of the selected document with a new need. Then, the process may proceed back to step 1712, or may proceed to step 1758, where the process then proceeds to point A, which continues in part 2 of 2 flowchart 1802 shown in FIG. 18.

After step 1714, the system run scripts to clean and/or pre-process metadata regularly, e.g., so that features are on corresponding common scales, the system may also perform clustering steps 1754, which include steps 1730, 1732, 1734, and 1736. In step 1730, the system applies supervised or unsupervised clustering techniques to create clusters within the library. In step 1732, the system conducts silhouette coefficient or other performance metrics for measuring the quality of clusters in the template library. In step 1734, the system determines whether the clusters area of high quality, based on the metrics. If "no," then the process returns to step 1730. If "yes," then in step 1736, the system creates small sub-groups of clusters within the document library (of templates and previous documents that likely will be needed together). The system then proceeds to perform classification steps 1756, which includes steps 1738, 1740, 1742, 1744, 1746, 1748, and 1750. In step 1738, the system uses metadata of sub-groups as training data. In step 1740, the user provides text input (which may include specific data fields, metadata or target outcome). In step 1742, the system runs a classifier algorithm to identify a best-fit sub-group for the user input. In step 1744, the system recommends template(s) or prior document example(s) accordingly. In step 1746, the user selects templates or rejects the recommended document examples. The process may then proceed to fine-tune or further fine-tune the recommender engine by returning back to step 1742. In step 1748, if no prior document or template is available, the system creates a new document or template. In step 1750, the user may update the metadata of the selected document with a new need. Clustering steps 1754 and classification steps 1756 may together constitute AI-assisted document creation 1752 (using clustering and classifier algorithm). The process then proceeds to point A, which continues in part 2 of 2 flowchart 1802 shown in FIG. 18.

Part 2 of 2 flowchart 1802 shown in FIG. 18 continues from part 1 of 2 flowchart 1702 shown in FIG. 17, where step 1758 in point A of FIG. 17 corresponds to step 1804 in point A of FIG. 18. After step 1804, the system proceeds to step 1806, where the user has been assigned the document to update. The semi-automated document update steps 1808 include steps 1810 and 1812. In step 1810, the system updates data fields of linked information (e.g. user data, modeling and simulation parameters, simulation outputs). In step 1812, the user updates the document with text details manually referring to data from the digital engineering system. At this point, the process may proceed to step 1832, where the document is completed and is ready for submission review.

After step 1806, the process may instead proceed to AI-assisted document update process 1834, which includes steps 1816, 1818, 1820, 1822, 1824, 1826, 1828, and 1830. In step 1816, the system updates data fields of linked information (e.g. user data, modeling and simulation parameters, simulation outputs). In step 1820, the system suggests related data fields in the digital engineering system for the user to include. In step 1824, the user data prompts and document fields are input to the model. Separately, in step 1818, training data is prepared. This training data includes a large number (e.g., hundreds or thousands) of example documents related to the data fields interest. These fields may have been previously tagged, meaning this is now labeled data. In step 1822, the training data is used to train the model. Given the training data, a classical neural network architecture could become sensitive to these kinds of documents and recognize what combinations make sense.

In step 1826, the outputs of steps 1822 and 1824 are then input into a ML model with NLP/LLM support that assists in document text generation. In step 1828, the system recommends text additions to the document. In step 1830, the user selects or rejects the recommended text. The system may then fine-tune or further fine-tune the recommender engine by returning to step 1826.

Finally, in step 1832, the document is completed and ready for submission review.

Overall Digital Documentation System Embodiments

Some illustrative digital documentation system embodiments are described.

FIG. 19 shows a process flow for generating a digital engineering (DE) document file. The system starts at step 1902. Next, in step 1904, the system retrieves one or more DE document templates from a DE document template library comprising DE document templates for one or more phases of a DE product life cycle, where the DE document templates comprise DE data fields. In step 1906, the system receives a first user input from a first user. In step 1908, the system determines a selected DE document template from the one or more DE document templates based on the first user input. In step 1910, the system retrieves model data from a first model splice via a common, externally-accessible Application Programming Interface (API), where the model data is retrieved based on the selected DE document template, where the first model splice is generated from a first DE model file of a first DE model type, where the first model splice provides access to selective model data within the first DE model file without exposing the entire first DE model file, where the first model splice provides access control to the retrieved model data based on access permissions of the first user, and where the first model splice provides the first DE model with the common, externally-accessible API. Finally, in step 1912, the system executes a generator engine to generate the DE document file from the selected DE document template, utilizing the retrieved model data from the first DE model file retrieved via the first model splice. This completes the process at step 1914.

FIG. 20 shows a system for generating a DE document file in a digital engineering system, according to exemplary embodiments of the invention. Specifically, FIG. 20 provides a schematic representation of a digital documentation system 2030 for generating a digital engineering (DE) document file 2080A within an IDEP. The system includes access to at least one hardware processor 2010 responsible for executing program code 2022 to implement the modules 2030 described below. The system includes access to at least one non-transitory physical storage medium 2020, accessible by the at least one hardware processor 2010, which stores the program code 2022 that is executable by the hardware processor 2010. The program code may be stored and distributed among two or more non-transitory physical storage media, and may be executed by two or more processors.

The system 2030 includes a DE document template library 2032, which in turn includes a variety of DE document templates (2040, 2050) corresponding to different phases of a DE product's lifecycle. In FIG. 20, each template is shown to contain DE data fields (2042, 2044, 2052, 2054).

The system includes a graphical user interface (GUI) 2004 for receiving input from a user 2002. The received user input may be used to determine the selection of a DE document template from the DE document template library 2032 based on the user's input. The GUI may also allow the user 2002 to view, select, modify, and/or provide feedback on available DE document templates and on generated DE documents. In FIG. 20, for example, the user 2002 is viewing the generated DE document 2080C through the GUI 2004.

The system includes an API interface 2064, representing the common, externally-accessible Application Programming Interface (API) through which model data 2074 is retrieved from a model splice 2070. The model splice 2070 is generated from a DE model file 2060 of a DE model type, using a model splicer 2062. The model splice 2070 is designed to provide selective access to model data 2074 within the DE model file 2060.

The system includes an access control mechanism 2072 which is part of the model splice 2070. The access control mechanism provides access to the retrieved model data 2074 based on the access permissions of the user 2002, thus ensuring secure and controlled data retrieval.

The system includes a generator engine 2034, depicted within the digital documentation modules 2030, which generates a DE document file 2080A from a DE document template selected by the user 2002, by utilizing the retrieved model data 2074 from the model splice 2070. In some embodiments, the generator engine 2034 also performs the role of an update engine that is capable of updating an input document based on user input (e.g., feedback on a previously generated DE document).

In some embodiments, the system includes a recommender engine 2036. The recommender engine 2036 receives user input (e.g., a user prompt and/or a DE document request) and returns, based on the user input, a recommended DE document template (e.g., 2050) from the DE document template library 2032. Rather than use a DE document template selected by the user, the generator engine 2034 may instead use the DE document template recommended by the recommender engine to generate the user-requested DE document 2080A.

In some embodiments, an IDEP application 2038 is included as part of the digital documentation system 2030. The IDEP application 2038 enables the methods described herein by orchestrating user interactions through the GUI 2004 and access to model data 2070, the generator engine 2034, the recommender engine 2036, and the DE document template library 2032. In one exemplary scenario, the IDEP application 2038 may collect input (e.g., a requirement document request for verification) from the user 2002 through the GUI 2004, provide the user input to the recommender engine 2036, receive a recommended DE document template (e.g., 2050) that the recommender engine retrieved from the DE document template library 2032, send the recommended DE document template to the generator engine 2034, receive a generated DE document 2080B from the generator engine 2034, send the generated DE document 2080C to the GUI 2004, receive user feedback on the generated DE document 2080C, send the user feedback to the generator engine 2034, receive an updated DE document 2080A from the generator engine 2034, send the updated DE document 2080C to the GUI for user approval by one or more users, receive user approval of the finalized DE document 2080B through the GUI 2004, and finally send the finalized DE document 2080B to the relevant digital thread for processing (e.g., requirement verification for a product). The IDEP application 2038 may also store the finalized DE document 2080B within the DE document template library 2032 for future recommendations.

FIG. 20 therefore illustrates the flow of data and interactions between the components of the digital documentation system, starting from the user 2002 input to the final generation of the DE document file 2080A, highlighting the system's capability to streamline the creation of DE documents efficiently and securely.

Features of Digital Documentation System

Some optional features of the digital documentation system are described next.

In one embodiment, the digital documentation system is integrated with a computer-based system for digital engineering and certification.

In one embodiment, the model splice enables interoperability of two or more digital engineering tools that are not already interoperable. According to one embodiment, the model splice enables transmitting, via an application programming interface (API) or software development kit (SDK), one or more inputs derived from digital engineering data to two or more digital engineering tools for processing, where the two or more digital engineering tools are provided by at least two distinct digital engineering tool providers, where a first portion of the two or more digital engineering tools provided by a first provider of the at least two distinct digital engineering tool providers is not directly interoperable with a second portion of the two or more digital engineering tools provided by a second provider of the at least two distinct digital engineering tool providers, and where the API or SDK is configured to interface with each of the two or more digital engineering tools to automatically enable interoperable use of multiple digital engineering tools in parallel. The model splice further receives engineering-related data outputs from the two or more digital engineering tools, and provides the received data output to the IDEP system for further processing.

In some embodiments, the DE template document files used for the recommender engine are selected from a set of documents (for certification, validation, verification, and the like) associated with one or more distinct products, product parts, and/or processes. For example, various common V&V products as defined above.

In one embodiment, each of the DE document templates includes at least one data field related to a DE model type.

In various embodiments, a security and access control subsystem is implemented within the digital documentation system to protect the DE documents and document templates from unauthorized access or modification.

One embodiment includes the use of secure decentralized ledgers to store documents and document metadata. The use of decentralized ledgers adds another layer of security in storage. In one embodiment, the documents are stored in a central data repository, but document metadata, access history, and related metadata are stored in a decentralized ledger. In some embodiments, a secure database or a blockchain network is accessed to record transactions associated with utilizing the digital documentation system.

In one embodiment, the systems disclosed herein include a blockchain component for enhancing security and transparency of the system (e.g., for recording and enforcing user access privileges to DE documents, DE document templates, and DE model files, for the generation, usage, and modification history of DE documents, and for the usage history of DE document templates).

One embodiment includes the use of secure communication protocols to share and control access to the documents via document splices and related methodologies.

In one embodiment, the methods disclosed herein include implementing augmented reality or virtual reality to display the document files within the digital documentation system.

In another embodiment, the methods disclosed herein include generating an administrator (admin) user interface within the digital documentation system. The admin user interface is enabled to allow an administrator user, an expert user, the digital documentation system with a user's input, and the like, to select, download, and/or generate a plurality of templates. Additionally, the methods disclosed herein include storing the plurality of templates for later access within the digital documentation system.

In yet another embodiment of the recommender engine, the methods disclosed herein include presenting one or more recommended DE document templates to the user and receiving feedback from the user on the recommended DE document templates. Optionally, the recommender engine may present a plurality of template options for the user, and may perform at least a second recommendation based on prior responses from the user during a first recommendation.

In one embodiment, the methods disclosed herein include providing a user interface enabled to receive a second user input from the user, selecting the recommended template based on the second user input, receiving a third user input from the user, and updating the selected document file based on the third user input.

In another embodiment, the methods disclosed herein include generating a first user interface within the digital documentation system, where the first user interface is enabled to allow a user, or the digital documentation system with the user's input, to select and populate one or more of the plurality of templates with data. In yet another embodiment, the methods disclosed herein include presenting a DE document file to the user and receiving feedback from the user. Optionally, the methods allow the first user to edit and/or update the DE document.

In one embodiment, the methods disclosed herein include providing a user interface enabled to track approval decisions (i.e., user approval of a recommended DE document template or of a generated DE document) within the digital documentation system from one or more users.

In another embodiment, the methods disclosed herein include generating a second user interface enabled to track approval decisions within the digital documentation system by one or more users throughout a specific engineering process (e.g., the design phase of a product).

In one embodiment, the systems disclosed herein include a machine learning-based system for recommending templates, and assisting with document preparation in a digital documentation system for digital engineering and certification. The system includes a recommendation subsystem having one or more natural language processing and semantic analysis modules for understanding the content of a plurality of templates and a plurality of document files. The system also includes a generator subsystem having one or more predictive modeling and decision-tree algorithms for generating suggestions for data fields and values based on a user's previous inputs and an overall context of the document files.

In another embodiment, the systems disclosed herein include a computer-based system for digital engineering and certification, integrated with a digital documentation system for assisting with the preparation of engineering and certification documents. The system includes a user interface for selecting and populating templates with data, one or more machine learning models for recommending templates and assisting with document preparation, a security and access control subsystem for protecting the templates and documents from unauthorized access or modification, and a document workflow management subsystem for tracking and communicating approval decisions throughout the certification process.

In yet another embodiment, the systems disclosed herein capture metrics for measuring a system efficiency (e.g., based on user feedback statistics), a system accuracy (e.g., based on template recommendation and document generation success statistics), and a user satisfaction with the system (e.g., explicitly based on user reviews of the system or implicitly based on user actions on the system). The machine learning models are trained and/or fine-tuned based on the metrics.

In one embodiment, the systems disclosed herein feature scalability and flexibility to support different types of certification processes and user's specific requirements.

Some embodiments include a method, process, and non-transitory physical storage media for generation of document files in a digital documentation system, the method comprising steps to generate a first user interface within the digital documentation system, the first user interface enabled to allow a user or the digital documentation system with user's input to select and populate a plurality of templates with data; store the plurality of templates for later access within the digital documentation system; execute a first machine learning algorithm to recommend one or more of the plurality of templates; execute a second machine learning algorithm to generate a completed document file from the one or more recommended templates; and generate a second user interface enabled to track approval decisions within the digital documentation system by one or more users throughout an engineering process.

In one embodiment, the first machine learning algorithm comprises natural language processing and semantic analysis code to understand content of the plurality of templates and the document files, and to recommend or generate relevant templates to the user based on user input. In some embodiments, the first machine learning algorithm is called a recommender engine.

In another embodiment, the second machine learning algorithm comprises predictive modeling and decision-tree algorithms to generate completed document files, by generating suggestions for data fields and values based on the user's previous inputs and an overall context of the document file. In some embodiments, the second machine learning algorithm is called a generator engine.

In another embodiment, method further comprises a step to update the completed document within the digital documentation system utilizing a third machine learning algorithm based on user feedback. In some embodiments, the third machine learning algorithm is called an updated engine. In other embodiments, the third machine learning engine is the generator engine.

Alternative Embodiments of Digital Documentation System

Some alternative embodiments of the invention are described next. These embodiments are provided for illustrative purposes, and are not meant to be limiting. Alternative embodiments and sub-combinations of the present invention will be apparent to one of ordinary skill in the art when reading the disclosure, even if such embodiments and sub-combinations are not explicitly described herein. One of ordinary skill in the art would recognize that components may be considered optional, and may be removed or added to various relevant embodiments based on technical or business requirements.

Embodiments Applicable to Other Fields Outside of DE

Although the invention has been described with respect to digital engineering and engineering-related digital documentation, the invention has applications to information and data sources outside of engineering, as will be apparent from reading this disclosure. In some embodiments of the invention, the digital documentation system comprises text or data linked as a digital thread with authenticated references to a variety of sources of information in fields outside of DE. Examples of such information sources may include peer-reviewed journals, regulatory or legal documents, common V&V products, financial reports, newspaper articles from reputable news organizations, and other authoritative information sources. Such embodiments of digital documentation present the user with the ability to trace the source of the specific document text and data, and confirm that it is authenticated from a reliable source.

Accordingly, in some embodiments, the live or magic documents are newspaper articles, scientific articles, medical articles, financial reports, engineering documents, media documents, legal documents, online encyclopedias, political speeches, Congressional, federal, or other government reports, or other documents from other information sources. In one embodiment, when a live or magic document is quoting someone or citing statistics from a source, the software-defined digital thread in the digital documentation system helps to ensure the immutability, reliability, and consistency of the quoted or cited source or data.

In the era of generative AI and false information sources in newspapers, political speeches, social media and the like, the present invention assists the reader with determining what is real and what is not, based on the reader's judgment of the credibility and/or the reliability of the source of truth being cited. The IDEP platform allows sources of truth to be seamlessly cited and more easily cross-checked by the reader, reducing the risks of false or misleading information gaining wide traction.

In one embodiment, the live or magic document references or links to authoritative sources of underlying truth, for example, the original scientific report that is cited by a newspaper article or political speech, can be cross-checked by the reader or by AI agents with probabilistic models of truth.

In one embodiment, authoritative sources of truth, e.g., scientific reports and articles, will release underlying models and metadata during publication, rather than releasing only the report (and possibly sample data) as is common currently. As a result, the model splicer can interface with third-party models and data sources, and generate and authenticate live or magic documentation surrounding those models.

For example, a scientist may publish underlying models of their research, rather than just their published article and some sample data. In one embodiment, the present digital documentation system would enable a live or magic scientific article to be released on the Internet/Web, which is linked to the underlying models, simulations, and data released by the scientist. This would enable the scientific community, the media community, and general members of the public to cite, review, annotate, and seamlessly comment on the scientific results, while having full visibility into the underlying models used to arrive at the results. Furthermore, any updates from new, subsequent experiments could be pushed directly into the scientific model released by the scientist, and automatically update the digital documentation associated with the scientific model (e.g., the scientific publication) in real-time.

One advantage of such a system is that scientists may publish preliminary research earlier than they would otherwise instead of first waiting for all their experiments and analysis to be completed. This would accelerate the dissemination of cutting-edge scientific information among both the research community as well as the broader general public.

Furthermore, third-parties like the media and the general public (e.g., on social media) can cite to the underlying scientific articles and underlying scientific models provided by the scientist as an authoritative source of truth. Such a capability would also enable third parties to replicate experiments, review data, and confirm scientific conclusions as a safeguard against or to mitigate errors, fraud, or statistically insignificant results.

In other embodiments, the scientific article comprises a medical-related article, for example, medical journal article, a medical reference, and/or another article or document with medical information (e.g., a newspaper article with medical information). The medical article may cite to underlying sources of truth that are considered reputable in the medical community, for example, peer-reviewed medical journal articles with their underlying medical models, or to authoritative medical reference sources.

In some embodiments, auditing is enabled of the underlying sources and source data. In some embodiments, the documents are accessible in a zero-trust, secure manner and may be auditable.

In other embodiments, the documents are stored in a decentralized manner, for example, in a decentralized datastore or blockchain. In other embodiments, the documents are stored in a centralized fashion, but metadata associated with the document and its source may be stored in a decentralized manner, for example, in a decentralized datastore or blockchain.

As an illustrative example, FIG. 31 shows a digital engineering document, but in other embodiments, FIG. 31 may comprise a newspaper article (e.g., a NEW YORK TIMES article), a medical article, a scientific journal article, and so forth.

In short, software-defined digital threading of centralized and decentralized data sources results in potential for Web 4.0-type applications on various data sources available on the Internet/Web.

Digital Documentation System with IDEP System Data (Other than Model Splice Data)

In some embodiments of the invention, the digital documentation system comprises program code to retrieve recommended templates; receive a user selection of a template; retrieve model data (optionally via a model splice) to populate into the selected template; and generate a document from the recommended template using the model data.

In alternative embodiments, the digital documentation system comprises program code to retrieve recommended templates; receive a user selection of a template; and generate a document from the recommended template, using any type of system data from the IDEP, its subsystems, or components, including metadata from said IDEP and its subsystems. It is understood that the use of model data from a model splice is optional, and the system may be equally implemented without the use of model data retrieved via a model splice.

Examples of documents generated with data other than model data from model splices include security audit reports, certified by the IDEP system, for example, based on IDEP metadata analytics and not model data.

Accordingly, in some embodiments, a non-transitory physical storage medium storing program code is provided. The program code is executable by a hardware processor. The hardware processor when executing the program code causes the hardware processor to execute a computer-implemented process for generating a digital engineering (DE) document file. The program code comprises code to retrieve one or more DE document templates from a DE document template library comprising DE document templates for one or more phases of a DE product life cycle; receive a first user input from a first user; determine a selected DE document template from the one or more DE document templates based on the first user input; retrieve system data or metadata from the IDEP or its subsystems; and execute a generator engine to generate the DE document file from the selected DE document template, utilizing the retrieved system data or metadata.

In some related embodiments, a digital documentation system for generating a digital engineering (DE) document file is provided. The system comprises at least one hardware processor, and at least one non-transitory physical storage medium storing program code. The program code is executable by the at least one hardware processor. The at least one hardware processor when executing the program code causes the at least one hardware processor to execute a computer-implemented process for generating the digital engineering (DE) document file. The program code comprises code to retrieve one or more DE document templates from a DE document template library comprising DE document templates for one or more phases of a DE product life cycle; receive a first user input from a first user; determine a selected DE document template from the one or more DE document templates based on the first user input; receive system data or metadata from the IDEP or its subsystems; and execute a generator engine to generate the DE document file from the selected DE document template, utilizing the retrieved system data or metadata.

In some related embodiments, a computer-implemented method for generating a digital engineering (DE) document file is provided. The method comprises retrieving one or more DE document templates from a DE document template library comprising DE document templates for one or more phases of a DE product life cycle; receiving a first user input from a first user; determining a selected DE document template from the one or more DE document templates based on the first user input; receive system data or metadata from the IDEP or its subsystems; and executing a generator engine to generate the DE document file from the selected DE document template, utilizing the retrieved system data or metadata.

In some embodiments, the non-transitory physical storage medium further comprises program code to receive a second user input related to approval and/or feedback data on the DE document file during the digital engineering phases of the digital engineering process, wherein the approval and/or feedback data comprises data related to an approval decision from a second user.

In some embodiments, the non-transitory physical storage medium further comprises program code to receive user feedback data on the DE document file, wherein the user feedback data comprises data related to user feedback on the DE document file; and update the DE document file to generate an updated DE document file, utilizing a document update engine (which is the generator engine in some embodiments), based on the user feedback data. In some embodiments, the non-transitory physical storage medium further comprises program code to train and/or fine-tune the document update engine on the user feedback data and the updated DE document file.

Digital Documentation System with Optional Recommender Engine

It is to be understood that the recommender engine is an optional feature of the present invention, and the system can be equally implemented without a recommender engine. In such embodiments, the user merely selects a desired template from the DE document template library.

Accordingly, in some embodiments, the non-transitory physical storage medium further comprises program code to execute a recommender engine to recommend one or more recommended DE document templates from the one or more DE document templates. The one or more recommended DE document templates comprise template data and/or metadata that match the first user input within a predetermined confidence level. The selected DE document template is selected from the one or more recommended DE document templates based on the first user input.

Digital Documentation System with Recommender Engine Only

In some embodiments, the digital documentation system does not provide a generator engine. Instead, the recommender engine recommends one or more templates to a user, and the user completes the template with data.

Accordingly, one embodiment of the present invention is a non-transitory physical storage medium that comprises program code to execute a recommender engine to recommend one or more recommended DE document templates from the one or more DE document templates. The one or more recommended DE document templates comprise template data and/or metadata that match the first user input within a predetermined confidence level. The selected DE document template is selected from the one or more recommended DE document templates based on the first user input. The program code further comprises code to receive user input to populate the selected DE document template with data.

Digital Documentation System without Templates

As discussed, some embodiments of the present invention utilize templates from a DE document template library, that are either selected by the user from the library or are selected from a recommended set of templates as recommended by the recommender engine. As discussed, a document template comprises a predetermined page and content layout, with optional style designations, and with designated sample data or data fields to be used as a guide. Templates could be created by a system administrator and/or by another authorized user. A document template may comprise one or more structured document parts having fillable data fields. Templates comprise one or more data fields that may be blank or have placeholder values. Templates also include example or prior documents with completed data fields that are updated or replaced when the example or prior document is used as a starting template for a new document. Templates also include blank or partially filled in documents that serve as starting templates for new documents. Therefore, the term "template" also includes document examples. Indeed, in some of the methods and systems described herein, a template may be defined as any reference starting-point document with a similar structure (e.g., data fields). Therefore, the terms "document template," "template," "example document," "prior example," and "blank document" may be used interchangeably herein, as the context requires.

It is to be understood that the use of templates is an optional feature of the present invention, and the system may be implemented without explicit use of templates. In other alternative embodiments of the present invention, no explicit templates are provided by the digital documentation system, and the document is generated by the generator engine without an explicit template. In such an embodiment, templates and their associated data and structure may be understood to be implicit in the training data set for the generator engine.

For example, in one non-limiting illustrative embodiment of the invention without the use of an explicit starting template document, the generator engine may comprise a generative-AI based engine, such as but not limited to, a Large Language Model (LLM).

For example, the generator engine may comprise a LLM that is fine-tuned using an ontology of certification or documentation requirements, that generates and/or updates the DE document file based on the user input and system data (model data from a model splice, including model parameters or metadata, other system data, etc.) to generate and/or update data fields in the DE document file.

As another example, the generator engine may comprise a LLM that is fine-tuned using platform metadata for model splice creation, which links machine-readable system data into human-readable documentation.

Accordingly, in one embodiment of the present invention, a non-transitory physical storage medium storing program code, the program code executable by a hardware processor, the hardware processor when executing the program code causing the hardware processor to execute a computer-implemented process for generating a digital engineering (DE) document file, is provided. The program code comprises code to receive a user prompt; retrieve system data from the IDEP, its subsystems, or components (including model data from a model splice, and metadata from said IDEP and its subsystems); and execute a generator engine (e.g., generative-AI-based, transformer-based, and/or LLM-based model) to generate the DE document file utilizing the system data and the user prompt.

In some embodiments, the generator engine is trained and/or fine-tuned based on metrics from user feedback data. Accordingly, in some embodiments, the non-transitory physical storage medium further comprises program code to receive user feedback data related to the DE document file generated by the generator engine from the user; generate feedback metrics related to a quality of the DE document file generated by the generator engine; and train and/or fine-tune the generator engine utilizing the feedback metrics to improve future DE document files generated by the generator engine.

In some embodiments, the generator engine is trained/fine-tuned based on document edits. Accordingly, in some embodiments, the non-transitory physical storage medium further comprises program code to generate training data comprising DE document files from the generator engine and document edits made to the DE document file by the user; and train and/or fine-tune the generator engine on the training data.

Digital Documentation System with Recommender-Generator Engine

In some embodiments, a single software engine is used to implement the functionalities of both the recommender and the generator engines. Such a software engine may be termed a "recommender-generator" engine. Two illustrative recommender-generator engines are discussed here, and the recommender-generator examples shown are to be considered illustrative and not restrictive of the scope of the invention.

In one illustrative recommender-generator embodiment, the recommender-generator engine receives as input a user prompt and a DE document template library. As an output, the recommender-generator engine may output one or more completed DE document files. In such an embodiment, the user may select one or more of the completed DE document files instead of selecting one or more recommended templates.

The recommender-generator engine may be based on a single ML model (e.g., an LLM) that is trained using a training dataset including sample user prompts and corresponding sample completed documents. In one embodiment, the sample user prompts and corresponding sample completed documents are selected from IDEP system data including previous user interactions and previously generated DE documents. On another embodiment, the ML model also receives access to a library of DE document templates. In that embodiment, the ML model training input dataset includes triples of associated sample user prompts, sample selected DE template documents, and sample completed DE documents. The recommender-generator engine may generate a predetermined number of completed DE documents for the user to choose from or merge. User interactions with the recommender-generator engine may be recorded by the IDEP and used for training or fine-tuning of the recommender-generator engine, as described below.

According to one embodiment of the present invention, a non-transitory physical storage medium storing program code, the program code executable by a hardware processor, the hardware processor when executing the program code causing the hardware processor to execute a computer-implemented process for generating a digital engineering (DE) document file, is provided. The program code comprises code to receive a user prompt. The program code further comprises code to execute a recommender-generator engine. The recommender-generator engine retrieves one or more DE document templates from a DE document template library comprising DE document templates for one or more phases of a DE product lifecycle; determines a selected DE document template from the one or more DE document templates; retrieves system data from the IDEP, its subsystems, or components (including model data from a model splice, and metadata from said IDEP and its subsystems); and generates the DE document file from the selected DE document template, utilizing the retrieved system data and the user prompt.

In a second illustrative recommender-generator embodiment, one software engine is used to implement the functionalities of both recommending templates and generating documents. In one such embodiment, the recommender-generator engine is considered a recommender engine when it is executing the functions of a recommender engine as described herein, and is considered a generator engine when it is executing the functions of a generator engine as described herein.

Fully Programmatic Digital Documentation System

Some illustrative embodiments were provided having one or more Graphical User Interfaces (GUIs) for user input from one or more users. However, it is understood that the present invention may be equally implemented without GUIs and without any user input. Such an embodiment would enable "fully programmatic" digital documentation to be implemented within the IDEP.

Once the ML models within the digital documentation system have been sufficiently trained on prior documents, prior user template selections, prior user document edits, prior user document approvals, and so forth, the digital documentation system can generate the documentation, comprising one or more digital document files, automatically as engineers focus on design and engineering work with potentially no user input. In such an embodiment, the template recommended by the recommender engine is the correct one for the context of the user, and no user selection of templates is required. The data populated into the digital document file are the correct ones, and no user modification or data input is required.

There are two alternative embodiments of the digital documentation system without user input. One embodiment comprises a recommender and a generator engine using a template library. Another embodiment comprises a transformer-based (or equivalent) generator engine that generates document files implicitly from templates and sample documents in its training data. In both embodiments, no user input is required, and the digital documentation system generates a full digital documentation (comprising one or more document files), triggered either by a user request (which can be known as "one click digital documentation") or programmatically by a software trigger or API call from another part of the IDEP system. The user request is distinct from the user input described elsewhere in this disclosure as it carries no information on the required DE documentation, apart from the context of the request. In both alternative embodiments, the generator and/or recommender ML models are trained on IDEP system data including user interactions, prior generated DE documents, etc., as further detailed in the current disclosure.

According to one embodiment of the present invention, a non-transitory physical storage medium storing program code, the program code executable by a hardware processor, the hardware processor when executing the program code causing the hardware processor to execute a computer-implemented process for generating a digital engineering (DE) document file, is provided. The program code comprises code to retrieve one or more DE document templates from a DE document template library comprising DE document templates for one or more phases of a DE product lifecycle; determine a selected DE document template from the one or more DE document templates; retrieve system data from the IDEP, its subsystems, or components (including model data from a model splice, and metadata from said IDEP and its subsystems); and execute a generator engine to generate the DE document file from the selected DE document template, utilizing the retrieved system data.

Digital Documentation Management and Control System

Several illustrative embodiments were provided of the digital documentation management and control system. Embodiments of the present invention include a digital document management system that is used with or without the document generation system. For example, embodiments of the present invention also includes managing and controlling document access, audit, review/approval, and retention for documents generated outside of the digital documentation system, for documents generated by human users, and for documents generated by AI agents in other systems. Such documents may be imported into the digital document management system as described herein, edited, sent for review and approval, and accessed from within the IDEP system. Furthermore, the various capabilities described here, for example, AI-assisted document recommendation, generation, and update, may be used to recommend and/or update documents imported into the system.

In short, the document management system enables the secure storage, access, modification, tracking, auditing, and review/approval decisions to be tracked for documents within the IDEP platform, whether the documents are generated within or outside the IDEP platform, and whether the documents are generated with or without the assistance of AI as described herein.

Detailed Process Flows for Recommender and Generator Engines

FIG. 21 shows a detailed process flow illustrating a recommender machine learning (ML) module using content and collaboration filtering, in accordance with the examples disclosed herein. In particular, the embodiment of FIG. 21 includes a recommender engine using content and collaborative based filtering.

In a user input phase 2104 of the creation and update process, at step 2106, a user interacts with the system (e.g., the DE platform) and starts querying certain documents or compiling document sections.

In a system input phase 2108 of the creation and update process, at step 2110, a library of templates and prior document examples are tagged with certification metadata, specifying a document profile. In an alternative system input step 2112, the user is labeled with metadata such as "aircraft designer", "familiar 516C", etc., and other labels for making user comparisons. In some embodiments, both system input steps 2110 and 2112 may be applied. In other embodiments, the tagging and profile specification of step 2110 is repeated for each document the user interacts with. In some embodiments of step 2110, the data fields of prior documents are checked and cleared (i.e., made blank) if their data content is determined to be irrelevant or sensitive ahead of being added to the library. Such determination and clearing may be carried out by a ML model that was trained on sample documents and corresponding documents with cleared data fields.

In a recommendation engine phase 2114 of the creation and update process, content and collaborative based filtering are applied as fundamental steps of a recommender engine as follows. At step 2116, the recommender engine filters relevant documents based on the document profiles to generate a filtered set of documents. The recommender engine correlates the filtered documents to the user's profile. Therefore, in step 2116, the recommender receives and combines the system input of phase 2108 with the user input of phase 2104 in order to generate a set of filtered documents and generate and/or update user-document profile correlations.

At step 2118, the recommender engine assigns to the filtered documents a fitness metric associated with the user's past actions and the user's profile, where a document's fitness metric provides the likelihood that the document will be relevant to the user. In some embodiments, a fitness metric is assigned to each field in the metadata. An example fitness metric may be titled "relevance to a use-case". For a certification use-case, a fitness metric may be titled "relevance" and may be computed whether a data point is quantitative or qualitative (Boolean). In other examples, "relevance" may denote the probability that a quantified data point is the most important of the certification parameters.

At step 2120, the recommender engine recommends the document with the highest fitness metric for the current user from the filtered set derived in step 2116, thus forming a user-document pair.

At step 2122, the recommender engine evaluates and stores the action steps associated with the current user-document pair, such that it can be used to suggest documents to other users with similar fitness metrics. In various embodiments, an action log stores the user-document pair in terms of specific steps performed on the DE platform. In one embodiment, the user-document pair is logged as a (user ID, document ID) pair, along with relevant authorization and authentication metadata, the requested user action, and a time stamp.

At step 2124, the recommender engine updates the user-document pair's fitness metric by taking into account the number of other users who have performed similar tasks or compiled similar documents. The updated fitness metric is used as a likelihood that the recommended document is relevant to the current user task. For example, a Table of Contents template may have a 80% (high) fitness metric for use in a summary report.

At step 2126, in response to the user's final document selections, the recommender engine tags, compiles, and assesses the product for future document recommendations.

At step 2128, the recommender engine adds the user-document profile and fitness metrics to a database of past user/document comparison/metrics, then loops back (2130) to step 2122 for each new user-document pair.

The process shown in FIG. 21 may use one or more trained ML models for each of the steps within the recommendation engine phase 2114, including filtering, assessing the fitness metric, recommending, then assessing the output based on feedback. LLMs are suitable as base algorithms for the ML models used in the recommendation engine phase. Their training data sets are gathered from the system input 2108 phase at steps 2110 and 2112, and consist of a library of documents and templates, with their metadata, and a library of user profile metadata.

A transformer architecture, the basis for LLMs, allows context to be "in focus," meaning the system could leverage a transformer's or an LLM's ability to take in large quantities of contextual information, and then based on recommended templates, generate the necessary documentation. The documentation may then be reviewed and approved by the user.

The methods and systems described herein include the use of a recommender engine to recommend one or more DE document templates based on user input (e.g., a prompt) and/or an input DE document template from a DE document template library. The recommender engine may be configured based on a ML model that was trained to generate one or more recommended DE document templates, where the data and/or metadata within the one or more recommended DE document templates matches the user input or the input DE document template. The training data for such a ML-based recommender engine comprises a dataset of sample user inputs and corresponding sample recommended DE document templates. Alternatively, the training dataset may include sample input DE document templates and corresponding sample recommended DE document templates. In some embodiments, the training data comprises a dataset of user profile metadata and corresponding sample recommended DE document templates.

Training, fine-tuning, testing, and validation datasets (see FIG. 29) may be gathered on the IDEP from a history of user inputs and corresponding user-selected DE templates. In the context of the recommender engine described in FIG. 25, the collection of such data may be carried out at step 2126 or form the database described in step 2128. Alternatively, training datasets may be gathered on the IDEP from the history of user inputs and corresponding finalized DE document files, or from a history of input DE document templates and corresponding finalized DE document files.

As the IDEP databases containing user inputs, input DE document templates, and associated user-selected DE document files and finalized DE document files grow, specific input-output sample pairs may be selected for ML fine-tuning purposes. To train an ML-based recommender engine to make more accurate recommendations regarding documents of a particular type (e.g., certification, requirements, product part descriptions, etc.), the IDEP may be used to identify a particular input-output category to serve as a fine-tuning dataset. For example, sample pairs of user prompts requesting a certification document, and corresponding generated certification documents, may be gathered by the IDEP in order to fine-tune a ML-based recommender engine to be used to recommend certification documentation.

Similar approaches may be used for training ML-based generator engines to generate DE document files from DE document templates. Furthermore, the IDEP may receive user feedback data related to a DE document file generated by an ML-based generator engine. Such feedback may be actively gathered from users (e.g., the IDEP may request user feedback on a generated DE document). Alternatively, it may be inferred from user actions (e.g., the use or reuse of a generated DE document). The IDEP may also generate feedback metrics related to a quality of the DE document file generated by the generator engine. For example, the IDEP may compare the difference between ML-generated DE document files and user-finalized document files. Such feedback metrics may be used to generate fine-tuning datasets to further improve generator engine performance, in a manner analogous to recommender engines.

A dataset including sample DE document files generated by a generator engine, paired with corresponding sample document edits made to the DE document files by users, may be particularly important for training and fine-tuning purposes. The IDEP may be configured to save user-made modifications to generated DE document files for training purposes, following the methods described herein. FIGS. 28-29 describe the training and fine-tuning of some illustrative ML models that may be used to implement the recommender and generator engines.

FIG. 22 shows a detailed process flow illustrating a recommender engine based on a Markov Chain Monte Carlo (MCMC) algorithm, in accordance with examples disclosed herein. The MCMC recommender engine embodiment of FIG. 22 is based on stochastic processing, thus relying on the frequency and sensitivity of specific outcomes.

If the starting DE document template is structured in a fashion where predetermined sentences have blanks with a label specifying the kind of fill-in data necessary to complete it, then it is possible to generate a complete DE document based on several filled-in DE document templates. This scenario may lend itself to a Markov Decision Process (MDP) or other Markov process, where the likelihood of a particular labeled "blank" (i.e., blank data field) taking a particular set of values (or sentences) is based purely on how this area of documentation was previously established. While this approach may be less adaptable than the above transformer-based approach, narrowing its ability to produce "contextually correct" documentation, it offers the ability to recommend templates in very specific areas of documentation with a predetermined likelihood. FIG. 22 describes such a probabilistic embodiment for the recommender engine.

The embodiment of FIG. 22 is a process where steps are divided into two major phases: a user input phase 2204 and a Markov Chain recommender engine phase 2226. In the user input 2204 phase of the creation and update process, at step 2206, a user specifies one or more constraints within a larger document. At step 2208, the user selects documentation requirements such as "516C Air Worthiness", "Design Review", etc. In an alternative user input step 2210, the user inputs specific constraints (e.g., "single engine", "fixed wing", "2,000 lbs.", etc.). In some embodiments, both system input steps 2208 and 2210 may be applied.

In the Markov Chain Monte Carlo 2226 phase of the creation and update process, at step 2212, the process determines a state space including a set of several matching documents based on the documentation reference. At step 2214, the process determines the relevance score and acceptance criteria for each document. In this step, the user defines one or more selection criteria and assigns prioritization based on each document's metadata, where a higher relevance indicates a higher selection probability for any given document.

At step 2216, the process determines a proposal distribution. In this step, the process makes a random selection of documents from the library, based on a probability distribution. For example, the probability can be proportional to each document's relevance score.

At step 2218, the process initializes the Markov chain. In this step, the Monte Carlo algorithm is started by selecting an initial state randomly from the determined State space. At step 2220, the Markov chain is iterated by first picking at random a new state from the proposal distribution. For each randomly generated document set, the algorithm evaluates selection probabilities and accepts or rejects documents based on acceptance criteria. At step 2222, the algorithm monitors the chain and verifies whether probabilities converge. The algorithm iterates between steps 2220 and 2222 until probabilities converge. At step 2224, the process selects the final state based on the highest relevance score, which represents the most relevant set of documents that meet the required criteria.

Finally, at step 2228, the process returns the selected set of documents as final output of the algorithm.

FIGS. 23 and 24 show a detailed process flow for document creation using a generative AI-assisted approach (i.e., a generator engine based on generative AI), in accordance with the examples disclosed herein. FIG. 23 shows the process flowchart whereas FIG. 24 describes LLM fine-tuning, in accordance with the examples disclosed herein. For instance, a user may upload a requirements model of an engine and a CAD model design of the engine, then request a summary document report detailing whether the CAD model parameters meet the specific requirements of the uploaded model. The generation engine described in FIG. 23 and FIG. 24 may utilize the input DE model data and prepare the document, as described below.

In reference to FIG. 23, the document creation and update process starts with a first user input phase 2304 where, at step 2306, a user provides a text input conveying their objective for use with the interconnected digital engineering and certification ecosystem.

At step 2308, the user may select specific purposes for documentation (as part of an overall certification or validation). Alternatively, at step 2310, the user may input specific product design, update, or requirement constraints (e.g., "single engine", "fixed wing", "2,000 lbs.", etc.). At step 2312, the user may select a pre-trained LLM (e.g., GPT-3 DaVinci model) for baseline document generation/update. In another embodiment, the system selects an adequate LLM based on user-document profile data.

At step 2316, baseline metadata is collected from the user, comprising ontology of requirements, with associated hierarchies, for certification or other documentation purposes. For example, such baseline metadata may include the requirements specified for Major capability acquisition (MCA) or 516c airworthiness requirements, etc.

In an AI-assisted phase 2318 of the process where the document is created and/or updated, at step 2320, a training set is prepared manually. At step 2320, synthetic data is added to the training set. LLMs are well suited for implementing this step, where training data includes prior document examples for which metadata can be further added using an external expert user. Alternatively, synthetic data can be generated using random perturbation on an already accepted data element (e.g., data field in a document), then introduced in the training data by a subject matter expert.

An LLM fine-tuning step 2326 is then carried out, including the fine-tuning of the LLM using prompt-response pairs 2328 (e.g., from a database of examples), leading to the development of a custom fine-tuned LLM that is targeted to the documentation process 2330.

An example of a prompt-response pair is provided below:
Prompt: I want to build a fixed wing airplane, with 2000 lbs. weight and using gas turbine engines. I need to demonstrate the safety of my engines.
Response: In 516c, Chapter 7 for propulsion system safety, the requirements are: JSSG-2007: A.3.1, A.4.1; A.3.2, A.4.2; A.3.2.1, A.4.2.1; A.3.3.1, A.4.3.1; A.3.3.2, A.4.3.2; A3.4, A.4.4; A.3.5.1, A.4.5.1; A.3.7, A.4.7; A.3.7.2.1, A.4.7.2.1; A.3.11, A.4.11; A.3.12, A.4.12; Table XLIXa USAF PCoE BP 99-06D 14 CFR 33.5, 33.35, 33.7, 33.75, 33.8 FAA AC 33-2
See FIG. 24 for more detail on the LLM fine-tuning process 2324.

At step 2332, the custom fine-tuned LLM is utilized to recommend text additions to a document or a template. At step 2334, FIG. 23 illustrates the use of reinforcement learning from human feedback (RLHF) to loop back to step 2332, whereby the user selects or rejects the recommended text. LLM fine-tuning using fine-tuning data sets, as described below, may also be used. The system loops to step 2332 as long as new document additions are requested or as long as fine-tuning has not reached a pre-specified level of accuracy.

Note that the LLM in step 2332 will utilize the user input as context to differentiate between a document update and a document creation. Document updating differs from new document generation in the data fields or document parts that require generation or modification. A user may prompt a ML model (e.g., LLM) to modify specific data fields or document parts within a particular document. Alternatively, an ML model (e.g., LLM) may identify the data fields and document parts to be modified after being trained on a dataset of sample unmodified and modified document pairs. If the IDEP detects an anomaly within the values for certification after passing updated "requirements", then the parts of the document to be updated can be determined and highlighted by a ML model (e.g., LLM) using the user input.

FIG. 24 provides more detail on the LLM fine-tuning process 2324, according to embodiments of the present invention. In particular, FIG. 24 shows an architecture for fine-tuning an LLM for document creation and/or updating by a user 2418.

In the embodiment of FIG. 24, the fine-tuning architecture 2326 revolves around the maintenance of a database 2408 containing fine-tuning datasets that were obtained from multiple fine-tuned LLMs 2406, each targeting a different DE application (e.g., certification, documentation, etc.). The maintenance of the fine-tuning database 2408 may be carried out as follows:

The fine-tuned datasets 2408 are fed to a backend of LLMs 2410 (e.g., LLMs that are currently in use by the DE platform) in order to generate corresponding tags. The generated tags are stored in a tags database 2422, where the tags may utilize updated metadata 2424 gathered from the DE platform. The fine-tuning database 2408 and the tags database 2422 may be implemented as an Azure Database for MongoDB Servers.

The stored fine-tuning datasets 2408 and tags 2422 are extracted by a cross-platform fine-tuning frontend 2416 through read-only access 2420 to the DE platform. The cross-platform fine-tuning frontend 2416 combines the extracted fine-tuning datasets and tags (e.g., using PyQt) to generate new or updated fine-tuning datasets, consisting of new documentation examples 2414.

The updated fine-tuning datasets 2414 may be reviewed by a subject matter expert (SME) 2412 before being restored to the fine-tuning database 2408 following CRUD (create, read, update, and delete) persistent storage practices.

Based on the use of platform data, this architecture may be reused on separate fine-tuning datasets to train and create a library of fine-tuned LLMs, each customized to specific AI-assistance use cases (e.g., different types of documentation, model sharing), or targeted to a different DE software or tool.

In various embodiments, during LLM training and/or fine-tuning:
1. Training data may include previously generated and modified documents, as well as document creation/modification history for different user profiles.
2. Synthetic data creation may follow a rule-based approach for permutations on existing data, using an abstract syntax tree for variants, where a compiler is used to verify success.
3. Prompt-response pairs for fine-tuning the LLM may be increased through permutations following an abstract syntax tree.
4. System architecture may be reused to train and create a library of fine-tuned LLMs, each customized to a specific AI-assistance use case (e.g., documentation types, model sharing).

Furthermore, training data examples may include any of the following:
1. Tool-specific and platform documentation, such as API reference guides, user guides, and tutorials.
2. Technical articles and blog posts, specifically discussing digital engineering operations.
3. Online forums (e.g., Stack Overflow) and other Q&A threads.
    a. The training dataset would include stack overflow and other Q&A threads that discuss digital engineering documentation.
4. Publicly available documents, such as DE tool and API descriptions and other information that can be gathered from publicly available sources.

In some embodiments, synthetic data generation may rely on:
1. Abstract syntax tree—customized for specific digital engineering applications.
2. Selectively run permutations on training data.
3. Test for compile, then recommend adding to synthetic data.
4. Expert feedback.

FIG. 25 shows a detailed process flow for a generator engine using a specified domain-specific language (DSL) and a set of rules generated with expert input, in accordance with the examples disclosed herein.

A Domain Specific Language (DSL) is a programming language or specification language dedicated to a particular problem domain, a particular problem representation technique, and/or a particular solution technique.

In a user input 2504 phase of the creation and update process, at step 2506, a user identifies a target parser and language for DSL development. At step 2508, the user selects a parser and writes one or more rules for DSL (Example: ANTLR4 to specify language specifics, tokenizing elements of document specification). In an alternative user input step 2510, target language functions specify how to make matches between input specs and corresponding document sections.

In a DSL operation 2512 phase of the creation and update process, at step 2514, the user writes rules within DSL to specify how to compile a new document. At step 2516, the process systematically searches existing document(s) in the document library for chunks or elements that match the user-written rules. At step 2518, document generating/compiling code is generated by the DSL based on the rules to comprehensively present documents. At step 2520, a document result is generated using the generated code snippets.

Although FIG. 25 illustrates a DSL-enabled generator engine that is an alternative to the generator ML, the generator engine of FIG. 25 may be used in conjunction with an AI-based generator ML. For example, a DSL-based generator engine may be used to generate training, fine-tuning, or validation datasets for an AI-based generator ML.

Generally, a DSL-based generator engine being memoryless, it may not benefit from the context available to a ML-based or transformer-based generator engine. However, a ruleset for the "types" of DE document templates in a DE template database may be provided. Based on the template data fields to be filled, rules may be provided to traverse a data-field tree and assign values or labels as the tree is built out and subsequently traversed. This results in a dynamic tree approach, where rules are dependent on the needs of the DE document to be generated.

If a user defines the documentation as "certification requirements", a certain number of values are needed to specify safety margins. The tree may incorporate not only relevant DE templates, but also rules the user selects to define which templates may be relevant. The system can then pick from buckets of similarly labeled data to assign other rules to matching templates, as more information is filled in, automatically materializing the DE document to be generated.

DE Model-to-Document Linking for New Document Generation

FIG. 26 shows an illustrative flow chart for AI-assisted document generation via model-to-document linking within a digital engineering (DE) platform, according to some embodiments of the present invention. In the embodiment of FIG. 26, the generator engine is a generative-AI based algorithm (e.g., LLM).

In relation to FIG. 26, a human-readable document (e.g., a design summary written in natural language) may be generated from one or more machine-readable DE models via model-to-document linking, with the assistance of a natural-language-processing AI module. For example, a Computer Aided Design (CAD) file of an airline seat design may be used to generate a design brief or a summary document describing different aspects of the airline seat design. This allows a human to easily understand the design without needing to interpret the CAD file directly, a significant advantage over the typical scenario where SMEs manually generate or type up documents from model files. Once the new document is created, it may be updated automatically and dynamically based on revisions to the linked DE model.

In this example, the following process steps are carried out:

LLM Training Fine-Tuning (2610): an AI model such as a Systems Reference Documents (SRD) LLM (or LLM-SRD) may be trained based on few-shot learning of a generic LLM such as GPT4, LLAMA2, and/or MISTRAL, and fine-tuned on examples of Systems Reference Documents (SRDs). The following is an exemplary process for training and fine-tuning a LLaMa model (LLaMa-SRD) for document generation from Systems Reference Documents (SRDs).

1. Model and Tokenizer Initialization:
   In this exemplary implementation, the LLaMa model and tokenizer are initialized using the Hugging Face transformers library, which is a crucial step for both text generation and embedding extraction:

```
from transformers import LlamaForCausalLM, LlamaTokenizer
import torch
BASE_MODEL = "decapoda-research/llama-7b-hf"
model = LlamaForCausalLM.from_pretrained(
    BASE_MODEL,
    load_in_8bit=True,
    torch_dtype=torch.float16,
    device_map="auto",
)
tokenizer = LlamaTokenizer.from_pretrained(BASE_MODEL)
tokenizer.pad_token_id = 0 # Set to unk. Different from the eos token
tokenizer.padding_side = "left"
```

2. Embedding Generation:
   For embedding generation, the document is prepared using the hidden states of the LLaMa model. This process converts the text into a suitable format and extracts meaningful numerical representations:

```
document = "The system shall have a user-friendly interface that allows ..."
# Tokenize the document
inputs = tokenizer(document, return_tensors="pt", truncation=True, max_length=512)
# Disable gradient calculations
with torch.no_grad( ):
    # Get model outputs, including hidden states
    outputs = model(** inputs, output_hidden_states=True)
    hidden_states = outputs.hidden_states
# Select a specific layer for embeddings (e.g., the last layer)
embeddings = hidden_states[-1].mean(dim=1)
print(embeddings)
```

3. Fine-Tuning the LLaMa Model:
   In this example implementation, for fine-tuning, the model is adapted to better align with SRD language and structure. This is an iterative process that involves adjusting the model's parameters based on a set of training examples:

```
# Simplified illustrative fine-tuning code
# Assume a fine-tuning function exists for illustration purposes
fine_tune_llama(model, training_data)
```

Model Splicing (2620, 2630): an input DE model (e.g., SysML model) is spliced, and resulting API endpoints may be accessed via product function API calls (e.g., export requirement parameters in the SysML model). The following are an exemplary JSON file and an exemplary API call:

Example JSON File:

```
{ "name": "Small Unmanned Drone", "requirements": {
"functional": [ { "id": "F1", "text": "The drone must
be able to fly autonomously." }, { "id": "F2",
"text": "The drone must be able to communicate with
a remote control or ground station." }, { "id":
"F3", "text": "The drone must be able to take high
resolution photographs and videos." }, { "id":
"F4", "text": "The drone must be able to detect and
avoid obstacles during flight." }, { "id": "F5",
"text": "The drone must be able to return to its
takeoff point in case of emergency or loss of
communication." } ],
"non-functional": [ { "id": "NF1", "text": "The drone
must have a flight time of at least 30 minutes."
}, { "id": "NF2", "text": "The drone must have a
maximum takeoff weight of less than 2 kg." }, {
"id": "NF3", "text": "The drone must be able to
operate in temperatures between −10°C and 40°C."
}, { "id": "NF4", "text": "The drone must be able to
withstand winds of up to 15 m/s." } ] } }
```

Example API Call:

GET api(dot)istari(dot)ai Headers: Content-Type: application/json Authorization: Bearer YOUR_API_TOKEN Body: {"sysml_file": "Cameo_SYSML.xml", "requirements": ["flight stability", "communication range", "battery life"], "export_format": "json"}a Outline Generation via LLM (2640): the API response may be added to a prompt for generating an outline of a System Requirements Document. In the example shown in FIG. 26, functional and non-functional requirements are separated into different sections by the LLM. The following are an exemplary LLM prompt and an exemplary response:

Example LLM Prompt:

```
draft the outline of a System Requirements Document,
using the following information about the
requirements for a small unmanned drone: { "name":
"Small Unmanned Drone", "requirements":
{ "functional": [ { "id": "F1", "text": "The drone must
be able to fly autonomously." }, { "id": "F2",
"text": "The drone must be able to communicate with
a remote control or ground station." }, { "id":
"F3", "text": "The drone must be able to take high
resolution photographs and videos." }, { "id":
"F4", "text": "The drone must be able to detect and
avoid obstacles during flight." }, { "id": "F5",
"text": "The drone must be able to return to its takeoff
point in case of emergency or loss of
communication." } ], "non-functional": [ { "id":
"NF1", "text": "The drone must have a flight time
of at least 30 minutes." }, { "id": "NF2", "text": "The
drone must have a maximum takeoff weight
of less than 2 kg." }, { "id": "NF3", "text": "The
drone must be able to operate in temperatures
between −10°C and 40°C." }, { "id": "NF4", "text":
"The drone must be able to withstand winds of
up to 15 m/s." } ] } }
```

Example LLM Response:

Introduction Purpose of the document Overview of the Small Unmanned Drone project Functional Requirements F1: The drone must be able to fly autonomously F2: The drone must be able to communicate with a remote control or ground station F3: The drone must be able to take high resolution photographs and videos F4: The drone must be able to detect and avoid obstacles during flight F5: The drone must be able to return to its takeoff point in case of emergency or loss of communication Non-Functional Requirements NF1: The drone must have a flight time of at least 30 minutes NF2: The drone must have a maximum takeoff weight of less than 2 kg NF3: The drone must be able to operate in temperatures between −10° C. and 40° C. NF4: The drone must be able to withstand winds of up to 15 m/s Assumptions and Constraints Any assumptions and constraints related to the requirements Appendices Any additional information or documentation related to the requirements (e.g. technical specifications, diagrams, etc.)

Document Part Generation via LLM (2650, 2660): the LLM-SRC fine-tuned in 2610 may be prompted on a per-document-part basis, one section of the outline at a time, until all parts of the document have been drafted. A motivation behind this progressive approach is that LLMs typically have token limits on their input sequences, and prompt generation needs to take this limitation into account, but aggregating only subsets of DE model data that are relevant to a single document part. The following are an exemplary LLM prompt and response:

Example LLM Prompt:

Write 300 words for the first part of section 2.

Example LLM Response:

Functional Requirements Section 2: Functional Requirements The Small Unmanned Drone must meet a set of functional requirements in order to successfully perform its intended purpose. The following is a detailed description of each functional requirement. F1: The drone must be able to fly autonomously. This requirement is crucial for the drone to be able to perform its intended tasks without the need for constant human supervision. The drone must be able to navigate, maintain altitude, and make decisions based on pre-programmed instructions or real-time data. This functionality allows the drone to perform tasks such as surveying, monitoring, and mapping. F2: The drone must be able to . . . .

F5: The drone must be able to return to its takeoff point in case of emergency or loss of communication. This requirement is necessary for the drone to ensure the safety of its operation. The drone must have a built-in fail-safe mechanism that enables it to return to its takeoff point or a predetermined location in case of an emergency or loss of communication. This functionality ensures that the drone can be recovered even in the event of a failure.

Document Compilation (2670): all parts are compiled into a complete draft.

Machine Learning (ML) and Neural Networks

Machine learning (ML) algorithms are characterized by the ability to improve their performance at a task over time without being explicitly programmed with the rules to perform that task (i.e., learn). A machine learning (ML) model is the output generated when a ML algorithm is trained on data. As described herein, embodiments of the present invention use one or more artificial intelligence (AI) and machine learning (ML) algorithms to perform template recommendation, document updating, and/or document generation. Various exemplary ML algorithms are within the scope of the present invention. The following description describes illustrative ML techniques for implementing various embodiments of the present invention.

Neural Networks

A neural network is a computational model comprising interconnected units called "neurons" that work together to process information. It is a type of ML algorithm that is particularly effective for recognizing patterns and making predictions based on complex data. Neural networks are widely used in various applications such as image and speech recognition and natural language processing, due to their ability to learn from large amounts of data and improve their performance over time. FIG. 27 describes neural network operation fundamentals, according to exemplary embodiments of the present invention.

FIG. 27 shows a single-layered neural network, also known as a single-layer perceptron. The operation of a single-layered neural network involves the following steps:

1. Input: Receiving a DE input vector v 2704 with elements $v_j$, with $j \in [1,n]$ representing the $j^{th}$ DE input, and where each element of the vector corresponds to an element 2706 in the input layer. For an exemplary neural network model (e.g., to implement a recommender engine) trained to determine whether a target template is to be recommended based on user input, the DE input vector v 2704 may take the form of a user prompt. A DE input can be a user prompt, a DE document, a DE model, DE program code, system data from the IDEP, and/or any useful form of data in digital engineering.
2. Transfer Function: Multiplying each element of the DE input vector by a corresponding weight $w_j$ 2708. These weighted inputs are then summed together as the transfer function, yielding the net input to the activation function $\Sigma_{j=1}^{n} = v_j \cdot w_j$ 2710.

Each neuron in a neural network may have a bias value 2712, which is added to the weighted sum of the inputs to that neuron. Both the weights and bias values are learned during the training process. The purpose of the bias is to provide every neuron with a trainable constant value that can help the model fit the data better. With biases, the net input to the activation function is $\Sigma_{j=1}^{n} \{v_1 \cdot w_1\} + b$.

In the exemplary neural network model described above (e.g., to implement a recommender engine), the value of the transfer function 2710 may represent the probability that the target template will be recommended.
3. Activation Function: Passing the net input through an activation function 2714. The activation function a determines the activation value o 2718, which is the output of the neuron. It is typically a non-linear function such as a sigmoid or ReLU (Rectified Linear Unit) function. The threshold θ 2716 of the activation function is a value that determines whether a neuron is activated or not. In some activation functions, such as the step function, the threshold is a specific value. If the net input is above the threshold, the neuron outputs a constant value, and if it's below the threshold, it outputs a zero value. In other activation functions, such as the sigmoid or ReLU (Rectified Linear Unit) functions, the threshold is not a specific value but rather a point of transition in the function's curve.

In the exemplary neural network model described above (e.g., to implement a recommender engine), the activation function a 2714 may be a ReLU that is activated at a threshold θ 2716 representing the minimum probability for the target template to be recommended. Hence, the activation function 2714 will yield a positive recommendation when the recommendation likelihood exceeds the threshold θ 2716.
4. Output: The activation value o 2718 is the output of the activation function. This value is what gets passed on to the next layer in the network or becomes the final DE output in the case of the last layer. In the exemplary neural network model described above (e.g., to implement a recommender engine), the activation value o 2718 is a DE output that is a Boolean or binary parameter taking a positive value when the target template is to be recommended and a negative value otherwise. A DE output can be a DE document, a DE model, DE program code, or any useful form of data in digital engineering.

In the exemplary neural network discussions of FIG. 27, examples are provided with respect to a particular recommender engine implementation using neural networks. Analogous approaches can be used to implement the generator engine and any other NN-based components of the systems and subsystems described herein.

FIG. 28 shows an overview of an IDEP neural network training process, according to exemplary embodiments of the present invention.

The training of the IDEP neural network involves repeatedly updating the weights and biases 2810 of the network to minimize the difference between the predicted output 2804 and the true or target output 2806, where the predicted output 2804 is the result produced by the network when a set of inputs from a dataset is passed through it. The predicted output 2804 of an IDEP neural network 2802 corresponds to the DE output 2718 of the final layer of the neural network. The true or target output 2806 is the true desired result. The difference between the predicted output and the true output is calculated using a loss function 2808, which quantifies the error made by the network in its predictions.

The loss function is a part of the cost function 2808, which is a measure of how well the network is performing over the whole dataset. The goal of training is to minimize the cost function 2808. This is achieved by iteratively adjusting the weights and biases 2810 of the network in the direction that leads to the steepest descent in the cost function. The size of these adjustments is determined by the learning rate 2808, a hyperparameter that controls how much the weights and biases change in each iteration. A smaller learning rate means smaller changes and a slower convergence towards the minimum of the cost function, while a larger learning rate means larger changes and a faster convergence, but with the risk of overshooting the minimum.

For an IDEP neural network model 2802 based on the exemplary neural network model (e.g., to implement a recommender engine) discussed above in the context of FIG. 27, and trained to determine whether a target template is to be recommended based on user instructions:

the weights and biases 2810 are the IDEP neural network's hyperparameters that get updated at each iteration of the training process, as discussed in the context of FIG. 27, the predicted output 2804 is the binary prediction on whether the target template is to be recommended based on a sample user prompt, (or a normalized score ranking prioritizing the order of templates to be displayed to the user), the true/target output 2806 is the correct decision (i.e., sample ground truth output) on whether to recommend the target data based on the sample user prompt, the loss function 2808 is the difference between the evaluation and the true output (e.g., a binary error indicating whether the IDEP neural network's decision was correct), the cost function 2808 is the average of all errors over a training dataset including sample user prompts and corresponding binary recommendations on the target template, and the learning rate 2808 is the rate at which the cost function 2808 in consecutive training epochs approaches a pre-specified tolerable cost function.

Neural network training combines the processes of forward propagation and backpropagation. Forward propagation is the process where the input data is passed through the network from the input layer to the output layer. During forward propagation, the weights and biases of the network are used to calculate the output for a given input. Backpropagation, on the other hand, is the process used to update the weights and biases 2810 of the network based on the error (e.g., cost function) 2808 of the output. After forward propagation through the IDEP neural network 2802, the output 2804 of the network is compared with true output 2806, and the error 2808 is calculated. This error is then propagated back through the network, starting from the output layer and moving towards the input layer. The weights and biases 2810 are adjusted in a way that minimizes this error. This process is repeated for multiple iterations or epochs until the network is able to make accurate predictions.

The neural network training method described above, in which the network is trained on a labeled dataset (e.g., sample pairs of input user prompts and corresponding output recommendations), where the true outputs are known, is called supervised learning. In unsupervised learning, the network is trained on an unlabeled dataset, and the goal is to discover hidden patterns or structures in the data. The network is not provided with the true outputs, and the training is based on the intrinsic properties of the data. Furthermore, reinforcement learning is a type of learning where an agent learns to make decisions from the rewards or punishments it receives based on its actions. Although reinforcement learning does not typically rely on a pre-existing dataset, some forms of reinforcement learning can use a database of past actions, states, and rewards during the learning process. Any neural network training method that uses a labeled dataset is within the scope of the methods and systems described herein, as is clear from the overview below.

FIG. 29 provides additional details on the training process or an IDEP machine learning model, according to exemplary embodiments of the present invention.

Transformer Model Architecture

The transformer architecture is a neural network design that was introduced in the paper "*Attention is All You Need*" by Vaswani et al. published in June 2017 (available at arxiv(dot)org), and incorporated herein by reference as if fully set forth herein. Large Language Models (LLMs) heavily rely on the transformer architecture.

The architecture (see FIG. 1 of Vaswani et al.) is based on the concept of "attention", allowing the model to focus on different parts of the input sequence when producing an output. Transformers consist of an encoder and a decoder. The encoder processes the input data and the decoder generates the output. Each of these components is made up of multiple layers of self-attention and point-wise, fully connected layers.

The layers of self-attention in the transformer model allow it to weigh the relevance of different parts of the input sequence when generating an output, thereby enabling it to capture long-range dependencies in the data. On the other hand, the fully connected layers are used for transforming the output of the self-attention layers, adding complexity and depth to the model's learning capability.

The transformer model is known for its ability to handle long sequences of data, making it particularly effective for tasks such as machine translation and text summarization. In the transformer architecture, positional encoding is used to give the model information about the relative positions of the words in the input sequence. Since the model itself does not have any inherent sense of order or sequence, positional encoding is a way to inject some order information into the otherwise order-agnostic attention mechanism.

The Embeddings Vector Space

In the context of neural networks, tokenization refers to the process of converting the input and output spaces, such as natural language text or programming code, into discrete units or "tokens". This process allows the network to effectively process and understand the data, as it transforms complex structures into manageable, individual elements that the model can learn from and generate.

In the training of neural networks, embeddings serve as a form of distributed word representation that converts discrete categorical variables (i.e., tokens) into a continuous vector space (i.e., embedding vectors). This conversion process captures the semantic properties of tokens, enabling tokens with similar meanings to have similar embeddings. These embeddings provide a dense representation of tokens and their semantic relationships. Embeddings are typically represented as vectors, but may also be represented as matrices or tensors.

The input of a transformer typically requires conversion from an input space (e.g., the natural language token space) to an embeddings space. This process, referred to as "encoding", transforms discrete inputs (tokens) into continuous vector representations (embeddings). This conversion is a prerequisite for the transformer model to process the input data and understand the semantic relationships between tokens (e.g., words). Similarly, the output of a transformer typically requires conversion from the embeddings space to an output space (e.g., natural language tokens, programming code tokens, etc.), in a process referred to as "decoding". Therefore, the training of a neural network and its evaluation (i.e., its use upon deployment) both occur within the embeddings space.

In the remainder of this document, the processes of tokenization, encoding, decoding, and de-tokenization are assumed. In other words, the processes described below occur in the "embeddings space". Hence, while the tokenization and encoding of training data and input prompts may not be represented or discussed explicitly, they are implied. Similarly, the decoding and de-tokenization of neural network outputs are also implied.

Training and Fine-Tuning Machine Learning (ML) Modules

FIG. 29 is an illustrative flow diagram showing the different phases and datasets involved in training an IDEP machine learning model, according to exemplary embodiments of the present invention.

The training process starts at step 2910 with DE data acquisition, retrieval, assimilation, or generation. At step 2920, acquired DE data are pre-processed, or prepared. At step 2930, the DE ML model is trained using training data 2925. At step 2940, the DE ML model is evaluated, validated, and tested, and further refinements to the DE ML model are fed back into step 2930 for additional training. Once its performance is acceptable, at step 2950, optimal DE model parameters are selected.

Training data 2925 is a documented data set containing multiple instances of system inputs (e.g., user inputs, user prompts, database documents and/or templates, etc.) and correct outcomes (e.g., data field, document section, document, etc.). It trains the DE ML model to optimize the performance for a specific target task, such as the prediction of a specific target output data field within a specific target document. In FIG. 29, training data 2925 may also include subsets for validating and testing the DE ML model, as part of the training iterations 2930 and 2940. For an NN-based ML model, the quality of the output may depend on (a) NN architecture design and hyperparameter configurations, (b) NN coefficient or parameter optimization, and (c) quality of the training data set. These components may be refined and optimized using various methods. For example, training data 2825 may be expanded via a document database augmentation process.

In some embodiments, an additional fine-tuning 2960 phase including iterative fine-tuning 2960 and evaluation, validation, and testing 2970 steps, is carried out using fine-tuning data 2955. Fine-tuning in machine learning is a process that involves taking a selected 2950 pre-trained model and further adjusting or "tuning" its parameters to better suit a specific task or fine-tuning dataset 2955. This technique is particularly useful when dealing with deep learning models that have been trained on large, general training datasets 2925 and are intended to be applied to more specialized tasks or smaller datasets. The objective is to leverage the knowledge the model has already acquired during its initial training (often referred to as transfer learning) and refine it so that the model performs better on a more specific task at hand.

The fine-tuning process typically starts with a model that has already been trained on a large benchmark training dataset 2925, such as ImageNet for image recognition tasks. The model's existing weights, which have been learned from the original training, serve as the starting point. During fine-tuning, the model is trained further on a new fine-tuning dataset 2955, which may contain different classes or types of data than the original training set. This additional training phase allows the model to adjust its weights to better capture the characteristics of the new fine-tuning dataset 2955, thereby improving its performance on the specific task it is being fine-tuned for.

In some embodiments, additional test and validation 2980 phases are carried out using DE test and validation data 2975. Testing and validation of a ML model both refer to the process of evaluating the model's performance on a separate dataset 2975 that was not used during training, to ensure that it generalizes well to new unseen data. Validation of a ML model helps to prevent overfitting by ensuring that the model's performance generalizes beyond the training data.

While the validation phase is considered part of ML model development and may lead to further rounds of fine-tuning, the testing phase is the final evaluation of the model's performance after the model has been trained and validated. The testing phase provides an unbiased assessment of the final model's performance that reflects how well the model is expected to perform on unseen data, and is usually carried out after the model has been finalized to ensure the evaluation is unbiased.

Once the DE model is trained 2930, selected 2950, and optionally fine-tuned 2960 and validated/tested 2980, the process ends with the deployment 2990 of the DE model. Deployed IDEP ML models 2995 usually receive new DE data 2985 that was pre-processed 2980.

In machine learning, data pre-processing 2920 is tailored to the phase of model development. During model training 2930, pre-processing involves cleaning, normalizing, and transforming raw data into a format suitable for learning patterns. For fine-tuning 2960, pre-processing adapts the data to align with the distribution of the specific targeted task, ensuring the pre-trained model can effectively transfer its knowledge. Validation 2980 pre-processing mirrors that of training to accurately assess model generalization without leakage of information from the training set. Finally, in deployment 2990, pre-processing ensures real-world data matches the trained model's expectations, often involving dynamic adjustments to maintain consistency with the training and validation stages.

Machine Learning Algorithms

Various exemplary ML algorithms are within the scope of the present invention. Such machine learning algorithms include, but are not limited to, random forest, nearest neighbor, decision trees, support vector machines (SVM), Adaboost, gradient boosting, Bayesian networks, evolutionary algorithms, various neural networks (including deep learning networks (DLN), convolutional neural networks (CNN), and recurrent neural networks (RNN)), etc.

ML modules based on transformers and Large Language Models (LLMs) are particularly well suited for the tasks described herein. The online article "*Understanding Large Language Models—A Transformative Reading List*", by S. Raschka (posted Feb. 7, 2023, available at sebastianraschka (dot)com), describes various LLM architectures that are within the scope of the methods and systems described herein, and is hereby incorporated by reference in its entirety herein as if fully set forth herein.

The input to each of the listed ML modules is a feature vector comprising the input data described above for each ML module. The output of the ML module is a feature vector comprising the corresponding output data described above for each ML module.

Prior to deployment, each of the ML modules listed above may be trained on one or more respective sample input datasets and on one or more corresponding sample output datasets. The input and output training datasets may be generated from a database containing a history of input instances (e.g., documents, templates, and user data) and output instances (e.g., data fields, document sections, and/or complete documents), or may be generated synthetically by subject matter experts.

Exemplary System Architecture

An exemplary embodiment of the present disclosure may include one or more servers (management computing entities), one or more networks, and one or more clients (user computing entities). Each of these components, entities, devices, and systems (similar terms used herein interchangeably) may be cloud-based, and in direct or indirect communication with, for example, one another over the same or different wired or wireless networks. All of these devices, including servers, clients, and other computing entities or nodes may be run internally by a customer (in various architecture configurations including private cloud), internally by the provider of the IDEP (in various architecture configurations including private cloud), and/or on the public cloud.

FIG. 30 provides illustrative schematics of a server (management computing entity) 3010 connected via a network 3020 to a client (user computing entity) 3030 used for documentation within an interconnected digital engineering platform (IDEP), according to some embodiments of the present invention. While FIG. 30 illustrates the various system entities as separate, standalone entities, the various embodiments are not limited to this particular architecture. Additionally, the terms "client device", "client computing entity", "edge device", and "edge computing system" are equivalent and are used interchangeably herein.

Exemplary Management Computing Entity

An illustrative schematic is provided in FIG. 30 for a server or management computing entity 3010. In general, the terms computing entity, computer, entity, device, system, and/or similar words used herein interchangeably may refer to, for example, one or more cloud servers, computers, computing entities, desktop computers, mobile phones, tablets, phablets, notebooks, laptops, distributed systems, gaming consoles, watches, glasses, iBeacons, proximity beacons, key fobs, radio frequency identification (RFID) tags, earpieces, scanners, televisions, dongles, cameras, wristbands, wearable items/devices, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, crawling, displaying, storing, determining, creating/generating, monitoring, evaluating, and/or comparing (similar terms used herein interchangeably). In one embodiment, these functions, operations, and/or processes can be performed on data, content, and/or information (similar terms used herein interchangeably), as they are used in a digital engineering process.

In one embodiment, management computing entity 3010 may be equipped with one or more communication interfaces 3012 for communicating with various computing entities, such as by exchanging data, content, and/or information (similar terms used herein interchangeably) that can be transmitted, received, operated on, processed, displayed, stored, and/or the like. For instance, management computing entity 3010 may communicate with one or more client computing devices such as 3030 and/or a variety of other computing entities. Network or communications interface 3012 may support various wired data transmission protocols including, but not limited to, Fiber Distributed Data Interface (FDDI), Digital Subscriber Line (DSL), Ethernet, Asynchronous Transfer Mode (ATM), frame relay, and data over cable service interface specification (DOCSIS). In addition, management computing entity 3010 may be capable of wireless communication with external networks, employing any of a range of standards and protocols, including but not limited to, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High-Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

As shown in FIG. 30, in one embodiment, management computing entity 3010 may include or be in communication with one or more processors 3014 (also referred to as processors and/or processing circuitry, processing elements, and/or similar terms used herein interchangeably) that communicate with other elements within management computing entity 3010, for example, via a bus. As will be understood, processor 3014 may be embodied in a number of different ways. For example, processor 3014 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. The term circuitry may refer to an entire hardware embodiment or a combination of hardware and computer program products. Thus, processor 3014 may be embodied as integrated circuits (ICs), application-specific integrated circuits (ASICs), field-programmable gate arrays (FPGAs), programmable logic arrays (PLAs), hardware accelerators, other circuitry, and/or the like. As will therefore be understood, processor 3014 may be configured for a particular use or configured to execute instructions stored in volatile or non-volatile (or non-transitory) media 3016 and 3018, or otherwise accessible to processor 3014. As such, whether configured by hardware or computer program products, or by a combination thereof, processor 3014 may be capable of performing steps or operations according to embodiments of the present disclosure when configured accordingly.

In one embodiment, management computing entity 3010 may further include or be in communication with non-transitory memory 3018 (also referred to as non-volatile media, non-volatile storage, non-transitory storage, physical storage media, memory, memory storage, and/or memory circuitry—similar terms used herein interchangeably). In one embodiment, the non-transitory memory or storage may include one or more non-transitory memory or storage media, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile (or non-transitory) storage or memory media may store cloud storage buckets, databases, database instances, database management systems, data, applications, programs, program modules, scripts, source code, object code, byte code, compiled code, interpreted code, machine code, executable instructions, and/or the like. The term database, database instance, and/or database management system (similar terms used herein interchangeably) may refer to a collection of records or data that is stored in a computer-readable storage medium using one or more database models, such as a hierarchical database model, network model, relational model, entity-relationship model, object model, document model, semantic model, graph model, and/or the like.

In one embodiment, management computing entity 3010 may further include or be in communication with volatile memory 3016 (also referred to as volatile storage, memory, memory storage, memory and/or circuitry—similar terms used herein interchangeably). In one embodiment, the volatile storage or memory may also include one or more volatile storage or memory media, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, processor 3014. Thus, the cloud storage buckets, databases, database instances, database management systems, data, applications, programs, program modules, scripts, source code, object code, byte code, compiled code, interpreted code, machine code, executable instructions, and/or the like may be used to control certain aspects of the operation of management computing entity 3010 with the assistance of processor 3014 and an operating system.

Although not shown, management computing entity 3010 may include or be in communication with one or more input elements, such as a keyboard input, a mouse input, a touch screen/display input, motion input, movement input, audio input, pointing device input, joystick input, keypad input, and/or the like. Management computing entity 3010 may also include or be in communication with one or more output elements, also not shown, such as audio output, visual output, screen/display output, motion output, movement output, spatial computing output (e.g., virtual reality or augmented reality), and/or the like.

As will be appreciated, one or more of the components of management computing entity 3010 may be located remotely from other management computing entity components, such as in a distributed system. Furthermore, one or more of the components may be combined and additional components performing functions described herein may be included in management computing entity 3010. Thus, management computing entity 3010 can be adapted to accommodate a variety of needs and circumstances. As will be recognized, these architectures and descriptions are provided for exemplary purposes only and are not limited to the various embodiments.

Exemplary User Computing Entity

A user may be a human individual, a company, an organization, an entity, a department within an organization, a representative of an organization and/or person, an artificial user such as algorithms, artificial intelligence, or other software that interfaces, and/or the like. FIG. 30 further provides an illustrative schematic representation of a client user computing entity 3030 that may be used in conjunction with embodiments of the present disclosure. In various embodiments, computing device 3030 may be a general-purpose computing device with dedicated modules for performing digital engineering-related tasks. It may alternatively be implemented in the cloud, with logically and/or physically distributed architectures.

As shown in FIG. 30, user computing entity 3030 may include a power source 3031, an antenna 3070, a radio transceiver 3032, a network and communication interface 3034, and a processor unit 3040 that provides signals to and receives signals from the network and communication interface. The signals provided to and received may include signaling information in accordance with air interface standards of applicable wireless systems. In this regard, user computing entity 3030 may be capable of operating with one or more air interface standards, communication protocols, modulation types, and access types. More particularly, user computing entity 3030 may operate in accordance with any of a number of wireless communication standards and protocols, such as those described above with regard to management computing entity 3010. Similarly, user computing entity 3030 may operate in accordance with multiple wired communication standards and protocols, such as those described above with regard to management computing entity 3010.

Via these communication standards and protocols, user computing entity 3030 may communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). User computing entity 3030 may also download changes, add-ons, and updates, for instance, to its firmware, software (e.g., including executable instructions, applications, program modules), and operating system.

In some implementations, processing unit 3040 may be embodied in several different ways. For example, processing unit 3040 may be embodied as one or more complex programmable logic devices (CPLDs), microprocessors, multi-core processors, co-processing entities, application-specific instruction-set processors (ASIPs), graphical processing units (GPUs), microcontrollers, and/or controllers. Further, processing unit 3040 may be embodied as one or more other processing devices or circuitry. The term circuitry may refer to an entirely hardware embodiment or a combination of hardware and computer program products. Thus, processing unit 3040 may be embodied as integrated circuits, application specific integrated circuits (ASICs), field programmable gate arrays (FPGAs), programmable logic arrays (PLAs), hardware accelerators, other circuitry, and/or the like. As will therefore be understood, processing unit 3040 may be configured for a particular use or configured to execute instructions stored in volatile or non-volatile media or otherwise accessible to the processing unit. As such, whether configured by hardware or computer program products, or by a combination thereof, processing unit 3040 may be capable of performing steps or operations according to embodiments of the present invention when configured accordingly.

In some embodiments, processing unit 3040 may comprise a control unit 3042 and a dedicated arithmetic logic unit (ALU) 3044 to perform arithmetic and logic operations. In some embodiments, user computing entity 3030 may comprise a graphics processing unit (GPU) 3046 for specialized parallel processing tasks, and/or an artificial intelligence (AI) module or accelerator 3048, also specialized for applications including artificial neural networks and machine learning. In some embodiments, processing unit 3040 may be coupled with GPU 3046 and/or AI accelerator 3048 to distribute and coordinate digital engineering related tasks.

In some embodiments, computing entity 3030 may include a user interface, comprising an input interface 3050 and an output interface 3052, each coupled to processing unit 3040. User input interface 3050 may comprise any of a number of devices or interfaces allowing computing entity 3030 to receive data, such as a keypad (hard or soft), a touch display, a mic/speaker for voice/speech/conversation, a camera for motion or posture interfaces, and appropriate sensors for spatial computing interfaces. User output interface 3052 may comprise any of a number of devices or interfaces allowing computing entity 3030 to provide information to a user, such as through the touch display, or a speaker for audio outputs. In some embodiments, output interface 3052 may connect computing entity 3030 to an external loudspeaker or projector, for audio and/or visual output. In some embodiments, user interfaces 3050 and 3052 integrate multimodal data in an interface that caters to human users. Some examples of human interfaces include a dashboard-style interface, a workflow-based interface, conversational interfaces, and spatial-computing interfaces. As shown in FIG. 5, computing entity 3030 may also support bot/algorithmic interfaces such as code interfaces, text-based API interfaces, and the like.

User computing entity 3030 can also include volatile and/or non-volatile storage or memory 3060, which can be embedded and/or may be removable. For example, the non-volatile or non-transitory memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile (or non-transitory) storage or memory 3060 may store an operating system 3062, application software 3064, data 3066, databases, database instances, database management systems, data, applications, programs, program modules, scripts, source code, object code, byte code, compiled code, interpreted code, machine code, executable instructions, and/or the like to implement functions of user computing entity 3030. As indicated, this may include a user application that is resident on the entity or accessible through a browser or other user interface for communicating with management computing entity 3010 and/or various other computing entities.

In some embodiments, user computing entity 3030 may include one or more components or functionalities that are the same or similar to those of management computing entity 3010, as described in greater detail above. As will be recognized, these architectures and descriptions are provided for exemplary purposes only and are not limited to the various embodiments.

In some embodiments, computing entities 3010 and/or 3030 may communicate to external devices like other computing devices and/or access points to receive information such as software or firmware, or to send information from the memory of the computing entity to external systems or devices such as servers, computers, smartphones, and the like.

In some embodiments, two or more computing entities such as 3010 and/or 3030 may establish connections using a network such as 3020 utilizing any of the networking protocols listed previously. In some embodiments, the computing entities may use network interfaces such as 3012 and 3034 to communicate with each other, such as by communicating data, content, information, and/or similar terms used herein interchangeably that can be transmitted, received, operated on, processed, displayed, stored, and/or the like.

Additional Hardware & Software Implementation Details

Although an example processing system has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The terms "processor", "computer," "data processing apparatus", and the like encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, code, program code, and the like) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read only memory or a random-access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto optical disks, or optical disks. However, a computer need not have such devices. Devices suitable for storing computer program instructions and information/data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a backend component, e.g., as an information/data server, or that includes a middleware component, e.g., an application server, or that includes a frontend component, e.g., a client computer having a graphical user interface or a web browser through which a user can interact with an implementation of the subject matter described herein, or any combination of one or more such back end, middleware, or front end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship with each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

In some embodiments of the present invention, the entire system can be implemented and offered to the end-users and operators over the Internet, in a so-called cloud implementation. No local installation of software or hardware would be needed, and the end-users and operators would be allowed access to the systems of the present invention directly over the Internet, using either a web browser or similar software on a client, which client could be a desktop, laptop, mobile device, and so on. This eliminates any need for custom software installation on the client side and increases the flexibility of delivery of the service (software-as-a-service), and increases user satisfaction and ease of use. Various business models, revenue models, and delivery mechanisms for the present invention are envisioned, and are all to be considered within the scope of the present invention.

In general, the method executed to implement the embodiments of the invention, may be implemented as part of an operating system or a specific application, component, program, object, module, or sequence of instructions referred to as "program code," "computer program(s)", "computer code(s)," and the like. The computer programs typically comprise one or more instructions set at various times in various memory and storage devices in a computer, and that, when read and executed by one or more processors in a computer, cause the computer to perform operations necessary to execute elements involving the various aspects of the invention. Moreover, while the invention has been described in the context of fully functioning computers and computer systems, those skilled in the art will appreciate that the various embodiments of the invention are capable of being distributed as a program product in a variety of forms, and that the invention applies equally regardless of the particular type of machine or computer-readable media used to actually affect the distribution. Examples of computer-readable media include but are not limited to recordable type media such as volatile and non-volatile (or non-transitory) memory devices, floppy and other removable disks, hard disk drives, optical disks, which include Compact Disk Read-Only Memory (CD ROMS), Digital Versatile Disks (DVDs), etc., as well as digital and analog communication media.

Exemplary Digital Documentation GUI

FIG. 31 shows a screenshot of an exemplary graphical user interface (GUI) used with a digital documentation system, according to one embodiment of the present invention. The GUI provides the user of the interconnected digital engineering platform (IDEP) with the digital documentation capabilities described herein. FIG. 31 shows a browser window header 3102 which includes a document link for easy navigation. Below the header, a domain and security level banner 3104 displays the domain, platform software version, and security level, ensuring that users are aware of the domain they are operating in and the security protocols in place. The security level indicator 3106 displays the user's maximum security access level within the platform (e.g., "Level 1").

The interface also includes a search bar 3112, allowing the user to carry out comprehensive cross-platform searches through the IDEP for digital engineering models, files, and documents, thus facilitating efficient retrieval of information across the platform. Adjacent to this, the user & domain field 3110 provides information on the user's domain (e.g., client name). The user and domain field may allow the user to login and to access user profile and subscription information.

The top menu of the GUI offers additional functionalities. For example, the document name field 3120 displays the document's name, and may include its version. The document security level indicator 3122 displays the security level (e.g., "Level 1") of the document being accessed. In one embodiment, using an expandable security level menu adjacent to the document security level indicator 3122, the user may select the document's target security access level "view", thus filtering only the parts of the document accessible through a given security level. In other embodiments, the user may also use the document security level indicator 3122 to down-select the security level while sharing the document, thus sharing portions of the document that correspond to the specified security level. Only security access levels below the user's security level (e.g., "Level 1" in FIG. 31) would be available for the user to view and share. The user interface buttons 3124 include options to copy the document link, open a comment section, access document information, manage sharing access, and export the document.

The granular dynamic info security tags (e.g., 3106 and 3122, and the like) are an important but optional element of the digital documentation system and its associated GUI. The model splicer and the IDEP system enable the granular dynamic information security tags 3106 and 3122. In some embodiments, the digital documentation system uses metadata of DE models or documents to cross-reference against authorizations, licenses, or regulations to update. In some embodiments, the granular dynamic information security tags 3106 and 3122 are dynamic, and are refreshed ahead of any document updates to confirm the right authenticated user has the right authorized access to the digital artifacts and data to perform or view the updates.

For document organization and navigation, the GUI features a document outline viewer 3130 on the left of FIG. 31, providing links to the document's headers and paragraphs and/or sections. Within the outline viewer 3130, a digital thread viewer 3132 shows sections of the document along with the linked digital engineering (DE) model(s), the source IT domain, and the last update timestamp, each tagged with the appropriate security level (e.g., "L1"). In some examples, if sections of a document contain content requiring a higher security level for viewing, the user may be presented with an option to request access. Were the user to request such access, an authorized user with access at a higher security level is notified for their review. In other examples, if sections of a document contain content requiring a higher security level for viewing, such sections will not be shown for display, nor provide the user with any prompt for requesting access.

At the center of FIG. 31, the section viewer 3140 displays the content of each document section and ensures that every paragraph is updated based on the data of the DE models that are linked to it. The model data and associated security access may be provided through model splicing, as discussed previously. Lastly, on the right of FIG. 31, the comment pane 3150 exhibits the document comments and may include functionalities for comment sharing and resolution.

CONCLUSIONS

One of ordinary skill in the art knows that the use cases, structures, schematics, flow diagrams, and steps may be performed in any order or sub-combination, while the inventive concept of the present invention remains without departing from the broader scope of the invention. Every embodiment may be unique, and step(s) of method(s) may be either shortened or lengthened, overlapped with other activities, postponed, delayed, and/or continued after a time gap, such that every active user and running application program is accommodated by the server(s) to practice the methods of the present invention.

For simplicity of explanation, the embodiments of the methods of this disclosure are depicted and described as a series of acts or steps. However, acts or steps in accordance with this disclosure can occur in various orders and/or concurrently, and with other acts or steps not presented and described herein. Furthermore, not all illustrated acts or steps may be required to implement the methods in accordance with the disclosed subject matter. In addition, those skilled in the art will understand and appreciate that the methods could alternatively be represented as a series of interrelated states via a state diagram or events or their equivalent.

As used herein, the singular forms "a," "an," and "the" include plural references unless the context clearly indicates otherwise. Thus, for example, reference to "a cable" includes a single cable as well as a bundle of two or more different cables, and the like.

The terms "comprise," "comprising," "includes," "including," "have," "having," and the like, used in the specification and claims are meant to be open-ended and not restrictive, meaning "including but not limited to."

In the foregoing description, numerous specific details are set forth, such as specific structures, dimensions, processes parameters, etc., to provide a thorough understanding of the present invention. The particular features, structures, materials, or characteristics may be combined in any suitable manner in one or more embodiments. The words "example", "exemplary", "illustrative" and the like, are used herein to mean serving as an example, instance, or illustration. Any aspect or design described herein as "example" or its equivalents is not necessarily to be construed as preferred or advantageous over other aspects or designs. Rather, use of the words "example" or equivalents is intended to present concepts in a concrete fashion.

As used in this application, the term "or" is intended to mean an inclusive "or" rather than an exclusive "or". That is, unless specified otherwise, or clear from context, "X includes A or B" is intended to mean any of the natural inclusive permutations. That is, if X includes A, X includes B, or X includes both A and B, then "X includes A or B" is satisfied under any of the foregoing instances.

Reference throughout this specification to "an embodiment," "certain embodiments," or "one embodiment" means that a particular feature, structure, or characteristic described in connection with the embodiment is included in at least one embodiment. Thus, the appearances of the phrase "an embodiment," "certain embodiments," or "one embodiment" throughout this specification are not necessarily all referring to the same embodiment.

As used herein, the term "about" in connection with a measured quantity, refers to the normal variations in that measured quantity, as expected by one of ordinary skill in the art in making the measurement and exercising a level of care commensurate with the objective of measurement and the precision of the measuring equipment. For example, in some exemplary embodiments, the term "about" may include the recited number±10%, such that "about 10" would include from 9 to 11. In other exemplary embodiments, the term "about" may include the recited number±X %, where X is considered the normal variation in said measurement by one of ordinary skill in the art.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom. Features of the transitory physical storage medium described may be incorporated into/used in a corresponding method, digital documentation system and/or system, and vice versa.

Although the present invention has been described with reference to specific exemplary embodiments, it will be evident that the various modifications and changes can be made to these embodiments without departing from the broader scope of the invention. Accordingly, the specification and drawings are to be regarded in an illustrative sense rather than in a restrictive sense. It will also be apparent to the skilled artisan that the embodiments described above are specific examples of a single broader invention which may have greater scope than any of the singular descriptions taught. There may be many alterations made in the descriptions without departing from the scope of the present invention, as defined by the claims.

What is claimed is:

1. A non-transitory physical storage medium storing instructions, the instructions executable by a processor of a digital documentation system to cause the processor to perform operations comprising:

retrieve one or more digital engineering (DE) document templates from a DE document template library comprising DE document templates for one or more phases of a DE product lifecycle, wherein the DE document templates comprise first DE data fields;

receive a first user input from a user, wherein the first user input comprises a first DE model file of a DE model type, wherein the first DE model file resides in a customer environment distinct from the digital documentation system, and wherein the first user input comprises a selected DE document template selected from the one or more DE document templates;

crawl the first DE model file to extract a plurality of model data from the first DE model file to generate a data schema describing a structure and a format of the plurality of model data;

generate a plurality of splice function scripts to access the plurality of model data based on an access permission of the user, wherein the plurality of splice function scripts are written in a computer-executable scripting language, wherein at least one of the plurality of splice function scripts invokes a native API function of a third-party DE tool, and wherein the plurality of splice function scripts provide a plurality of API endpoints to access and manipulate the plurality of model data based on the data schema;

generate an externally-accessible API from the plurality of splice function scripts, wherein the externally-accessible API allows access to the plurality of model data without directly invoking the native API function of the third-party DE tool, and wherein the externally-accessible API is associated with the DE model type;

wrap the DE model file with the externally-accessible API to generate a model splice of the first DE model file of the DE model type, wherein the model splice provides access to limited portions of the plurality of model data of the first DE model file, and wherein the model splice provides access control to the plurality of model data based on the access permission of the user;

generate a first model data using a first splice function of the model splice of the first DE model file, via the externally-accessible API, based on the selected DE document template;

train a generator machine learning (ML) model on one or more example DE document files and a platform documentation from the digital documentation system, wherein the platform documentation comprises a reference guide of the externally-accessible API;

fine-tune the generator ML model using a fine-tuning database to generate a fine-tuned generator ML model, wherein the fine-tuning database comprises at least a sample prompt-response pair, wherein the sample prompt-response pair comprises a sample user input and a corresponding response of the digital documentation system; and execute the fine-tuned generator ML model to generate a DE document file from the selected DE document template and the first model data.

2. The non-transitory physical storage medium of claim 1, wherein the first model data is stored within a customer-controlled storage bucket with a zero-trust access control.

3. The non-transitory physical storage medium of claim 1, wherein the first DE model file is accessible through the externally-accessible API along with a second DE model file of a second DE model type that is not already interoperable with the first DE model file of the DE model type.

4. The non-transitory physical storage medium of claim 1, wherein the generation of the first model data is executed upon invocation by an orchestration script of the externally-accessible API.

5. The non-transitory physical storage medium of claim 1, further comprising instructions to:
receive one or more modifications to the first model data upon an update of the first DE model file via the model splice; and
update one or more portions of the DE document file based on the one or more modifications to the first model data.

6. The non-transitory physical storage medium of claim 1, wherein the DE document file is part of an interconnected digital engineering platform (IDEP),
wherein the generator ML model has access to the first model data via the model splice, and the one or more DE document templates, to generate the DE document file, and
wherein the non-transitory physical storage medium further comprises instructions to dynamically update the DE document file using at least one software-defined digital thread in the IDEP having instructions to:
receive user interactions dynamically from the user;
responsive to the user interacting with the IDEP and performing a first modification to the first model data via the DE model and/or a second modification to a parameter setting in the IDEP, propagate the first modification and/or the second modification through the at least one software-defined digital thread to an associated DE documentation comprising the DE document file; and
execute the generator ML model to generate and/or update the DE document file.

7. The non-transitory physical storage medium of claim 1, wherein the DE document file is a live DE document file associated with a digital twin configuration of a physical twin, and
wherein the non-transitory physical storage medium further comprises instructions to:
receive a predetermined timestamp; and
generate a printed DE document file corresponding to a static, time-stamped version of the DE document file at the predetermined timestamp.

8. The non-transitory physical storage medium of claim 7, further comprising instructions to:
detect a first modification of the first DE model file or a second modification of a software-defined digital thread associated with the first DE model file;
update the first DE data fields of the DE document file based on the first modification or the second modification responsive to the first modification or the second modification; and
generate an updated printed DE document file with the updated first DE data fields updated based on the DE document file.

9. The non-transitory physical storage medium of claim 1, further comprising instructions to:
execute a recommender engine to recommend one or more recommended DE document templates from the one or more DE document templates, wherein the one or more recommended DE document templates comprise template data and/or metadata that match the first user input within a predetermined confidence level, and wherein the selected DE document template is selected from the one or more recommended DE document templates based on the first user input.

10. The non-transitory physical storage medium of claim 9, wherein the recommender engine comprises a recommender ML model that is trained on user profile data and template metadata, and wherein the recommender ML model recommends the one or more recommended DE document templates from the one or more DE document templates based on the training of the recommender ML.

11. The non-transitory physical storage medium of claim 9, wherein the recommender engine comprises a Large Language Model (LLM), wherein the LLM is fine-tuned with an ontology of documentation requirements, and wherein the LLM recommends the one or more recommended DE document templates based on the first user input.

12. The non-transitory physical storage medium of claim 1, wherein the generator ML model further comprises predictive modeling and decision-tree algorithms, and wherein the instructions to generate the DE document file comprise instructions to generate suggestions for the first DE data fields and values based on the first user input and an overall context of the DE document file.

13. The non-transitory physical storage medium of claim 1, wherein the generator ML model further comprises an LLM fine-tuned on an ontology of documentation requirements.

14. The non-transitory physical storage medium of claim 1, wherein the generator ML model further comprises an LLM fine-tuned on system metadata.

15. The non-transitory physical storage medium of claim 1, wherein the generator ML model further comprises a rule-based algorithm, and wherein the rule-based algorithm uses a domain-specific language (DSL) that updates the DE document file, using examples of prior, related DE documents.

16. The non-transitory physical storage medium of claim 1, further comprising instructions to:
receive user feedback data related to the DE document file generated by the generator ML model from the user;
generate feedback metrics related to a quality of the DE document file generated by the generator ML model; and
train and/or fine-tune the generator ML model utilizing the feedback metrics to improve future DE document files generated by the generator ML model.

17. The non-transitory physical storage medium of claim 1, further comprising instructions to:
generate training data comprising a plurality of DE document files from the generator ML model and document edits made to the plurality of DE document files by the user; and
train and/or fine-tune the generator ML model on the training data.

18. A digital documentation system, comprising:
at least one processor; and
at least one non-transitory storage medium storing instructions, the instructions executable by the processor to cause the processor to perform operations comprising:
retrieve one or more digital engineering (DE) document templates from a DE document template library comprising DE document templates for one or more phases of a DE product lifecycle, wherein the DE document templates comprise first DE data fields;
receive a first user input from a user, wherein the first user input comprises a first DE model file of a DE model type, wherein the first DE model file resides in a customer environment distinct from the digital documentation system, and wherein the first user input comprises a selected DE document template selected from the one or more DE document templates;
crawl the first DE model file to extract a plurality of model data from the first DE model file to generate a data schema describing a structure and a format of the plurality of model data;
generate a plurality of splice function scripts to access the plurality of model data based on an access permission of the user, wherein the plurality of splice function scripts are written in a computer-executable scripting language, wherein at least one of the plurality of splice function scripts invokes a native API function of a third-party DE tool, and wherein the plurality of splice function scripts provide a plurality of API endpoints to access and manipulate the plurality of model data based on the data schema;
generate an externally-accessible API from the plurality of splice function scripts, wherein the externally-accessible API allows access to the plurality of model data without directly invoking the native API function of the third-party DE tool, and wherein the externally-accessible API is associated with the DE model type;
wrap the DE model file with the externally-accessible API to generate a model splice of the first DE model file of the DE model type, wherein the model splice provides access to limited portions of the plurality of model data of the first DE model file, and wherein the model splice provides access control to the plurality of model data based on the access permission of the user;
generate a first model data using a first splice function of the model splice of the first DE model file, via the externally-accessible API, based on the selected DE document template;
train a generator machine learning (ML) model on one or more example DE document files and a platform documentation from the digital documentation system, wherein the platform documentation comprises a reference guide of the externally-accessible API;
fine-tune the generator ML model using a fine-tuning database to generate a fine-tuned generator ML model, wherein the fine-tuning database comprises at least a sample prompt-response pair, wherein the sample prompt-response pair comprises a sample user input and a corresponding response of the digital documentation system; and
execute the fine-tuned generator ML model to generate a DE document file from the selected DE document template and the first model data.

19. A computer-implemented method for generating a digital engineering (DE) document file in a digital documentation system, comprising:
retrieving one or more digital engineering (DE) document templates from a DE document template library comprising DE document templates for one or more phases of a DE product lifecycle, wherein the DE document templates comprise first DE data fields;
receiving a first user input from a user, wherein the first user input comprises a first DE model file of a DE model type, wherein the first DE model file resides in a customer environment distinct from the digital documentation system, and wherein the first user input comprises a selected DE document template selected from the one or more DE document templates;
crawling the first DE model file to extract a plurality of model data from the first DE model file to generate a data schema describing a structure and a format of the plurality of model data;
generating a plurality of splice function scripts to access the plurality of model data based on an access permission of the user, wherein the plurality of splice function scripts are written in a computer-executable scripting language, wherein at least one of the plurality of splice function scripts invokes a native API function of a third-party DE tool, and wherein the plurality of splice function scripts provide a plurality of API endpoints to access and manipulate the plurality of model data based on the data schema;
generating an externally-accessible API from the plurality of splice function scripts, wherein the externally-accessible API allows access to the plurality of model data without directly invoking the native API function of the third-party DE tool, and wherein the externally-accessible API is associated with the DE model type;
wrapping the DE model file with the externally-accessible API to generate a model splice of the first DE model file of the DE model type, wherein the model splice provides access to limited portions of the plurality of model data of the first DE model file, and wherein the model splice provides access control to the plurality of model data based on the access permission of the user;
generating a first model data using a first splice function of the model splice of the first DE model file, via the externally-accessible API, based on the selected DE document template;
training a generator machine learning (ML) model on one or more example DE document files and a platform documentation from the digital documentation system, wherein the platform documentation comprises a reference guide of the externally-accessible API;
fine-tuning the generator ML model using a fine-tuning database to generate a fine-tuned generator ML model, wherein the fine-tuning database comprises at least a sample prompt-response pair, wherein the sample prompt-response pair comprises a sample user input and a corresponding response of the digital documentation system; and
executing the fine-tuned generator ML model to generate the DE document file from the selected DE document template and the first model data.

20. The computer-implemented method of claim 19, wherein the first model data is stored within a customer-controlled storage bucket with a zero-trust access control.

\* \* \* \* \*